US012166427B2

(12) United States Patent
Inoue

(10) Patent No.: US 12,166,427 B2
(45) Date of Patent: Dec. 10, 2024

(54) POWER CONVERSION DEVICE INCLUDING AN INVERTER CONTROL CIRCUIT THAT CONTROLS A PHASE OF AN AC VOLTAGE TARGET VALUE

(71) Applicant: Mitsubishi Electric Corporation, Tokyo (JP)

(72) Inventor: Sadayuki Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 211 days.

(21) Appl. No.: 17/913,849

(22) PCT Filed: Apr. 30, 2020

(86) PCT No.: PCT/JP2020/018323
§ 371 (c)(1),
(2) Date: Sep. 23, 2022

(87) PCT Pub. No.: WO2021/220488
PCT Pub. Date: Nov. 4, 2021

(65) Prior Publication Data
US 2023/0115683 A1 Apr. 13, 2023

(51) Int. Cl.
*H02M 7/48* (2007.01)
*H02J 3/38* (2006.01)
(Continued)

(52) U.S. Cl.
CPC ............ *H02M 7/48* (2013.01); *H02J 3/381* (2013.01); *H02J 3/40* (2013.01); *H02J 3/48* (2013.01); *H02J 2300/24* (2020.01)

(58) Field of Classification Search
CPC ........ H02M 7/48; H02M 7/539; H02M 1/007; H02M 3/00; H02J 3/381; H02J 3/40; H02J 3/48; H02J 2300/24
See application file for complete search history.

(56) References Cited

U.S. PATENT DOCUMENTS

2009/0121549 A1* 5/2009 Leonard ................ H02J 3/381
307/51
2013/0241292 A1* 9/2013 Kimura ................ H02J 3/40
307/66
(Continued)

FOREIGN PATENT DOCUMENTS

JP 60-245430 A 12/1985
JP 2003-284246 A 10/2003
(Continued)

OTHER PUBLICATIONS

International Search Report and Written Opinion mailed on Aug. 11, 2020, received for PCT Application PCT/JP2020/018323, filed on Apr. 30, 2020, 8 pages including English Translation.

*Primary Examiner* — Kyle J Moody
*Assistant Examiner* — Jye-June Lee
(74) *Attorney, Agent, or Firm* — XSENSUS LLP

(57) ABSTRACT

An inverter converts power outputted from a distributed power supply into AC power, and outputs to an AC system. An inverter control circuit generates an AC voltage target value at a time of controlling the inverter, and generates a command value for control of the inverter as a voltage source. When the inverter is introduced into the AC system, the inverter control circuit sets a frequency of the AC voltage target value to a frequency of an AC voltage detected by an AC frequency detection circuit, and controls a phase of the AC voltage target value to be at least a leading phase with respect to the AC voltage of the AC system when a target value of the AC power is in a running direction.

12 Claims, 27 Drawing Sheets

(51) Int. Cl.
*H02J 3/40* (2006.01)
*H02J 3/48* (2006.01)

(56) References Cited

U.S. PATENT DOCUMENTS

2015/0008743 A1* 1/2015 Kimura .................... H02J 3/38
  307/52
2016/0329716 A1* 11/2016 Inoue ....................... H02J 3/40

FOREIGN PATENT DOCUMENTS

JP          2011-193606 A    9/2011
JP              5566736 B2    8/2014

* cited by examiner

POWER CONVERSION DEVICE INCLUDING AN INVERTER CONTROL CIRCUIT THAT CONTROLS A PHASE OF AN AC VOLTAGE TARGET VALUE

CROSS-REFERENCE TO RELATED APPLICATION

The present application is based on PCT filing PCT/JP2020/018323, filed Apr. 30, 2020, the entire content of which is incorporated herein by its reference.

TECHNICAL FIELD

The present disclosure relates to a power conversion device.

BACKGROUND ART

In recent years, in order to reduce an environmental load, introduction of a power generation system employing a static inverter using natural energy that does not emit carbon dioxide, such as a solar cell, has been accelerated. In order to cope with power shortage and the like after the Great East Japan Earthquake, a system including a storage battery, a system using an electric vehicle as a storage battery, and a system combining a solar cell and a storage battery have been commercialized. In these systems as well, static inverters are employed.

Whereas, in a thermal power plant as an adjustment force, a power generation cost including a management cost increases as a power generation amount by renewable energy increases, and thus, it is predicted that closing will proceed in the future. A synchronous generator such as thermal power generation potentially has an action (an inertial force, a synchronization force, and the like) of suppressing fluctuation when a system frequency fluctuates. When closing of thermal power plants (reduction of synchronous generators) proceeds, it becomes difficult to secure stability of the system.

In order to solve the above problem, each company has been developing a virtual synchronous generator control technology in which a static inverter has a function of a synchronous generator. Japanese Patent Laying-Open No. 2011-193606 (PTL 1) discloses a control method for a static inverter in which a virtual synchronous generator control technology is implemented, and a control device. Specifically, PTL 1 describes a control method of virtual synchronous generator control during steady operation at a time of system interconnection. An inverter unit described in PTL 1 includes a governor control unit, a mass system arithmetic unit, and an automatic voltage regulator (AVR) unit, which are required for the virtual synchronous generator control. The mass system arithmetic unit calculates an angular frequency to be outputted from the static inverter, on the basis of difference information between active power to be outputted from the static inverter and a command value (a power target value) outputted from an energy management device (hereinafter, referred to as EMS) or the like. On the basis of the calculated angular frequency, a current value, and a set voltage, the inverter unit controls a target AC voltage to have a leading phase when a frequency of the power system decreases.

CITATION LIST

Patent Literature

PTL 1: Japanese Patent Laying-Open No. 2011-193606

SUMMARY OF INVENTION

Technical Problem

The static inverter implementing the virtual synchronous generator control function described in PTL 1 generates an AC voltage of an AC system to be operated as a voltage source. This static inverter calculates an angular frequency (a frequency and a phase of the AC voltage of the AC system) of the AC voltage of the AC system to be outputted from the static inverter, on the basis of a difference between an output power target value notified from the EMS and active power being outputted from the static inverter. This static inverter generates an offset value to be added to the output power target value notified from the EMS described above, on the basis of a difference between a frequency of the AC voltage of the AC system and a frequency target value (for example, 60 Hz) of the AC voltage of the AC system notified from the EMS. Since the target AC voltage is controlled to have a leading phase when the frequency of the power system decreases, the static inverter outputs more active power than the output power target value notified from the EMS in a running direction (a discharging direction). In the following description, control of operating the static inverter as a voltage source is referred to as voltage control. Whereas, control of operating the static inverter as a current source in synchronization with an inputted AC voltage is referred to as current control.

In a power distribution system in which a plurality of static inverters implementing virtual synchronous generator control are installed, the EMS manages the number of static inverters to be connected to the power distribution system depending on power demand. For example, in a power distribution system in which three static inverters are installed, in a case where the power demand can be covered by an output of one static inverter, it is better to supply all the power with one inverter than to share the power with three static inverters, in consideration of efficiency of the power conversion device including the static inverter. However, when demanded power increases and it becomes difficult to cover the power demand with one inverter, the EMS outputs an instruction to further add one static inverter to the power distribution system. The static inverter having received the instruction to newly participate in the power distribution system detects a frequency, a phase, and an amplitude of the AC voltage of the AC system on the basis of the AC voltage of the AC system of the power distribution system at the own end. Then, the static inverter generates a target value of the AC voltage of the AC system when voltage control is performed using the measured frequency, phase, and amplitude, and outputs power to the AC system.

Whereas, the AC voltage of the AC system measured by a voltage sensor has an inaccuracy. In a case where the static inverter detects a frequency and a phase by detecting a zero-cross point of an AC voltage waveform at the own end, for example, a case is considered in which 0 V of the AC voltage of the AC system is outputted as −2 V due to an inaccuracy. In a case where the static inverter generates an AC voltage target value when the voltage control is performed on the basis of the zero-cross point detected by the voltage sensor, an AC voltage target value having a lagging phase with respect to an actual AC voltage of the AC system is generated. Even if the static inverter starts the voltage control on the basis of the zero-cross point information detected by the voltage sensor, power flows from the AC system toward the static inverter immediately after the start of the voltage control since the AC voltage target value has a lagging phase. This flowing power varies depending on a phase difference.

This phenomenon is eliminated in several seconds to several tens of seconds by the virtual synchronous generator control using the mass system arithmetic unit and the governor control unit described above. However, when the power added with a demand load exceeds a power capacity of the static inverter that has been previously operating, the static inverter that has been previously operating is stopped due to overload. A control circuit that controls the static inverter is often configured by a microcomputer. The microcomputer samples an AC voltage of an AC system, an AC system current, and the like in synchronization with a carrier at a time of performing power width modulation (PWM) conversion, which is a reference at a time of controlling the static inverter. More specifically, the microcomputer generates an interruption signal on the basis of a carrier signal, and calculates a command value on the basis of the generated interruption signal. In this case, a sampling position of the AC voltage of the AC system changes depending on a timing at which the carrier interruption is inputted. This also causes an inaccuracy in a time axis direction due to the sampling. Furthermore, inaccuracies in linearity and an amplitude direction of the voltage sensor described above also occur. These inaccuracies cause inaccuracies in a frequency, a phase, and a voltage amplitude of an output AC voltage of a newly introduced static inverter. In particular, in a case where the output AC voltage of the static inverter has a lagging phase, the static inverter suctions (charges) unnecessary power from the system when newly introduced. When this unnecessary power exceeds a power capacity of the static inverter that has already been introduced, the static inverter that has already been introduced is stopped by the overload.

As described above, in the power system in which a plurality of static inverters implementing the virtual synchronous generator control method are installed, when a static inverter that has been stopped is newly introduced into the power system, the introduced static inverter suctions power in a regeneration (charging) direction. When a static inverter originally interconnected to the system outputs power for compensating the suctioned power, the power exceeds the power capacity of the static inverter, so that the static inverter stops. An object of the present disclosure is to provide a power conversion device capable of preventing stop of a static inverter originally interconnected to an AC system when a stopped inverter is newly introduced into the AC system.

Solution to Problem

A power conversion device of the present disclosure includes: an inverter to convert power outputted from a distributed power supply into AC power, and output the AC power to an AC system; an AC voltage measuring device to measure an AC voltage of the AC system; an AC frequency detection circuit to detect a frequency and a phase of the AC voltage of the AC system on the basis of an output of the AC voltage measuring device; and an inverter control circuit to generate an AC voltage target value at a time of controlling the inverter, and generate a command value for control of the inverter as a voltage source. The inverter control circuit sets a frequency of the AC voltage target value to the frequency of the AC voltage detected by the AC frequency detection circuit at a time of introduction of the inverter into the AC system, and controls a phase of the AC voltage target value to be at least a leading phase with respect to the AC voltage of the AC system when a target value of the AC power is in a running direction.

Advantageous Effects of Invention

According to the power conversion device of the present disclosure, when a stopped inverter is newly introduced into the AC system, it is possible to prevent stop of a static inverter originally interconnected to the AC system.

DESCRIPTION OF EMBODIMENTS

Figure 1:
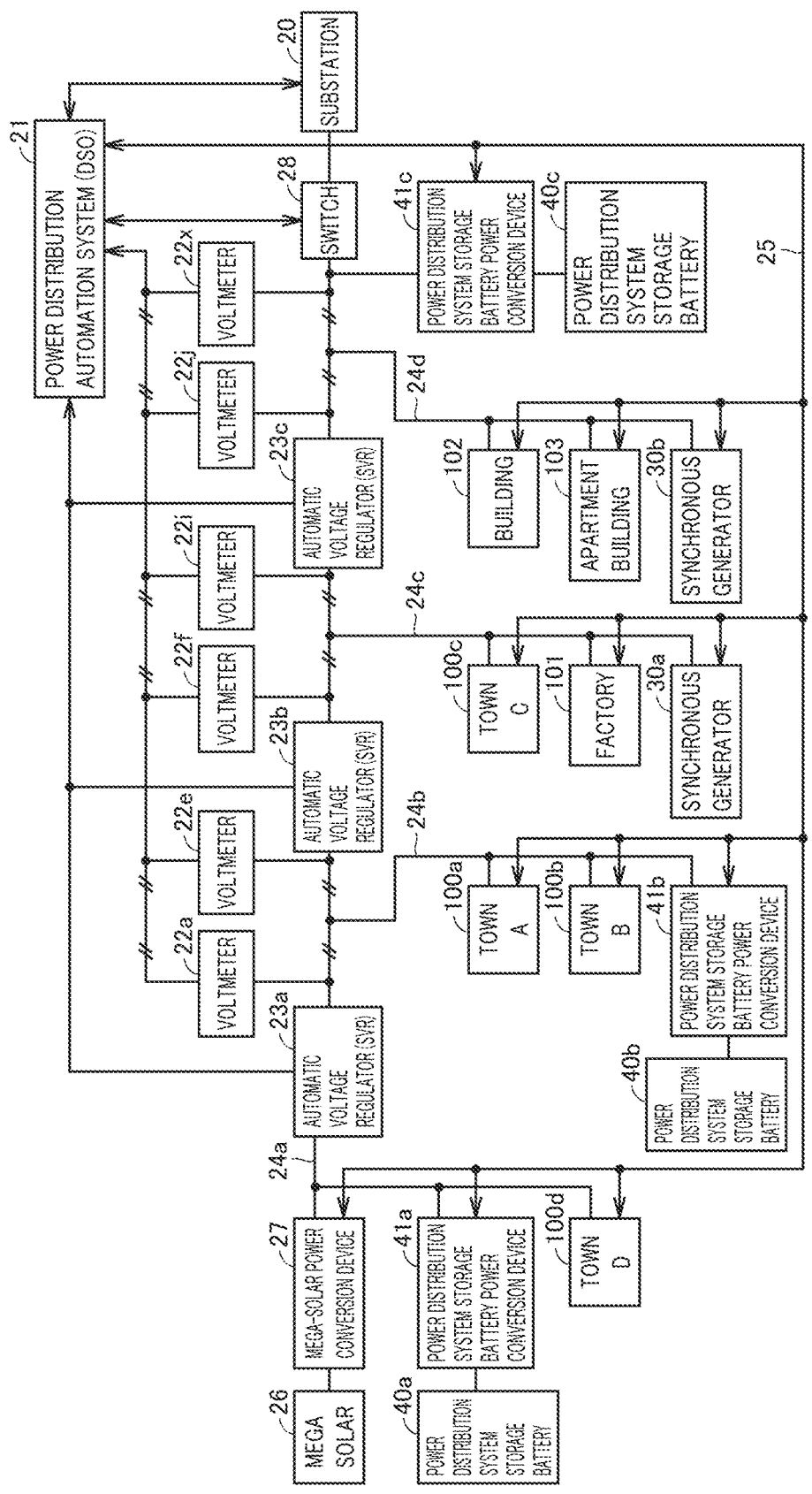
FIG. 1 is a block diagram illustrating a configuration of a power distribution system (an AC system) to which a power conversion device according to a first embodiment is connected.

Hereinafter, embodiments will be described in detail with reference to the drawings. In the following description, the same or corresponding parts in the drawings are denoted by the same reference numerals, and the description thereof will not be repeated in principle.

The following embodiments relate to virtual synchronous generator control for improving stability of a system by imparting characteristics of a synchronous generator to a power conversion device in which energy generation devices using renewable energy such as a solar cell, an energy storage device such as a storage battery, and the like are in system interconnection with AC.

First Embodiment

FIG. 1 is a block diagram illustrating a configuration of a power distribution system (an AC system) to which a power conversion device according to a first embodiment is connected. In the first embodiment, a single-phase system will be described as an example in order to simplify the description, but the present disclosure may be applied to a three-phase system.

Referring to FIG. 1, power distribution system 24 (24a to 24d) is connected to a substation 20, and a plurality of automatic voltage regulators 23 (23a to 23c) are provided in series in power distribution system 24. In the first embodiment, each automatic voltage regulator 23 is configured by an SVR, and automatic voltage regulator 23 is hereinafter referred to as an SVR 23. To power distribution system 24, a town 100 (a town A 100a, a town B 100b, a town C 100c, and a town D 100d), a factory 101, a building 102, an apartment building 103, a mega-solar power conversion device 27, and a power distribution system storage battery power conversion device 41 (hereinafter, each of them may be referred to as a "consumer") are connected.

To power distribution system 24, a plurality of voltmeters 22 are connected. A measurement result of voltmeter 22 is transmitted to a power distribution automation system 21 (hereinafter, power distribution automation system 21 is also referred to as a DSO 21) at a predetermined cycle. Tap position information and primary-side and secondary-side voltage information of SVR 23 are also notified to power distribution automation system 21. In the first embodiment, SVR 23 notifies power distribution automation system 21 of the tap position information and the primary-side and secondary-side voltage information at a predetermined cycle, and non-periodically at a time of tap switching. DSO 21 collects information such as various measurement results at a predetermined cycle from each consumer (building 102, apartment building 103, town 100, factory 101, mega-solar power conversion device 27, synchronous generators 30a and 30b, and power distribution system storage battery power conversion devices 41a, 41b, and 41c). From a smart meter (not illustrated) installed at each consumer, a community energy management system (CEMS) (not illustrated) collects a power consumption of the consumers in town A 100a, town B 100b, town C 100c, and town D 100d and generated power of an energy generation device at a predetermined cycle (for example, 30-minute cycle), and notifies DSO 21 of a collection result. Mega-solar power conversion device 27 is connected with a mega solar 26. Similarly, power distribution system storage battery power conversion devices 41*a*, 41*b*, and 41*c* are connected with power distribution system storage batteries 40*a*, 40*b*, and 40*c*.

Figure 2:
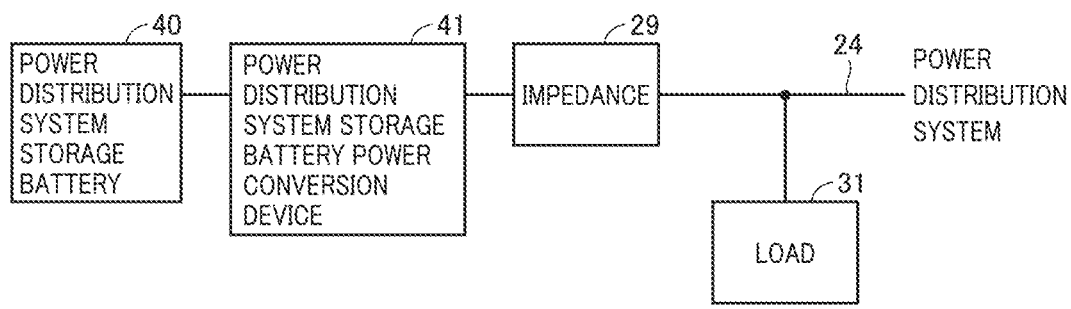
FIG. 2 is a block diagram for further describing a configuration of some devices including a power distribution system storage battery 40 connected to a power distribution system 24 illustrated in FIG. 1 and a configuration of power distribution system 24.

FIG. 2 is a block diagram for further describing a configuration of some devices including a power distribution system storage battery 40 connected to power distribution system 24 illustrated in FIG. 1 and a configuration of power distribution system 24.

Referring to FIG. 2, a load 31, an impedance 29 for a power distribution system, power distribution system storage battery 40, and power distribution system storage battery power conversion device 41 are connected to power distribution system 24. Impedance 29 is denoted by a centralized system to simplify the description. In the first embodiment, impedance 29 for the power distribution system is assumed to be constituted by a reactor component and a resistance component.

Figure 3:
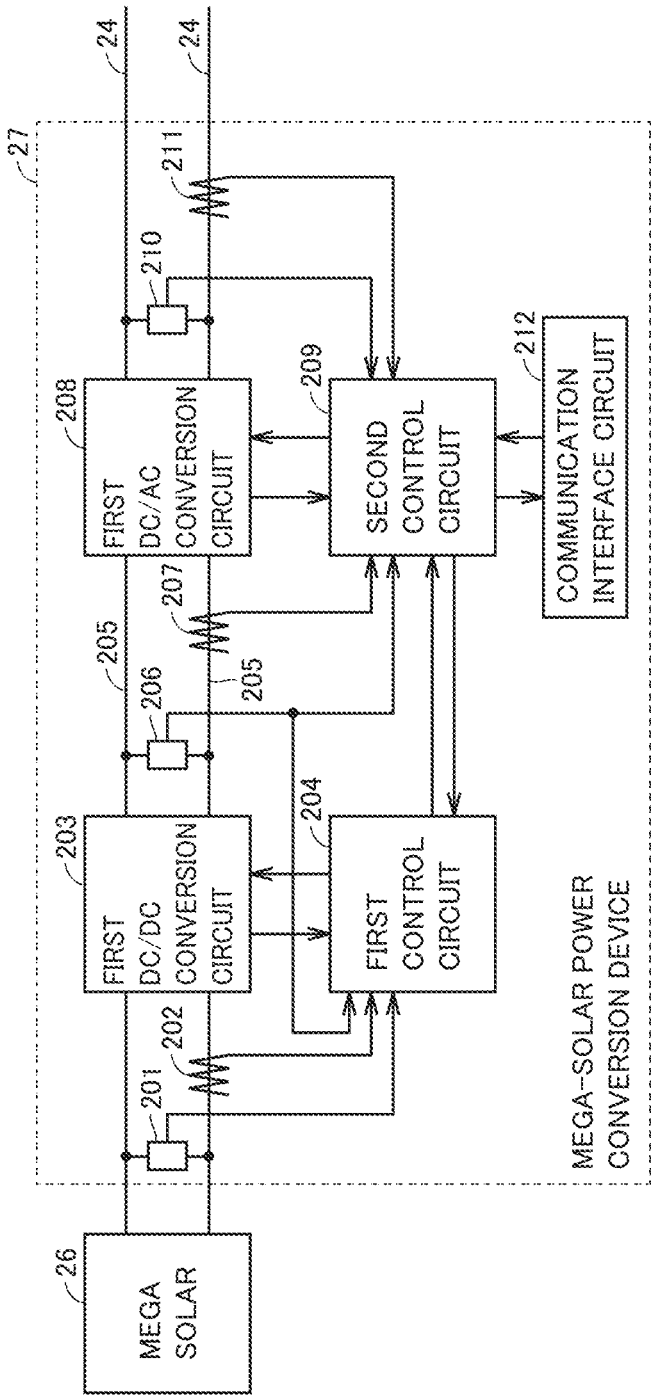
FIG. 3 is a block configuration diagram of a mega-solar power conversion device 27 illustrated in FIG. 1.

FIG. 3 is a block configuration diagram of mega-solar power conversion device 27 illustrated in FIG. 1.

Referring to FIG. 3, mega-solar power conversion device 27 includes: a voltmeter 201, an ammeter 202, a first DC/DC conversion circuit 203, a first control circuit 204, a DC bus 205, a voltmeter 206, an ammeter 207, a first DC/AC conversion circuit 208, a second control circuit 209, a voltmeter 210, an ammeter 211, and a communication interface circuit 212.

Voltmeter 201 measures a first DC voltage outputted from mega solar 26. Ammeter 202 measures a DC current outputted from mega solar 26. First DC/DC conversion circuit 203 converts DC power of the first DC voltage outputted from mega solar 26 into DC power of a second DC voltage. First control circuit 204 controls first DC/DC conversion circuit 203. DC bus 205 supplies the second DC voltage outputted from first DC/DC conversion circuit 203 to first DC/AC conversion circuit 208 through DC bus 205. Voltmeter 206 measures the second DC voltage of DC bus 205. Ammeter 207 measures a DC current outputted from first DC/DC conversion circuit 203.

First DC/AC conversion circuit 208 converts DC power outputted from first DC/DC conversion circuit 203 into AC power, and outputs to power distribution system 24. Second control circuit 209 controls first DC/AC conversion circuit 208. Voltmeter 210 measures an AC voltage outputted from first DC/AC conversion circuit 208. Ammeter 211 measures an AC current outputted from first DC/AC conversion circuit 208. Communication interface circuit 212 communicates with DSO 21.

Figure 4:
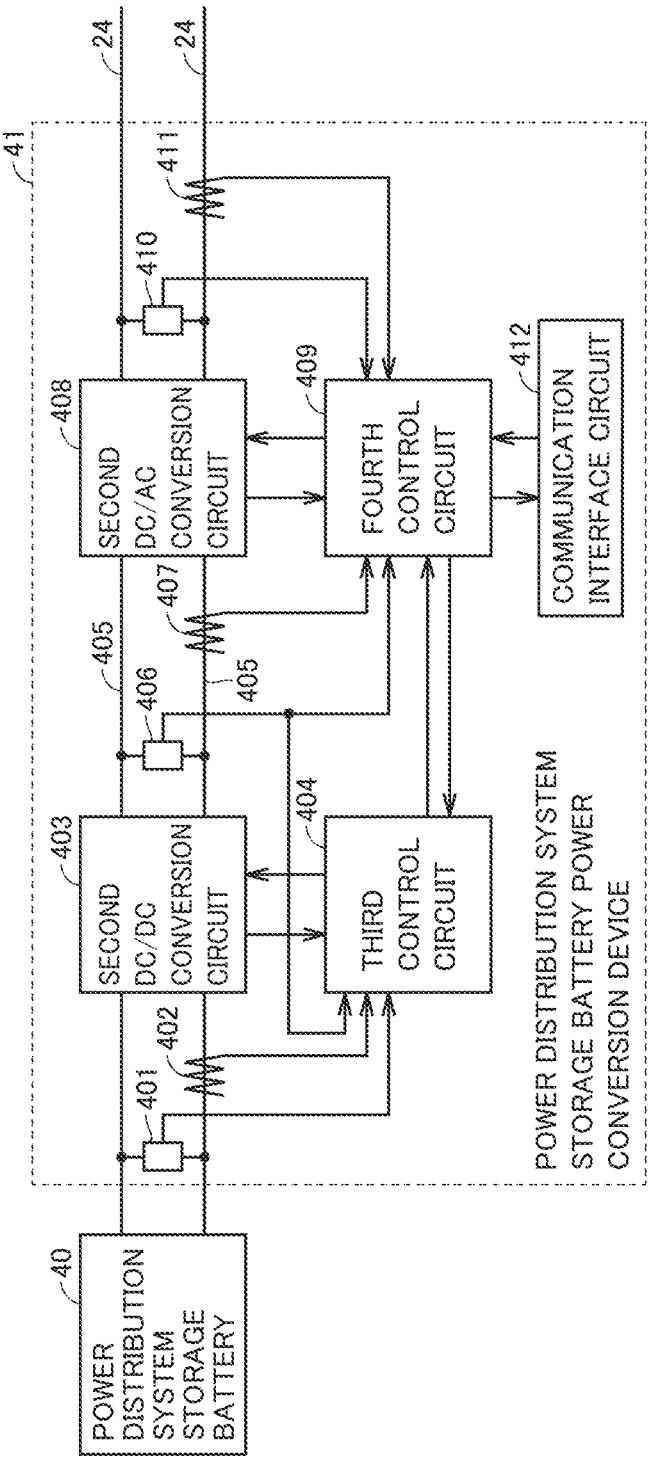
FIG. 4 is a block configuration diagram of a power distribution system storage battery power conversion device 41 illustrated in FIG. 1.

FIG. 4 is a block configuration diagram of power distribution system storage battery power conversion device 41 illustrated in FIG. 1.

Referring to FIG. 4, power distribution system storage battery power conversion device 41 includes: a voltmeter 401, an ammeter 402, a second DC/DC conversion circuit 403, a third control circuit 404, a DC bus 405, a voltmeter 406, an ammeter 407, a second DC/AC conversion circuit 408, a fourth control circuit 409, a voltmeter 410, an ammeter 411, and a communication interface circuit 412.

Voltmeter 401 measures a third DC voltage outputted from power distribution system storage battery 40. Ammeter 402 measures a DC current outputted from power distribution system storage battery 40. Second DC/DC conversion circuit 403 converts DC power of the third DC voltage outputted from power distribution system storage battery 40 into DC power of a fourth DC voltage. Third control circuit 404 controls second DC/DC conversion circuit 403. DC bus 405 supplies the fourth DC voltage outputted from second DC/DC conversion circuit 403 to second DC/AC conversion circuit 408.

Voltmeter 406 measures the fourth DC voltage of DC bus 405. Ammeter 407 measures a DC current outputted from second DC/DC conversion circuit 403. Second DC/AC conversion circuit 408 converts DC power outputted from second DC/DC conversion circuit 403 into AC power, and outputs to power distribution system 24. Fourth control circuit 409 controls second DC/AC conversion circuit 408. Voltmeter 410 measures an AC voltage outputted from second DC/AC conversion circuit 408. Ammeter 411 measures an AC current outputted from second DC/AC conversion circuit 408. Communication interface circuit 412 communicates between power distribution system storage battery power conversion device 41 and DSO 21.

As configurations of first DC/DC conversion circuit 203 and second DC/DC conversion circuit 403, a configuration of a known DC/DC converter can be appropriately used. As configurations of first DC/AC conversion circuit 208 and second DC/AC conversion circuit 408, a configuration of a known inverter can be appropriately used.

In the configurations of FIGS. 3 and 4, each of first DC/AC conversion circuit 208 and second DC/AC conversion circuit 408 corresponds to an example of "an inverter that converts power outputted from a distributed power supply into AC power and outputs to an AC system". Further, second control circuit 209 is "an inverter control circuit that generates a command value for control of an inverter as a current source one the basis of an inputted AC voltage". Similarly, fourth control circuit 409 corresponds to an example of "an inverter control circuit to generate an AC voltage target value at a time of controlling the inverter, and generate a command value for control of the inverter as a voltage source".

Figure 5:
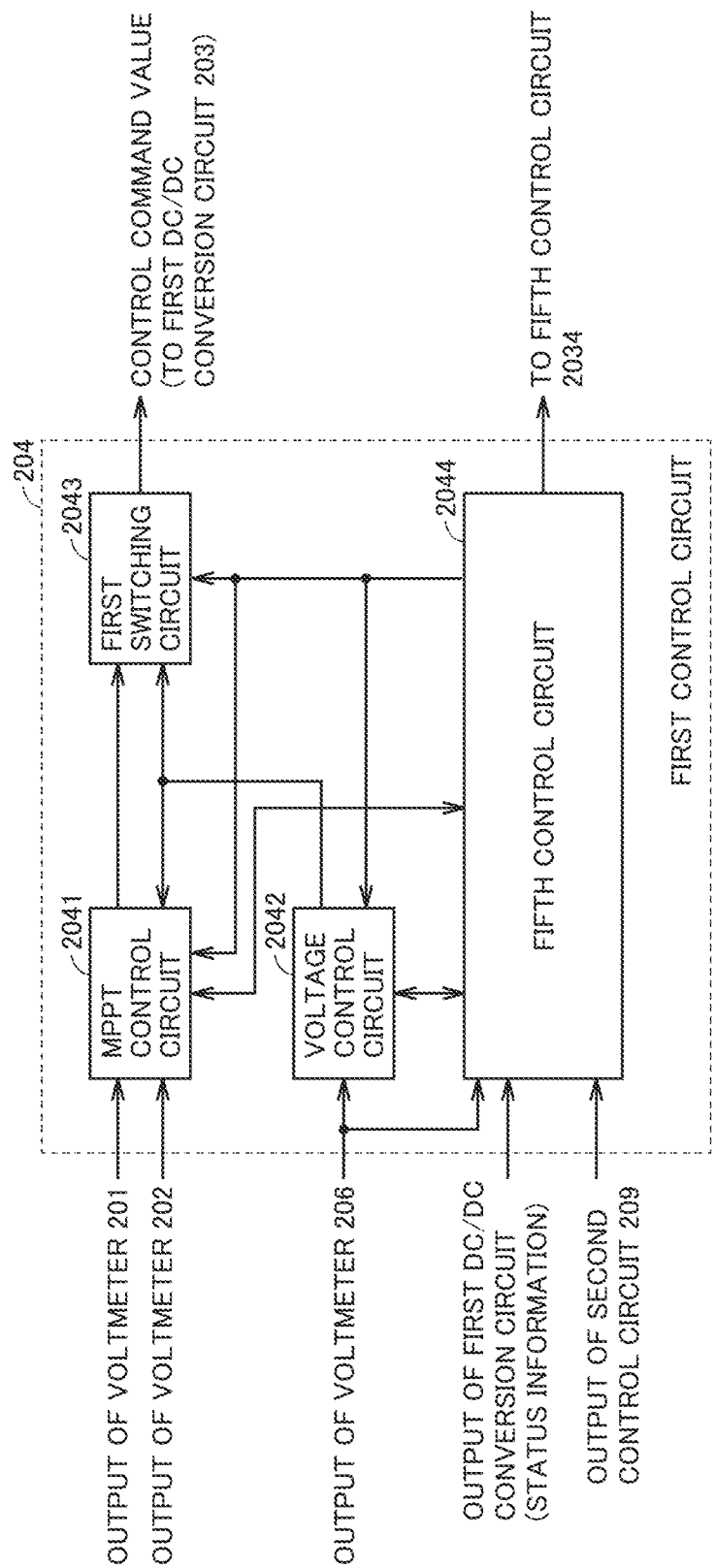
FIG. 5 is a block diagram for describing a configuration of a first control circuit 204 that controls a first DC/DC conversion circuit 203 of mega-solar power conversion device 27 illustrated in FIG. 3.

FIG. 5 is a block diagram for describing a configuration of first control circuit 204 that controls first DC/DC conversion circuit 203 of mega-solar power conversion device 27 illustrated in FIG. 3.

Referring to FIG. 5, first control circuit 204 includes a maximum power point tracking (MPPT) control circuit 2041, a voltage control circuit 2042, a first switching circuit 2043, and a fifth control circuit 2044.

MPPT control circuit 2041 executes so-called maximum power point tracking control. MPPT control circuit 2041 searches for a maximum power point of mega solar 26 on the basis of measurement values of voltmeter 201 and ammeter 202, in order to extract power generated from mega solar 26 to the maximum. Specifically, MPPT control circuit 2041 generates a control command value of first DC/DC conversion circuit 203 for control of a DC voltage measured by voltmeter 201 to be a voltage corresponding to the maximum power point.

Voltage control circuit 2042 generates a control command value of first DC/DC conversion circuit 203 for maintaining a DC voltage (the second DC voltage) of DC bus 205 at a predetermined voltage target value on the basis of a measurement value of voltmeter 206.

On the basis of status information of first DC/DC conversion circuit 203 and information on second control circuit 209, fifth control circuit 2044 outputs a control parameter, a control target value, and the like to MPPT control circuit 2041 and voltage control circuit 2042, and manages a power generation state and the like of mega solar 26. Fifth control circuit 2044 further outputs a control signal for first switching circuit 2043.

In accordance with the control signal from fifth control circuit 2044, first switching circuit 2043 selects one of an output of MPPT control circuit 2041 and an output of voltage control circuit 2042, and outputs as the control command value of first DC/DC conversion circuit 203.

First DC/DC conversion circuit 203 is controlled in an MPPT mode or a voltage control mode. When the mode of first DC/DC conversion circuit 203 is the MPPT mode, first switching circuit 2043 outputs a control command value generated by MPPT control circuit 2041. First switching circuit 2043 is controlled to output a control command value generated by voltage control circuit 2042 when the mode of first DC/DC conversion circuit 203 is the voltage control mode.

Figure 6:
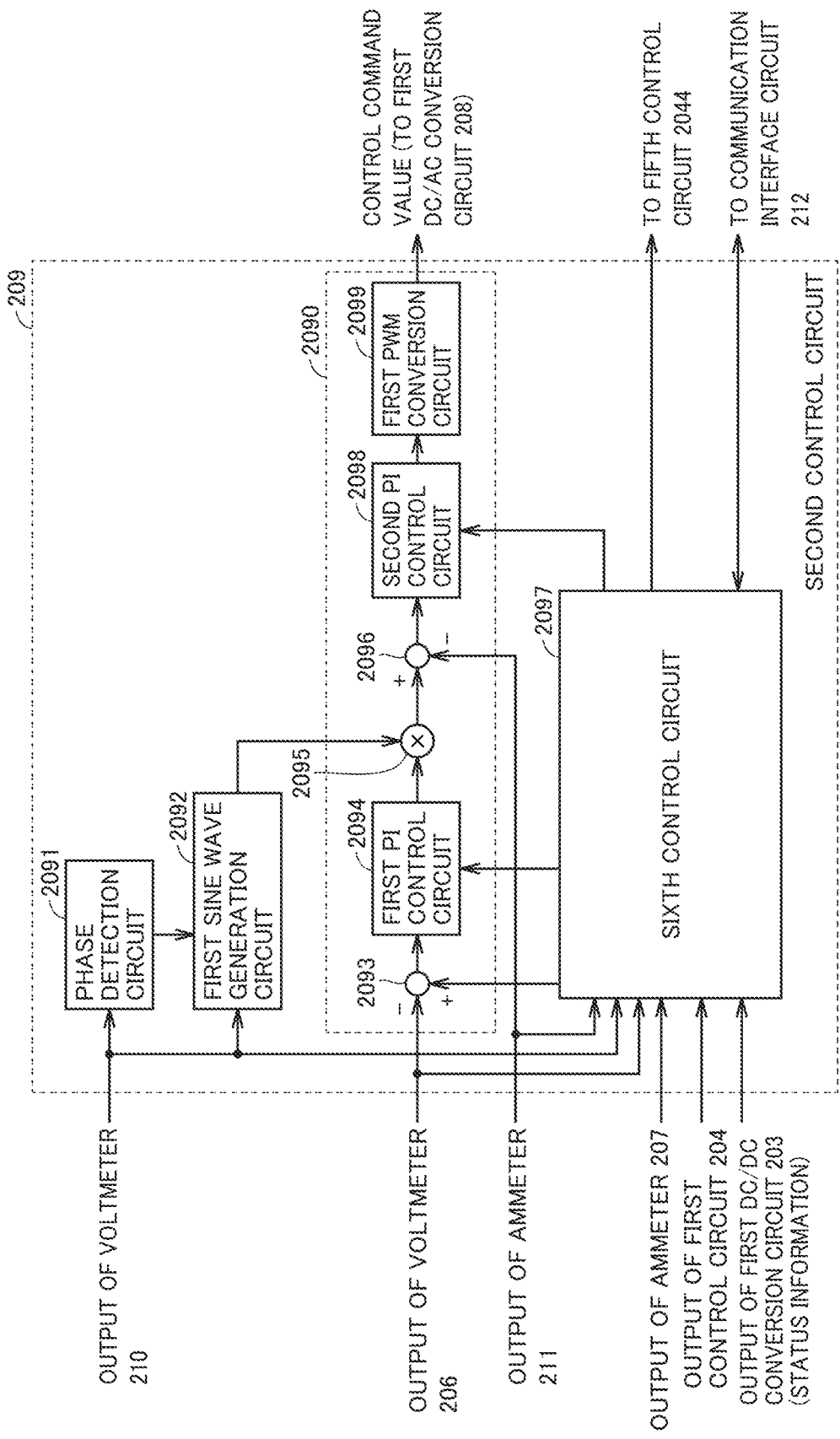
FIG. 6 is a block diagram for describing a configuration of a second control circuit 209 that controls a first DC/AC conversion circuit 208 of mega-solar power conversion device 27 illustrated in FIG. 3.

FIG. 6 is a block diagram for describing a configuration of second control circuit 209 that controls first DC/AC conversion circuit 208 of mega-solar power conversion device 27 illustrated in FIG. 3.

Referring to FIG. 6, second control circuit 209 includes a phase detection circuit 2091, a first sine wave generation circuit 2092, a current control circuit 2090, and a sixth control circuit 2097. Current control circuit 2090 includes a subtractor 2093, a first PI control circuit 2094, a multiplier 2095, a subtractor 2096, a second PI control circuit 2098, and a first PWM conversion circuit 2099. Current control circuit 2090 operates by a control method of a general power conversion device for solar power generation installed in a home. In this control method, the power conversion device is controlled to output power in synchronization with an AC voltage of an AC system.

Phase detection circuit 2091 detects a phase from an AC voltage waveform measured by voltmeter 210. In the first embodiment, phase detection circuit 2091 detects a zero-cross point from the AC voltage waveform, and detects a frequency of the AC voltage from a detection result of the zero-cross point. Phase detection circuit 2091 outputs the frequency and the zero-cross point information of the AC voltage as phase information, to first sine wave generation circuit 2092.

First sine wave generation circuit 2092 generates a sine wave synchronized with the AC voltage waveform measured by voltmeter 210, on the basis of an amplitude of the AC voltage measured by voltmeter 210 and the phase information detected by phase detection circuit 2091.

Current control circuit 2090 generates a control command value for control of first AC/DC conversion circuit 208, on the basis of a DC voltage of DC bus 205 outputted from voltmeter 206. The DC voltage of DC bus 205 outputted from voltmeter 206 is subtracted by subtractor 2093 from a target value of a DC bus voltage outputted from sixth control circuit 2097, and the subtraction result is inputted to first PI control circuit 2094. First PI control circuit 2094 outputs a voltage command value such that the DC voltage of DC bus 205 becomes a predetermined value, on the basis of a control parameter (a proportional gain and integration time) outputted from sixth control circuit 2097 and on the basis of an output of subtractor 2093.

The voltage command value outputted from first PI control circuit 2094 is multiplied, by multiplier 2095, by a sine wave synchronized with the AC voltage waveform outputted from first sine wave generation circuit 2092, to generate a current command value. Subtractor 2096 subtracts a current value of the AC system measured by ammeter 211 from the current command value outputted from multiplier 2095, and outputs a subtraction result to second PI control circuit 2098. On the basis of the control parameter (the proportional gain and the integration time) outputted from sixth control circuit 2097, second PI control circuit 2098 outputs a current command value to first PWM conversion circuit 2099 so that the subtraction result outputted from subtractor 2096 becomes zero. First PWM conversion circuit 2099 performs PWM conversion on the current command value from second PI control circuit 2098 to generate a control command value, and outputs the control command value to first DC/AC conversion circuit 208.

Sixth control circuit 2097 controls current control circuit 2090. Sixth control circuit 2097 collects measurement results regarding DC bus 205 outputted from voltmeter 206 and ammeter 207, measurement results regarding the AC system outputted from voltmeter 210 and ammeter 211, status information of first DC/DC conversion circuit 203 outputted from first control circuit 204, and the like. Sixth control circuit 2097 notifies DSO 21 and the like of the collected information through communication interface circuit 212.

As described above, control parameters of first PI control circuit 2094 and second PI control circuit 2098 are also notified from sixth control circuit 2097. Further, by sixth control circuit 2097 via communication interface circuit 212, DSO 21 is notified of an effective voltage of the AC system measured by an effective voltage measurement circuit (not illustrated) of the AC system, or active power and reactive power information measured by an active power measurement circuit and a reactive power measurement circuit (not illustrated) of the AC system. Sixth control circuit 2097 also notifies fifth control circuit 2044 of measurement results of an effective voltage, active power, and the like of the AC system. For example, when an effective value of the AC voltage of the AC system exceeds a predetermined value, fifth control circuit 2044 switches control of mega solar 26 from the MPPT mode to the voltage control mode to suppress an increase in the AC voltage of the AC system.

Figure 7:
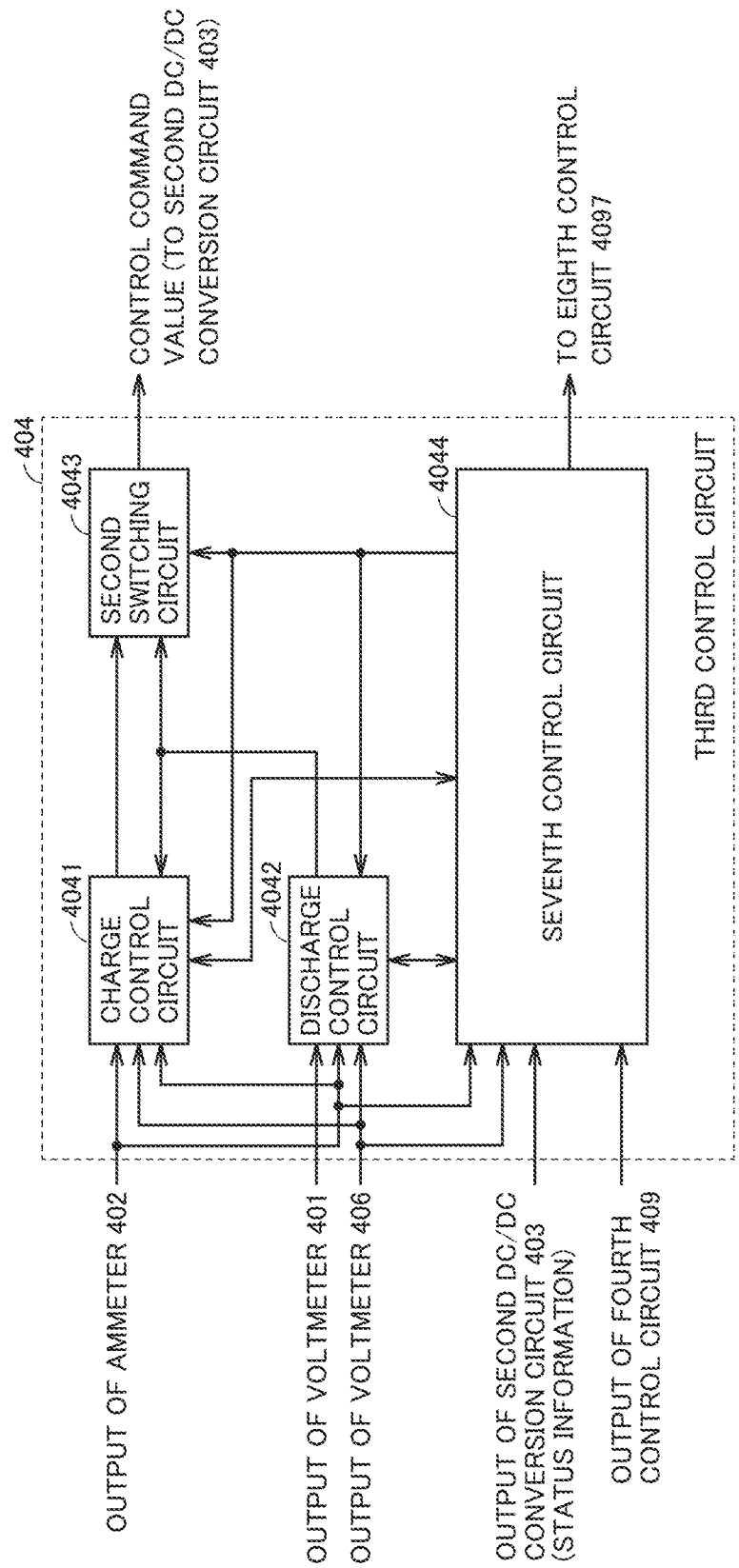
FIG. 7 is a block diagram for describing a configuration of a third control circuit 404 that controls a second DC/DC conversion circuit 403 of power distribution system storage battery power conversion device 41 illustrated in FIG. 4.

FIG. 7 is a block diagram for describing a configuration of third control circuit 404 that controls second DC/DC conversion circuit 403 of power distribution system storage battery power conversion device 41 illustrated in FIG. 4.

Referring to FIG. 7, third control circuit 404 includes a charge control circuit 4041, a discharge control circuit 4042, a second switching circuit 4043, and a seventh control circuit 4044.

On the basis of an output of ammeter 402, an output of voltmeter 401, and an output of voltmeter 406, charge control circuit 4041 generates a control command value of second DC/DC conversion circuit 403, when charge control of power distribution system storage battery 40 is performed.

On the basis of an output of ammeter 402, an output of voltmeter 401, and an output of voltmeter 406, discharge control circuit 4042 generates a control command value of second DC/DC conversion circuit 403, when discharge control of power distribution system storage battery 40 is performed.

Seventh control circuit 4044 outputs a control parameter, a control target value, and the like to charge control circuit 4041 and discharge control circuit 4042, and manages a charging amount, a charging current amount, a discharging power amount, and the like of power distribution system storage battery 40. Seventh control circuit 4044 outputs a control signal for second switching circuit 4043.

In accordance with the control signal from seventh control circuit 4044, second switching circuit 4043 selects one of an output of charge control circuit 4041 and an output of discharge control circuit 4042, and outputs as the control command value of second DC/DC conversion circuit 403.

Second switching circuit 4043 is controlled to output a control command value generated by charge control circuit 4041 when charging of power distribution system storage battery 40 is instructed, and to output a control command value generated by discharge control circuit 4042 when discharging of power distribution system storage battery 40 is instructed.

Figure 8:
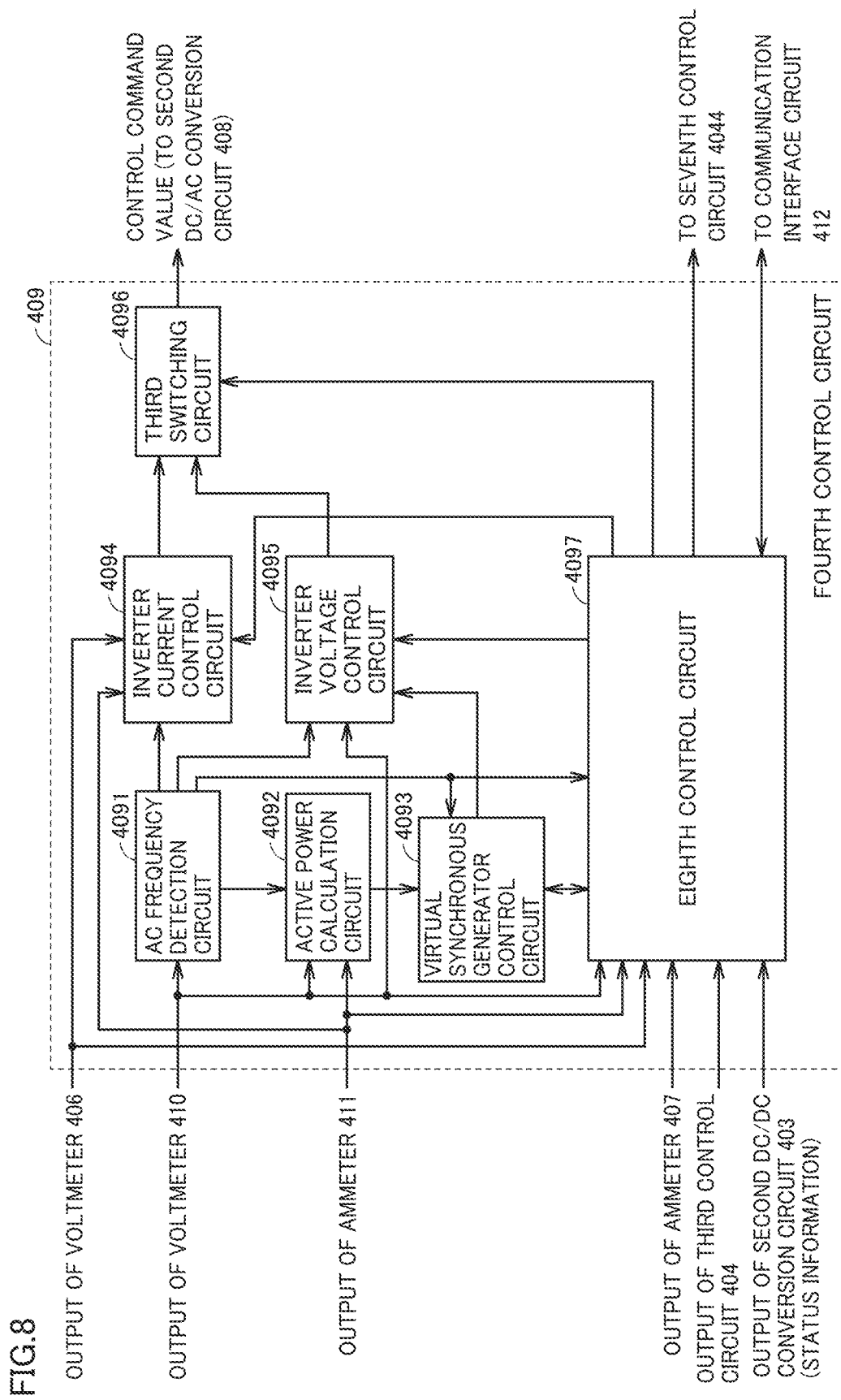
FIG. 8 is a block diagram for describing a configuration of a fourth control circuit 409 that controls a second DC/AC conversion circuit 408 of power distribution system storage battery power conversion device 41 illustrated in FIG. 4.

FIG. 8 is a block diagram for describing a configuration of fourth control circuit 409 that controls second DC/AC conversion circuit 408 of power distribution system storage battery power conversion device 41 illustrated in FIG. 4.

Referring to FIG. 8, fourth control circuit 409 includes an AC frequency detection circuit 4091, an active power calculation circuit 4092, a virtual synchronous generator control circuit 4093, an inverter current control circuit 4094, an inverter voltage control circuit 4095, and a third switching circuit 4096.

AC frequency detection circuit 4091 detects a phase from an AC voltage waveform measured by voltmeter 410. In the first embodiment, AC frequency detection circuit 4091 detects a zero-cross point from the AC voltage waveform, and detects a frequency from a time interval between the detected zero-cross points. Note that, a frequency detection method of the AC voltage is not limited to the method using a detection result of the zero-cross point.

Active power calculation circuit 4092 calculates active power outputted from second DC/AC conversion circuit 408 (an inverter), from AC voltage information and AC current information measured by voltmeter 410 and ammeter 411. In the first embodiment, active power calculation circuit 4092 also uses zero-cross point detection information and AC frequency information outputted from AC frequency detection circuit 4091, to integrate power for one cycle of the AC voltage waveform to calculate the active power. Note that a method of calculating the active power is not limited to the above method, and for example, the active power may be calculated using DQ conversion or the like when the AC system is a three-phase AC.

Virtual synchronous generator control circuit 4093 performs virtual synchronous generator control such that second DC/DC conversion circuit 408 (a static inverter) has an inertial force, a synchronization force, and a braking force of a synchronous generator, on the basis of the frequency information and the active power information of the AC voltage outputted from AC frequency detection circuit 4091 and active power calculation circuit 4092. Hereinafter, a virtual synchronous generator control technology will be briefly described. A synchronous generator as represented by thermal power generation has: a function of adjusting power to be outputted according to a frequency (a governor function); a function of maintaining an angular velocity (an inertial force); a function of synchronizing with an AC voltage of an AC system (a synchronization force); a voltage adjustment function of a trunk system (an automatic voltage regulator (AVR) function); a function of continuing operation even when the AC voltage of the AC system instantaneously drops at a time of a system accident; and the like. In the virtual synchronous generator control technology, a transient response of the static inverter is controlled to cause the static inverter to simulate a function of the synchronous generator. Specifically, the static inverter simulates three functions of a governor function, a function simulating a mass system model (dynamic characteristics of a rotary machine) based on an oscillation equation, and an AVR function.

In the first embodiment, in particular, a case will be described in which the governor function and the function simulating the mass system model based on the oscillation equation are implemented. Note that the AVR function of the synchronous generator is a function controlled mainly on the basis of an output voltage command or a reactive power command value notified from a host system (DSO 21 in the first embodiment), and thus is not implemented in the first embodiment. Hereinafter, the governor function and the function simulating the mass system model based on the oscillation equation will be specifically described.

First, the governor function will be described. A governor in a power plant has a function of controlling output power of a generator by controlling an output of a gas turbine or a steam turbine of thermal power generation or nuclear power generation, a guide vane of a water wheel of hydraulic power generation, and the like. In an AC power system, when demand exceeds supply, a frequency of an AC voltage of the AC system decreases. In a thermal power generator or a hydraulic power generator capable of output control, the governor has a droop characteristic, and is controlled to increase generated power as the frequency decreases. Whereas, when the supply exceeds the demand, the frequency of the AC voltage of the AC system increases. In this case, similarly, in the thermal power generator or the hydraulic power generator capable of output control, the governor has a droop characteristic, and is controlled to reduce generated power as the frequency increases.

Figure 9:
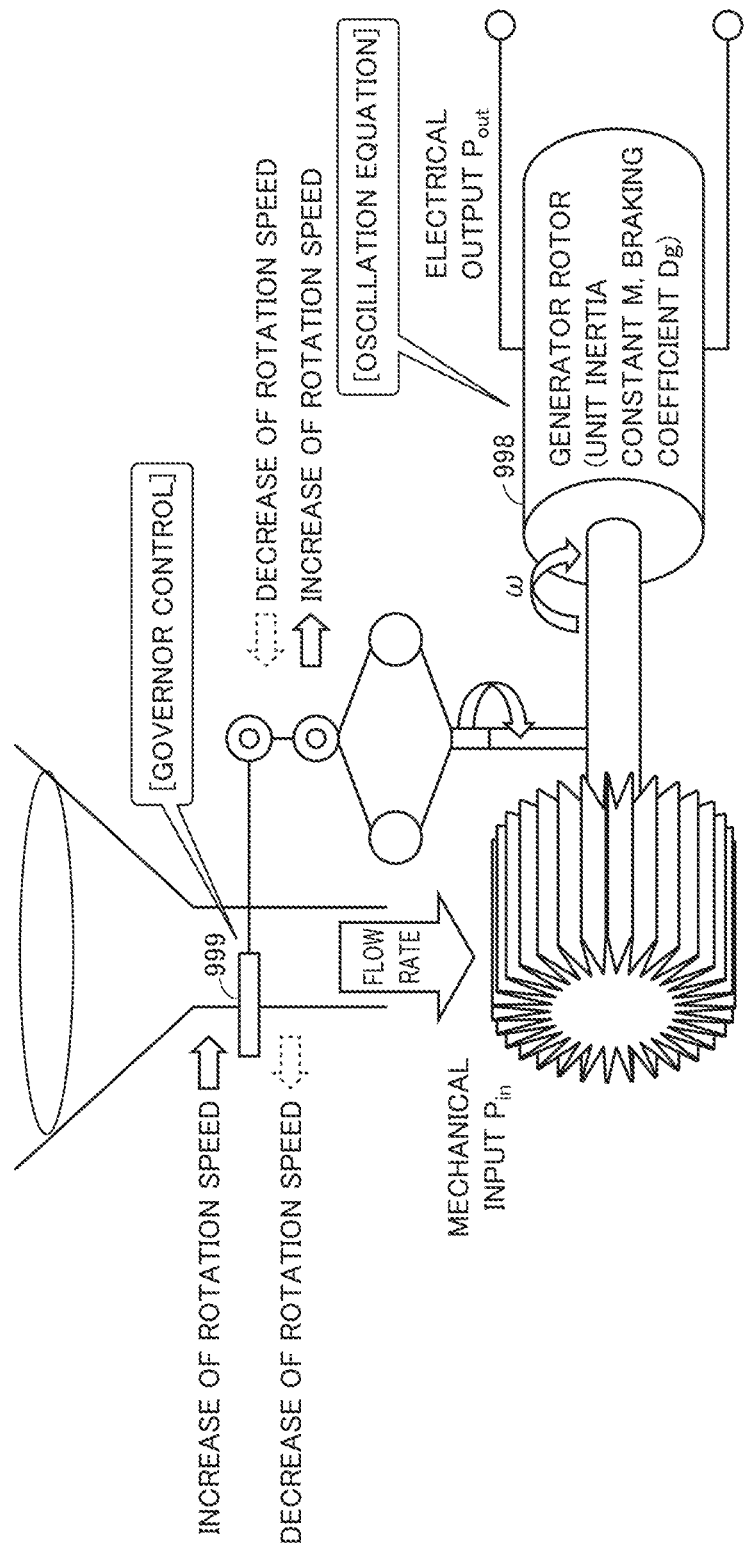
FIG. 9 is a view schematically illustrating a governor function.

FIG. 9 is a view schematically illustrating a governor function. As illustrated in FIG. 9, when an angular velocity ω of the synchronous generator increases, a valve 999 that regulates an inflow of energy moves to a right side. As a result, energy supplied to the synchronous generator is reduced. Whereas, when the angular velocity of the synchronous generator decreases, valve 999 that regulates the inflow of energy moves to a left side. As a result, the energy supplied to the synchronous generator increases. This enables the synchronous generator to independently control energy outputted from the synchronous generator by a frequency (the angular velocity of the synchronous generator) of an AC voltage of an AC system at an end of the synchronous generator. Even in a case where the synchronous generator individually performs the above operation, since the above operation is managed by a frequency of the AC voltage of the AC system, it is possible to share a load among a plurality of generators. The "Institute of Electrical Engineers of Japan" provides a standard model and the like configured in a first-order lag form to a governor.

In the first embodiment, an operation in a case where the governor is approximated by a model configured by the above-described first-order lag system will be described (see Formula (1)). Note that, $-1/\text{Kgd}$ in Formula (1) represents a proportional gain of the governor, and Tg represents a time constant of the first-order lag system.

$$-1/(\text{Kgd} \times (1+s \times \text{Tg})) \qquad (1)$$

Next, the function simulating the mass system model based on the oscillation equation will be described. The synchronous generator has a generator rotor 998 having an inertia constant M as illustrated in FIG. 9. For example, when generated power of mega solar 26 suddenly decreases due to a sudden change in solar radiation, insufficient power cannot be instantaneously covered by the governor control described above. The synchronous generator converts rotational energy accumulated in generator rotor 998 into power, and outputs to the AC system. At this time, the angular velocity (a rotation speed) of generator rotor 998 decreases.

When the angular velocity of generator rotor 998 decreases, energy supplied by the governor control increases, supporting the demand and the supply. Formula (2) is an oscillation equation (energy P is divided by an angular velocity ω and converted into torque T) simulating the mass system model (generator rotor 998). In Formula (2), Dg represents a braking coefficient, and M represents the above-described inertia constant.

$$Tin - Tout = M \times d\omega/dt + Dg \times \omega \tag{2}$$

In the first embodiment, by incorporating Formula (1) and Formula (2) into control of the static inverter (second DC/AC conversion circuit 408), the static inverter simulates the inertial force, the synchronization force, and the braking force of the synchronous generator.

Referring again to FIG. 8, inverter current control circuit 4094 generates a control command value for control of second DC/AC conversion circuit 408 by current control. A circuit configuration and operation of inverter current control circuit 4094 are the same as those of current control circuit 2090 in FIG. 6. Inverter current control circuit 4094 differs from current control circuit 2090 in FIG. 6 only in control parameters to be used.

Inverter voltage control circuit 4095 generates a control command value for control of second DC/AC conversion circuit 408 by voltage control (a control method for outputting an AC voltage of an AC system from second DC/AC conversion circuit 408).

Third switching circuit 4096 switches a control command value from inverter current control circuit 4094 with a control command value from inverter voltage control circuit 4095, on the basis of an output of an eighth control circuit 4097.

Eighth control circuit 4097 collects: measurement results regarding DC bus 405 outputted from voltmeter 406 and the ammeter 407; measurement results regarding the AC system outputted from voltmeter 410 and ammeter 411; status information of second DC/DC conversion circuit 403 outputted from third control circuit 404; and the like. Eighth control circuit 4097 notifies DSO 21 and the like of the collected information via communication interface circuit 412.

Various control parameters of virtual synchronous generator control circuit 4093, inverter current control circuit 4094, and inverter voltage control circuit 4095 described above are also notified from eighth control circuit 4097. Further, DSO 21 is also notified of an effective voltage of the AC system measured by an effective voltmeter circuit (not illustrated) of the AC system, or active power and reactive power information measured by active and reactive power measurement circuits (not illustrated) of the AC system, via communication interface circuit 412. The measurement results of the effective voltage, the active power, and the like of the AC system are also notified to seventh control circuit 4044.

Figure 10:
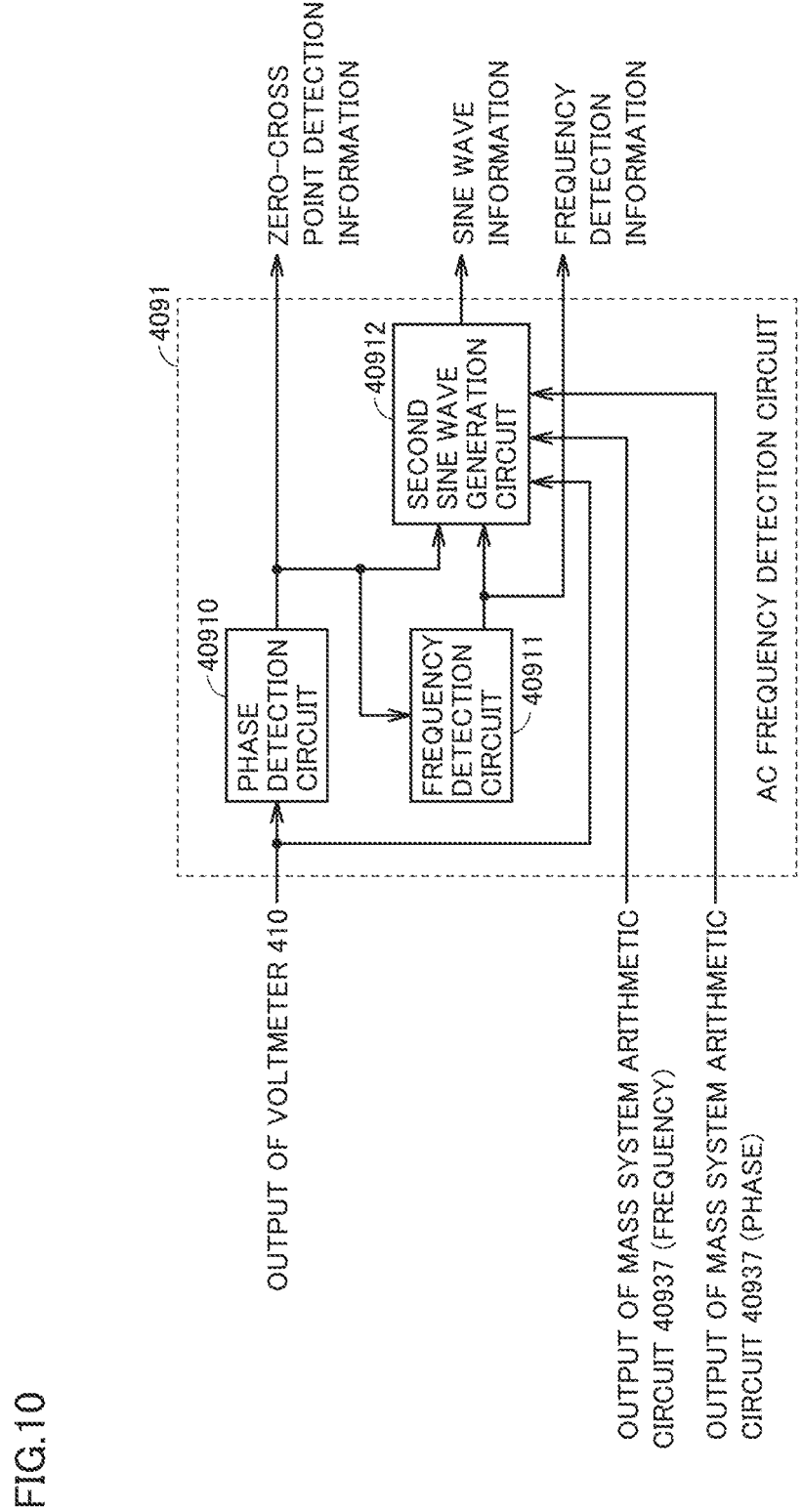
FIG. 10 is a block diagram for describing a configuration of an AC frequency detection circuit 4091 illustrated in FIG. 8.

FIG. 10 is a block diagram for describing a configuration of AC frequency detection circuit 4091 illustrated in FIG. 8.

Referring to FIG. 10, AC frequency detection circuit 4091 includes a phase detection circuit 40910, a frequency detection circuit 40911, and a second sine wave generation circuit 40912.

Phase detection circuit 40910 detects a zero-cross point from a voltage waveform of the AC system outputted from voltmeter 410. A phase detection method in phase detection circuit 40910 is not limited to the zero-cross point detection. For the zero-cross point detection in an actual machine, there is an occurrence of a detection inaccuracy (mainly an offset inaccuracy) of a zero-cross point in voltmeter 410, an amplitude detection inaccuracy (mainly a linearity inaccuracy) in voltmeter 410, an inaccuracy in a sampling period when the system AC voltage waveform is sampled, or the like. Here, the inaccuracy in the sampling period occurs due to a variation in time from carrier interruption to actual sampling when sampling is performed using a microcomputer or the like.

Frequency detection circuit 40911 detects a frequency of an AC voltage of the AC system from a cycle of a zero-cross point outputted from phase detection circuit 40910. A method of detecting the frequency of the AC voltage of the AC system is not limited to the method of detecting the frequency from the cycle of the zero-cross point.

Second sine wave generation circuit 40912 generates a sine wave synchronized with an AC voltage of the AC system, on the basis of a zero-cross point detection result in phase detection circuit 40910, a frequency detection result in frequency detection circuit 40911, and an AC voltage amplitude of the AC system outputted from DSO 21.

From AC frequency detection circuit 4091, a zero-cross point detection result, a frequency detection result, and sine wave information are outputted.

Figure 11:
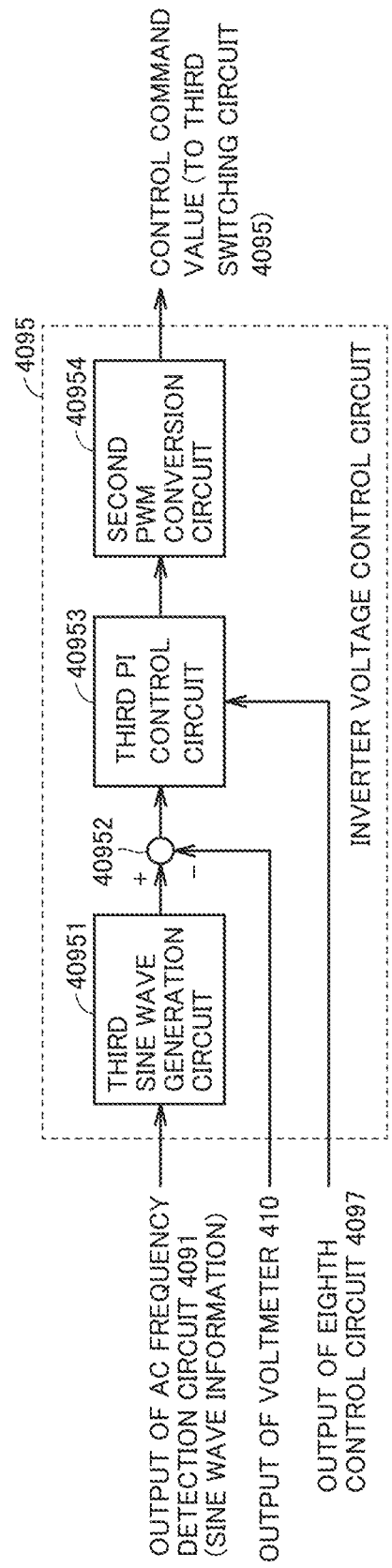
FIG. 11 is a block diagram for describing a configuration of an inverter voltage control circuit 4095 illustrated in FIG. 8.

FIG. 11 is a block diagram for describing a configuration of inverter voltage control circuit 4095 illustrated in FIG. 8.

Referring to FIG. 11, inverter voltage control circuit 4095 includes a third sine wave generation circuit 40951, a subtractor 40952, a third PI control circuit 40953, and a second PWM conversion circuit 40954.

Inverter voltage control circuit 4095 outputs a control command value for control of second DC/AC conversion circuit 408, on the basis of frequency information and phase information outputted from virtual synchronous generator control circuit 4093 to be described later in details, and on the basis of amplitude information of the AC voltage of the AC system outputted from eighth control circuit 4097.

The sine wave information from AC frequency detection circuit 4091 is inputted to third sine wave generation circuit 40951. The sine wave information includes frequency information, phase information, and amplitude information. In the first embodiment, the amplitude information may not be included in the sine wave information. This is because QV control is not performed in virtual synchronous generator control circuit 4093.

Third sine wave generation circuit 40951 generates a target value of the AC voltage of the AC system to be outputted from second DC/AC conversion circuit 408, on the basis of the inputted frequency information, phase information, and amplitude information.

Subtractor 40952 subtracts an AC voltage measured by voltmeter 410 from an output of third sine wave generation circuit 40951, and outputs a subtraction result to third PI control circuit 40953.

Third PI control circuit 40953 generates a voltage command value by PI control such that the inputted subtraction result becomes zero, and outputs the voltage command value to second PWM conversion circuit 40954. A control parameter (a control gain and integration time) of third PI control circuit is outputted from eighth control circuit 4097.

Second PWM conversion circuit 40954 performs PWM conversion on the voltage command value outputted from third PI control circuit 40953, and outputs the control command value to third switching circuit 4096.

Figure 12:
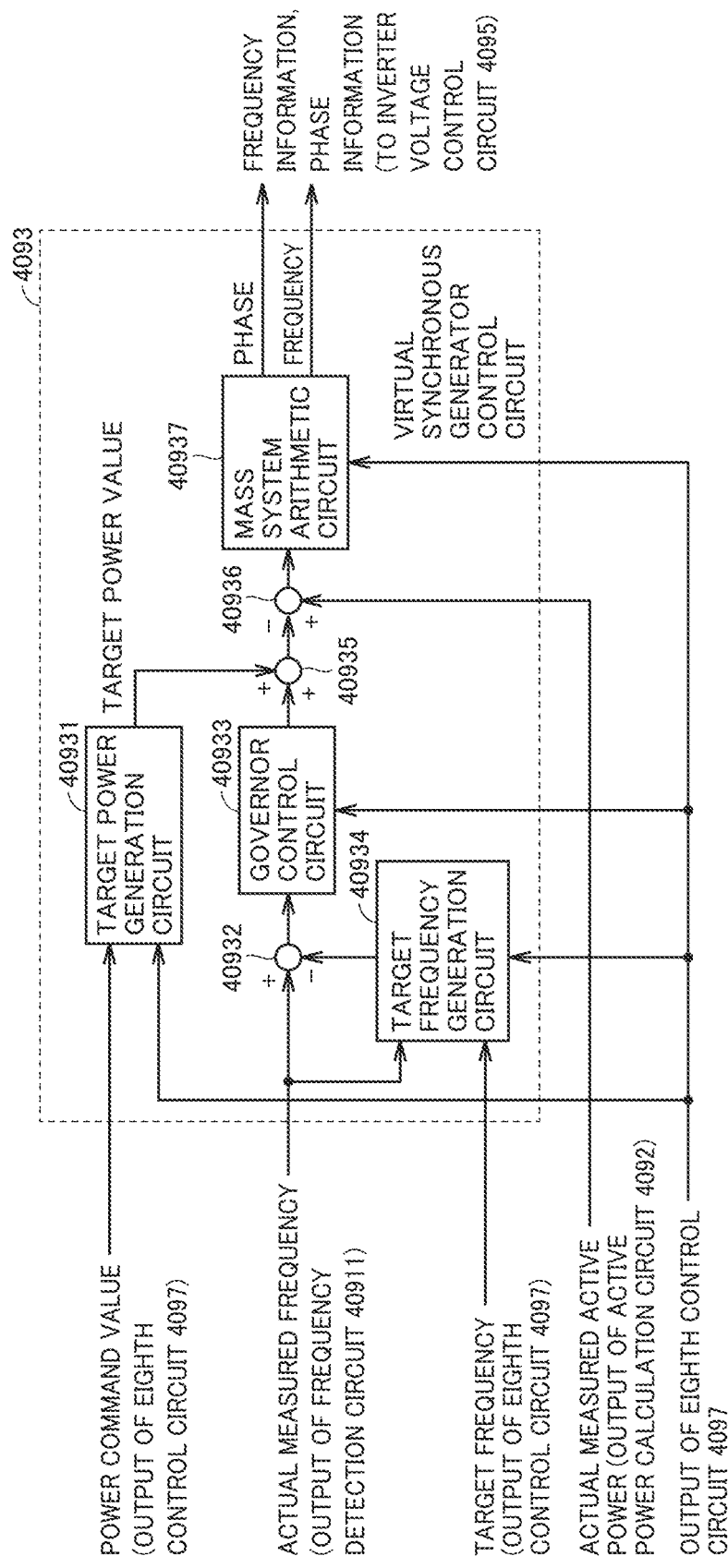
FIG. 12 is a block diagram for describing a configuration of a virtual synchronous generator control circuit 4093 illustrated in FIG. 8.

FIG. 12 is a block diagram for describing a configuration of virtual synchronous generator control circuit 4093 illustrated in FIG. 8.

Referring to FIG. 12, virtual synchronous generator control circuit 4093 includes a target power generation circuit 40931, a subtractor 40932, a governor control circuit 40933, a target frequency generation circuit 40934, an adder 40935, a subtractor 40936, and a mass system arithmetic circuit 40937.

Target power generation circuit 40931 generates a power target value of virtual synchronous generator control circuit 4093 (a target value of AC power outputted from second DC/AC conversion circuit 408 which is an inverter). The power target value is inputted to mass system arithmetic circuit 40937 via adder 40935 and subtractor 40936. Specifically, in the first embodiment, target power generation circuit 40931 outputs charging and discharging power from power distribution system storage battery 40, on the basis of the power command value (the power target value) outputted from DSO 21. When power distribution system storage battery power conversion device 41 performs charge and discharge control in system interconnection, target power generation circuit 40931 outputs the power command value from DSO 21. However, in a case where the inverter (second DC/AC conversion circuit 408) of power distribution system storage battery power conversion device 41 is newly introduced into the AC system, in the first embodiment, in order to minimize system oscillation immediately after the introduction, target power generation circuit 40931 outputs the power command value as zero immediately after the introduction, and then changes the power command value to a power command value (a power target value) Pref specified by DSO 21 over a predetermined time. In the following description, introducing and interconnecting the inverter (second DC/AC conversion circuit 408) of power distribution system storage battery power conversion device 41 into the AC system may be referred to as introducing and interconnecting power distribution system storage battery power conversion device 41 into the system.

Figure 13:
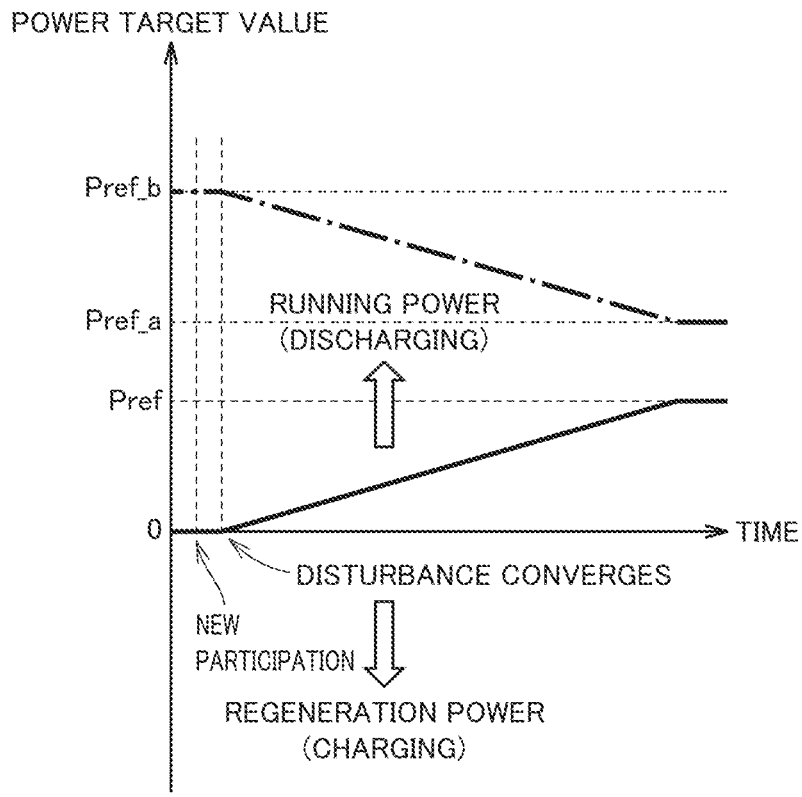
FIG. 13 is a graph for describing an operation of a target power generation circuit 40931.

FIG. 13 is a graph for describing an operation of target power generation circuit 40931. Referring to FIG. 13, an operation of target power generation circuit 40931 when power distribution system storage battery power conversion device 41 is newly introduced into the system will be described.

In a case where a power command value from DSO 21 is set to Pref at a time of new introduction, target power generation circuit 40931 outputs zero. This is because there are the following problems when newly introduced power distribution system storage battery power conversion device 41 that is not charged or discharged is controlled to output a power target value Pref immediately after the introduction. Power is supplied in balance with a load by a power generation device that has already been interconnected to the system to supply power. Here, even if power distribution system storage battery power conversion device 41 is newly introduced with voltage control, power is not immediately outputted from new power distribution system storage battery power conversion device 41. Therefore, virtual synchronous generator control circuit 4093 determines that a power consumption of the load is small, and performs control to increase a frequency of the AC voltage of the AC system to be outputted. As a result, unnecessary disturbance is to be added to the AC system from power distribution system storage battery power conversion device 41 that has been newly introduced.

Also for power distribution system storage battery power conversion device 41 that has already been interconnected to the system to supply power to the load, in the first embodiment, target power generation circuit 40931 may receive a command to change the power target value described above from Pref_b to Pref_a. At that time, in the first embodiment, it is assumed that new introduction information on power distribution system storage battery power conversion device 41 is also inputted to target power generation circuit 40931. In the new introduction of power distribution system storage battery power conversion device 41, disturbance occurs due to power supply that is not controlled from power distribution system storage battery power conversion device 41 at an introduction timing and immediately after the introduction. This causes an unnecessary disturbance to be given to a frequency of the AC voltage of the AC system to be outputted from power distribution system storage battery power conversion device 41 in system interconnection. Further, when power distribution system storage battery power conversion device 41 in system interconnection changes the power target value, magnitude of the disturbance further increases. Therefore, in the first embodiment, as indicated by a solid line in FIG. 13, for power distribution system storage battery power conversion device 41 to be newly introduced, target power generation circuit 40931 sets the power target value to zero immediately after the introduction, and gradually (for example, at a constant rate of change) increases the power target value from zero to Pref in a predetermined time after convergence of the system disturbance is confirmed. Whereas, for power distribution system storage battery power conversion device 41 that has already been interconnected to the system, target power generation circuit 40931 maintains a power target value (Pref_b) before new introduction until the system disturbance immediately after new introduction converges, and gradually (for example, at a constant rate of change) reduces the power target value from Pref_b to Pref_a in a predetermined time as indicated by a one dotted chain line in FIG. 13, after the system disturbance converges.

Note that, in the first embodiment, the power target value is controlled to be changed after convergence of the disturbance of the AC voltage of the AC system is detected, but the present disclosure is not limited to this. A similar effect can be obtained even by, for example, a configuration in which the power target value is changed when a predetermined time elapses after a new introduction command is received from DSO 21.

In the first embodiment, a case of notifying power distribution system storage battery power conversion device 41 in system interconnection of new introduction information has been described, but the present disclosure is not limited to this. For example, when receiving a command to change the power target value described above from Pref_b to Pref_a, target power generation circuit 40931 maintains the current power target value without switching the power target value for a predetermined time. In a case where a large system disturbance occurs within the time, target power generation circuit 40931 determines that power distribution system storage battery power conversion device 41 has been newly introduced, and waits for switching of the power target value until the system disturbance converges. Thereafter, target power generation circuit 40931 controls the power target value as described above. This allows a similar effect to be obtained without exchanging new addition information from DSO 21.

Target frequency generation circuit 40934 generates a frequency (a frequency target value) of a target AC voltage of virtual synchronous generator control circuit 4093. The frequency of the target AC voltage is inputted as a frequency of an AC voltage serving as a reference, to governor control circuit 40933 via subtractor 40932.

Figure 14:
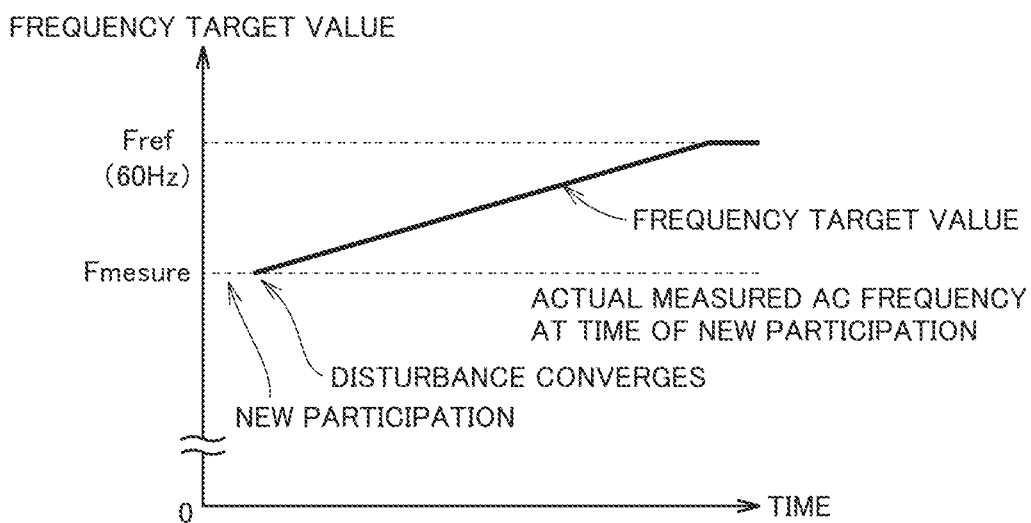
FIG. 14 is a graph for describing an operation of a target frequency generation circuit 40934.

FIG. 14 is a graph for describing an operation of target frequency generation circuit 40934. In general, a target value of a frequency of the AC voltage of the AC system is fixed (for example, 50 Hz or 60 Hz). Therefore, in the first embodiment, target frequency generation circuit 40934 sets a frequency target value of power distribution system storage battery power conversion device 41 to be newly introduced, as a frequency (Fmesure) of the AC voltage of the AC system detected by frequency detection circuit 40911 immediately before the new introduction, and maintains the value until disturbance immediately after new introduction converges (see a solid line in FIG. 14). When the disturbance convergence is detected, target frequency generation circuit 40934 gradually (for example, at a constant rate of change) changes the frequency target value from Fmesure to a predetermined frequency (for example, 60 Hz or 50 Hz) of the AC voltage of the AC system, over a predetermined time.

In the first embodiment, the frequency target value is controlled substantially at the system frequency (for example, 60 Hz or 50 Hz) and does not change significantly. Therefore, target frequency generation circuit 40934 sets the frequency target value of power distribution system storage battery power conversion device 41 originally interconnected to the system, to a frequency target value outputted from eighth control circuit 4097. This is also to give unnecessary disturbance to a state in which power supply is performed in balance with a load by a power generation device that has already been originally interconnected to the system to supply power to the system, when the control of the frequency of the AC voltage of the AC system outputted from power distribution system storage battery power conversion device 41 is started immediately after the new introduction, as described in target power generation circuit 40931. Therefore, by setting the frequency target value to the frequency (Fmesure) of the AC voltage of the detected AC system immediately after the new introduction, target frequency generation circuit 40934 can perform control without giving unnecessary disturbance to the AC system.

Referring again to FIG. 12, subtractor 40932 subtracts an output of target frequency generation circuit 40934 from an actual measurement result of a frequency outputted from frequency detection circuit 40911. The output of subtractor 40932 is inputted to governor control circuit 40933.

Governor control circuit 40933 outputs an offset to be added to a target value, which is outputted from target power generation circuit 40931, of AC power outputted from the inverter, on the basis of at least a difference between a frequency (a frequency target value) of the AC voltage serving as a reference outputted from target frequency generation circuit 40934 and a frequency (an actual measured frequency) of the AC voltage to be outputted from AC frequency detection circuit 4091.

The detailed operation of governor control circuit 40933 will be described later.

Adder 40935 adds the offset value outputted from governor control circuit 40933 and the power target value outputted from target power generation circuit 40931, to generate a control power target value of mass system arithmetic circuit 40937.

Subtractor 40936 subtracts the control power target value outputted from adder 40935, from active power outputted from active power calculation circuit 4092. The output of subtractor 40936 is inputted to mass system arithmetic circuit 40937.

By using, as an input, a difference (an output of subtractor 40936) between the output of active power calculation circuit 4092 and a sum of the offset outputted from adder 40935 and the target value of the AC power value, mass system arithmetic circuit 40937 calculates a frequency and a phase of the AC voltage of the AC system to be outputted from the inverter of power distribution system storage battery power conversion device 41 such that the difference (the output of subtractor 40936) becomes zero.

Mass system arithmetic circuit 40937 includes an inertial force simulation unit that simulates an inertial force of the synchronous generator and a braking force simulation unit that simulates a braking force.

When an inverter is newly introduced into the AC system, mass system arithmetic circuit 40937 sets at least a value of an inertia constant to be given to the inertial force simulation unit to a value larger than a value of an inertia constant during a normal operation for a predetermined time immediately after the introduction or until active power outputted from the inverter falls within a predetermined range.

When another power conversion device is newly introduced into the AC system, mass system arithmetic circuit 40937 sets at least a value of an inertia constant to be given to the inertial force simulation unit to a value larger than a value of an inertia constant during the normal operation, for a predetermined time after communication interface circuit 412 receives information on the new introduction of another power conversion device or until active power outputted from the inverter falls within a predetermined range. Details of mass system arithmetic circuit 40937 will be described later.

The power target value (Pref) and a convergence determination result of the disturbance of target power generation circuit 40931, control parameters (a proportional gain, a time constant, and the like) of governor control circuit 40933, frequency target value related information (Fmesure and AC system frequency) of target frequency generation circuit 40934, control parameters (an inertia constant, a braking coefficient, and the like) of mass system arithmetic circuit 40937 are notified from eighth control circuit 4097.

Figure 15:
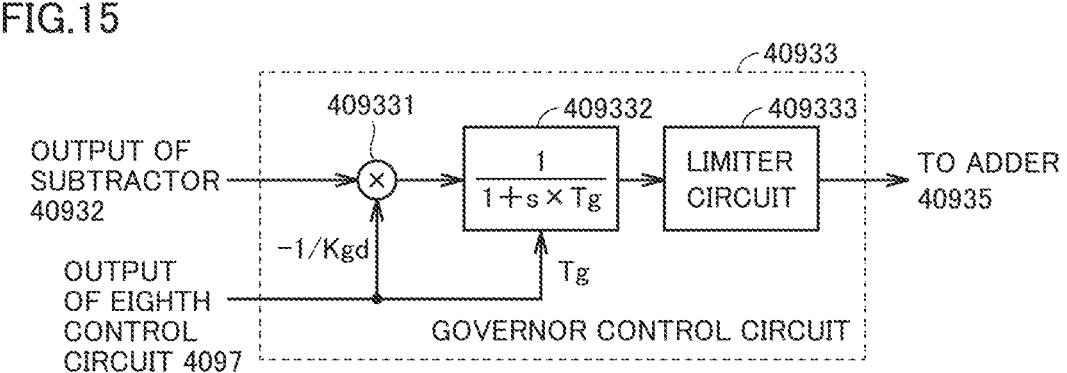
FIG. 15 is a block diagram for describing a configuration of a governor control circuit 40933 illustrated in FIG. 12.

FIG. 15 is a block diagram for describing a configuration of governor control circuit 40933 illustrated in FIG. 12.

Referring to FIG. 15, governor control circuit 40933 includes a multiplier 409331, a first-order lag system model (denoted as $1/(1+s \times Tg)$ in the figure) 409332, and a limiter circuit 409333.

Multiplier 409331 multiplies an output of subtractor 40932 by a proportional gain (denoted as $-1/Kgd$ in the figure) outputted from eighth control circuit 4097. The output of multiplier 409331 is outputted to first-order lag system model 409332. In the first embodiment, a case will be described in which governor control is performed using a standard model of a first-order lag type presented by the "Institute of Electrical Engineers of Japan". Therefore, first-order lag system model 409332 implements the model of the first-order lag system ($1/(1+s \times Tg)$) as illustrated in FIG. 15. The output of first-order lag system model 409332 is subjected to limiter processing by limiter circuit 409333 to be outputted. The output of limiter circuit 409333 is sent to adder 40935 as an offset value.

Figure 16:
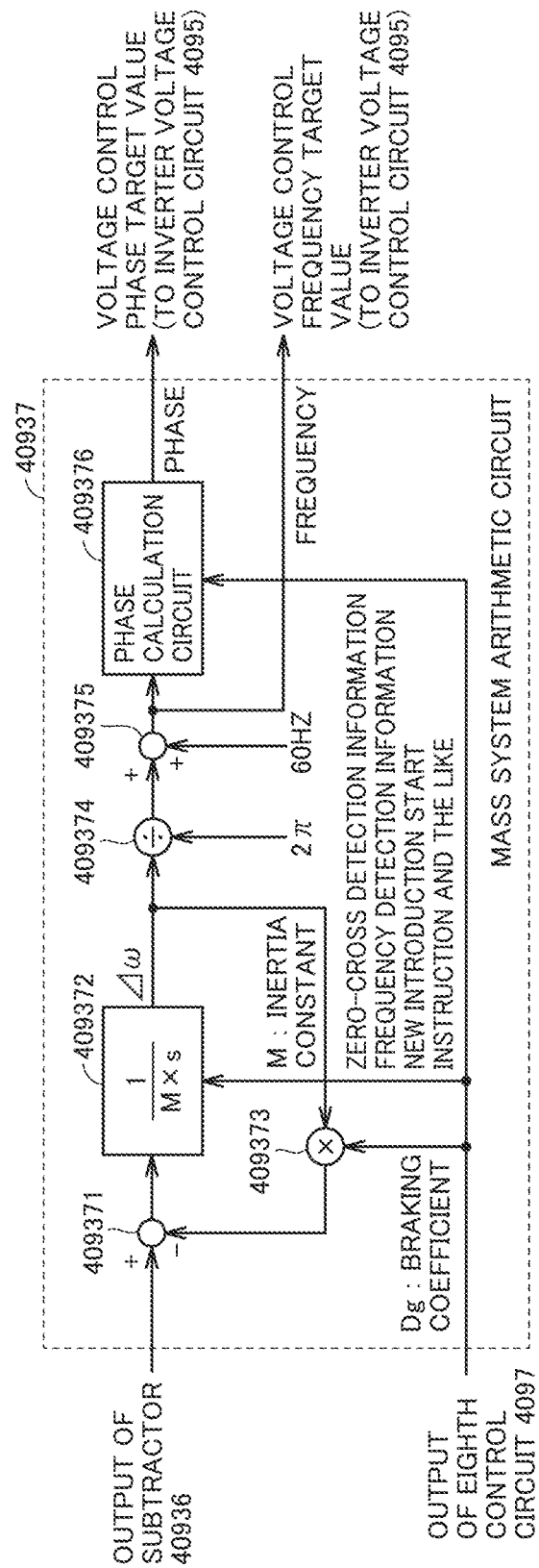
FIG. 16 is a block diagram for describing a configuration of a mass system arithmetic circuit 40937 illustrated in FIG. 12.

FIG. 16 is a block diagram for describing a configuration of mass system arithmetic circuit 40937 illustrated in FIG. 12.

Referring to FIG. 16, mass system arithmetic circuit 40937 includes a subtractor 409371, an integrator (denoted as $1/(M \times s)$ in the figure) 409372, a multiplier 409373, a divider 409374, an adder 409375, and a phase calculation circuit 409376.

Subtractor 409371 subtracts an output of multiplier 409373 from an output of subtractor 40936 (a subtraction result of actual measured active power and the power target value). The subtraction result is inputted to integrator 409372.

By integrating the output of subtractor 409371, integrator 409372 generates a difference value (Δω) between a target angular velocity (2×π×60 Hz: the frequency target value is set to 60 HZ in the first embodiment) of generator rotor 998 and an angular velocity of generator rotor 998 illustrated in FIG. 9. The output of integrator 409372 is inputted to multiplier 409373.

Multiplier 409373 multiplies the output of integrator 409372 by braking coefficient Dg outputted from eighth control circuit 4097. By subtracting the output of multiplier 409373 from the output of subtractor 40936, mass system arithmetic circuit 40937 simulates a braking force of the synchronous generator in control of second DC/AC conversion circuit 408.

The output (Δω) of integrator 409372 is divided by 2×π, and converted into frequency difference information (Δf) by divider 409374.

Adder 409375 outputs a frequency (a rotational frequency) of generator rotor 998 obtained by adding frequency difference information (Δf) and the frequency target value (60 Hz), to inverter voltage control circuit 4095 as a voltage control phase target value. The output of adder 409375 is inputted to phase calculation circuit 409376.

Phase calculation circuit 409376 calculates a phase of generator rotor 998 on the basis of an output of adder 409375 and information from eighth control circuit 4097, and outputs, as a voltage control phase target value, to inverter voltage control circuit 4095 via second sine wave generation circuit 40912 in AC frequency detection circuit 4091.

Figure 17:
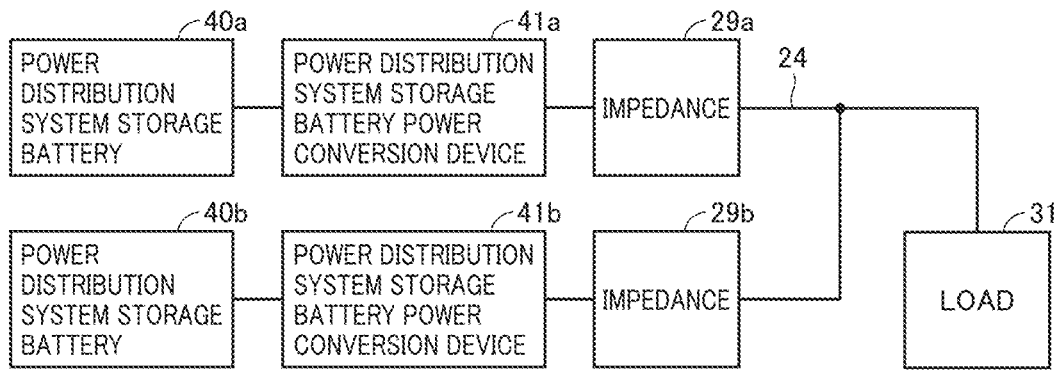
FIG. 17 is a diagram illustrating, in a simplified manner, a configuration of a power distribution system for describing an effect at a time of newly introducing power distribution system storage battery power conversion device 41.

Next, with reference to FIGS. 17 to 21, an operation outline of the first embodiment will be described. FIG. 17 is a diagram illustrating, in a simplified manner, a configuration of a power distribution system for describing an effect at a time of newly introducing power distribution system storage battery power conversion device 41. In FIG. 17, power distribution system storage battery power conversion device 41a is interconnected to an AC system, and supplies power to load 31 via an impedance 29a. Impedance 29 for power distribution system 24 is actually a resistance component and a capacity component, but is only a reactor component in the first embodiment to simplify the description. Further, power distribution system storage battery power conversion device 41b to be newly introduced is connected to load 31 via an impedance 29b.

A description will be given to an operation in a case where, in this configuration, an instruction is issued from DSO 21 to power distribution system storage battery power conversion device 41b to perform interconnection using Pref as a power target value. At that time, power distribution system storage battery power conversion device 41a is also notified of the new introduction of power distribution system storage battery power conversion device 41b, and of an instruction to switch the power target value from Pref_b to Pref_a. When receiving the new introduction instruction via communication interface circuit 412, fourth control circuit 409 outputs an activation instruction for second DC/DC conversion circuit 403 to third control circuit 404, to activate second DC/AC conversion circuit 408. Specifically, fourth control circuit 409 introduces a relay or the like (not illustrated), boosts DC bus 405 to a predetermined voltage, and then connects an output of second DC/AC conversion circuit 408 to the AC system.

When the activation of second DC/DC conversion circuit 403 and second DC/AC conversion circuit 408 is completed, eighth control circuit 4097 in fourth control circuit 409 starts control for new introduction. Similarly, third control circuit 404 also starts control for new introduction.

When control for new introduction is started in fourth control circuit 409, first, AC frequency detection circuit 4091 detects a frequency and a phase of the AC voltage of the AC system on the basis of an output of voltmeter 410. At this time, power (a current) is not outputted from power distribution system storage battery power conversion device 41b. Therefore, an AC voltage waveform at a system interconnection point (a point between power distribution system storage battery power conversion device 41b and impedance 29b) of power distribution system storage battery power conversion device 41b is equal to a voltage waveform of the AC system inputted to load 31. Therefore, if it is possible to newly introduce power distribution system storage battery power conversion device 41b at the frequency and the phase of the AC voltage of the AC system at the system interconnection point of power distribution system storage battery power conversion device 41b, power distribution system storage battery power conversion device 41b can be newly introduced without disturbing the AC system. However, as described above, a measurement result of voltmeter 410 includes an inaccuracy. Specifically, the measurement result of voltmeter 410 includes an offset inaccuracy of voltmeter 410, an inaccuracy due to linearity, and the like.

As described above, for example, when a zero-cross point is detected on the basis of the output of voltmeter 410 including the inaccuracy, when the offset inaccuracy is, for example, −5 V with respect to 200 V of the effective voltage, and when the AC voltage of the AC system is generated on the basis of zero-cross point information detected by AC frequency detection circuit 4091, the AC voltage of the AC system outputted from power distribution system storage battery power conversion device 41b has a lagging phase with respect to the AC voltage of the AC system supplied to load 31.

Figure 18:
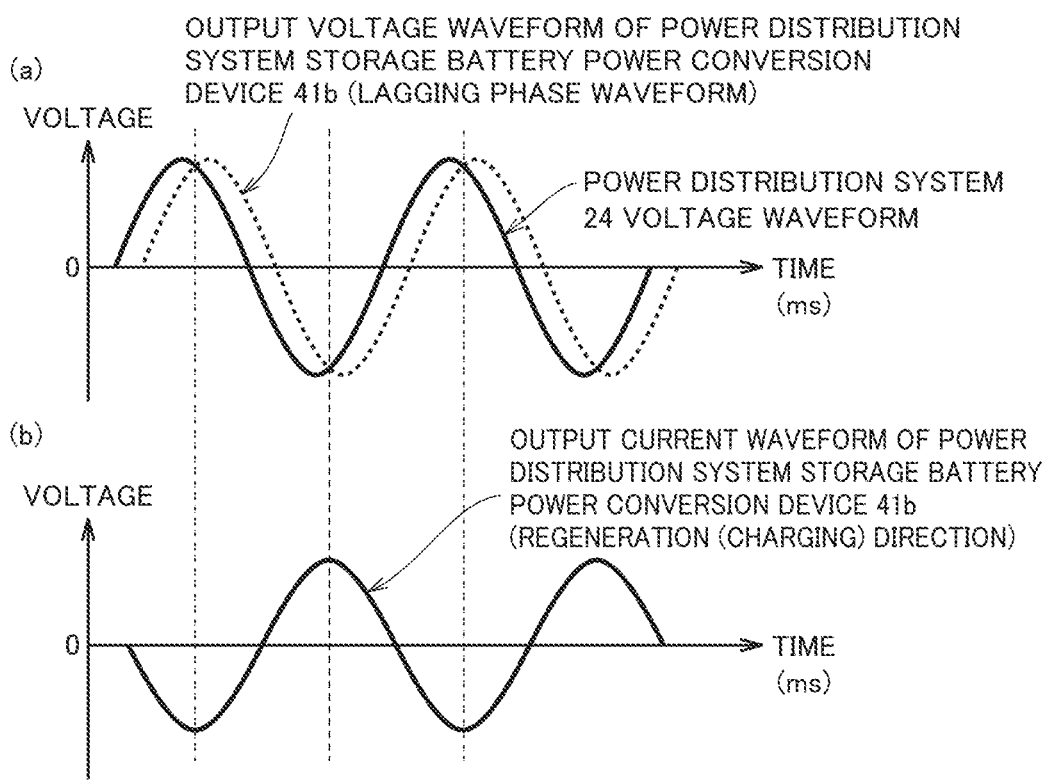
FIG. 18(a) is graph illustrating an AC voltage waveform of power distribution system 24 at a connection point of a load 31 when a power distribution system storage battery power conversion device 41b is introduced with a lagging phase, and an AC voltage waveform of an AC system outputted from power distribution system storage battery power conversion device 41b.
FIG. 18(b) is a graph illustrating an output current waveform of power distribution system storage battery power conversion device 41b.
Figure 19:
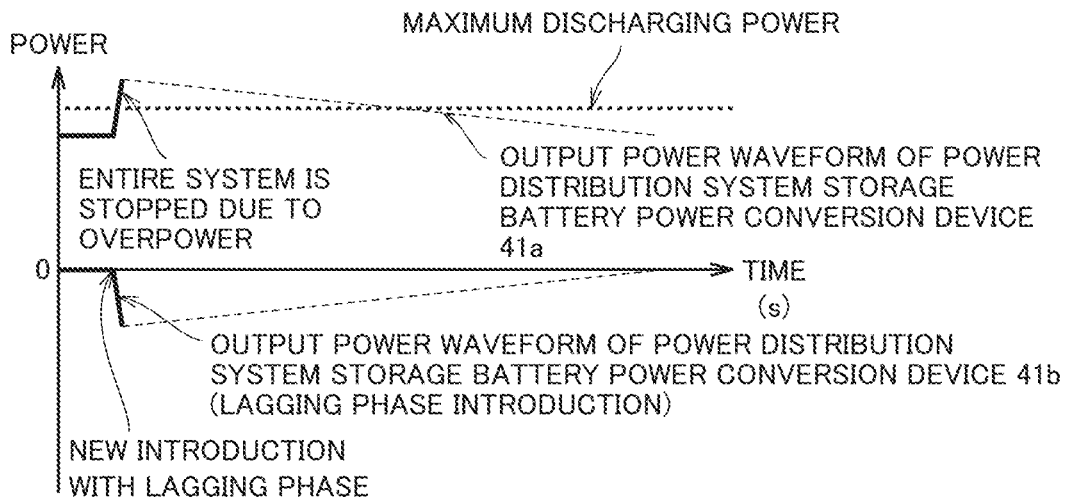
FIG. 19 is a graph illustrating charging and discharging power (an effective value) of two power distribution system storage battery power conversion devices 41a and 41b, when an AC voltage phase of newly introduced power distribution system storage battery power conversion device 41b is a lagging phase.

Hereinafter, with reference to FIGS. 18 and 19, a description will be given to an outline of an operation in which the AC voltage of the AC system of power distribution system storage battery power conversion device 41 is outputted with a lagging phase. FIG. 18 is a graph illustrating a relationship between an AC voltage and an AC current to be outputted when the voltage phase of the AC system of newly introduced power distribution system storage battery power conversion device 41b is a lagging phase. FIG. 19 illustrates charging and discharging power (an effective value) of two power distribution system storage battery power conversion devices 41a and 41b, in a case where the AC voltage phase of newly introduced power distribution system storage battery power conversion device 41b is a lagging phase. Note that time axis scales in FIGS. 18 and 19 are different. A horizontal axis of FIG. 18 is on an order of ms, whereas a horizontal axis of FIG. 19 is on an order of seconds (s).

FIG. 18(*a*) is a graph illustrating an AC voltage waveform of power distribution system 24 at a connection point of load 31 when power distribution system storage battery power conversion device 41b is introduced with a lagging phase, and an AC voltage waveform of the AC system outputted from power distribution system storage battery power conversion device 41b. FIG. 18(*b*) is a graph illustrating an output current waveform of power distribution system storage battery power conversion device 41b.

As illustrated in FIG. 18(*a*), since the phase of the AC voltage of the AC system outputted from power distribution system storage battery power conversion device 41b is a lagging phase, a current flowing through impedance 29b (a current outputted from power distribution system storage battery power conversion device 41b) is as illustrated in FIG. 18(b). Therefore, when power distribution system storage battery power conversion device 41b is newly introduced with a lagging phase, as illustrated in FIG. 18(b), power flows in a direction (a regeneration direction) of charging power, to power distribution system storage battery power conversion device 41b.

Therefore, since power is charged in power distribution system storage battery power conversion device 41b at the time of new introduction, power distribution system storage battery power conversion device 41a increases discharging power to cover the charging power of power distribution system storage battery power conversion device 41b. FIG. 19 illustrates temporal transitions of active power outputted from power distribution system storage battery power conversion device 41a and power distribution system storage battery power conversion device 41b. As can be seen from FIG. 19, power distribution system storage battery power conversion device 41a covers charging power of power distribution system storage battery power conversion device 41b with discharging power of the self.

In general, efficiency of a power conversion device including a storage battery is higher as power is closer to a rated power. Therefore, when it is predicted that power supplied to load 31 by power distribution system storage battery power conversion device 41a will be insufficient, DSO 21 activates power distribution system storage battery power conversion device 41b. In the first embodiment, it is assumed that, when the charging and discharging power exceeds 90% of a rated capacity of power distribution system storage battery power conversion device 41a, control is performed to newly add power distribution system storage battery power conversion device 41b. In this case, when newly introduced power distribution system storage battery power conversion device 41b is activated by charging, the rated capacity of power distribution system storage battery power conversion device 41a may be exceeded as illustrated in FIG. 19. In this case, power distribution system storage battery power conversion device 41a may stop due to overload, and power supply to power distribution system 24 may be stopped.

The power charged by power distribution system storage battery power conversion device 41b is determined by a difference in voltage phase (magnitude of a lagging phase) of an AC voltage waveform of the AC system at a system interconnection point between power distribution system storage battery power conversion device 41b and load 31. Specifically, the charging power becomes larger as the phase difference is larger.

Figure 20:
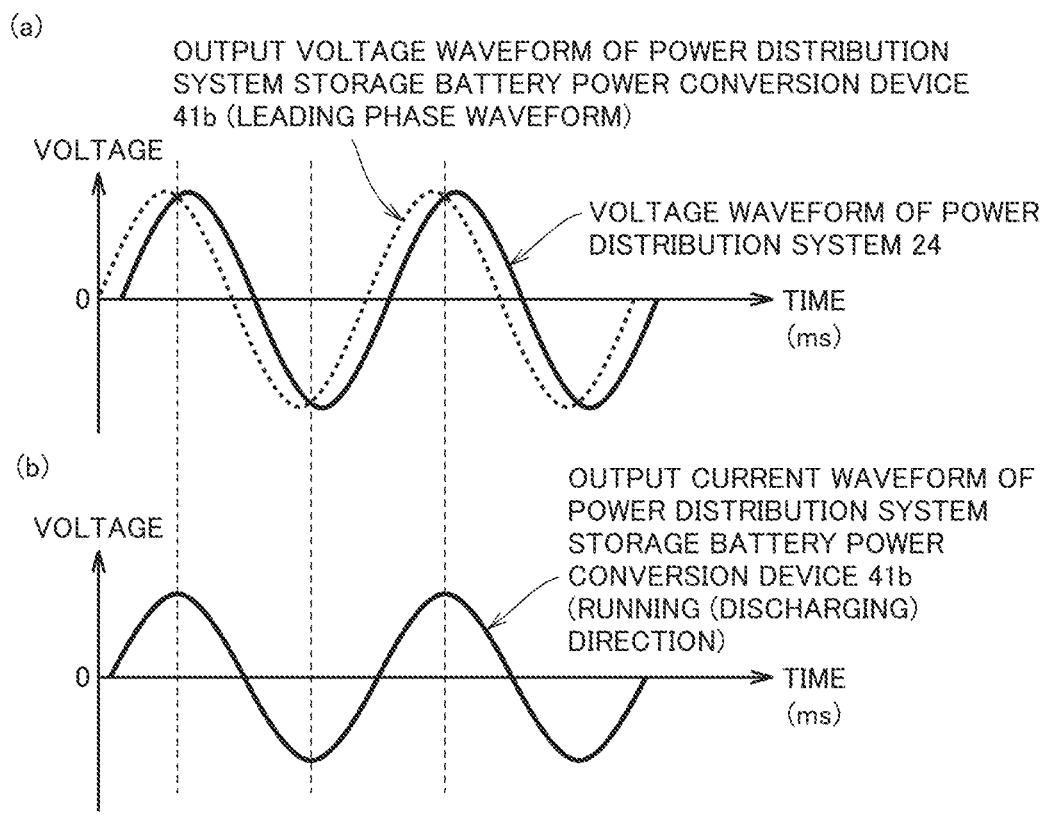
FIG. 20(a) is graph illustrating an AC voltage waveform of power distribution system 24 at a connection point of load 31 when power distribution system storage battery power conversion device 41b is introduced with a leading phase, and an AC voltage waveform of an AC system outputted from power distribution system storage battery power conversion device 41b.
FIG. 20(b) is a graph illustrating an output current waveform of power distribution system storage battery power conversion device 41b.
Figure 21:
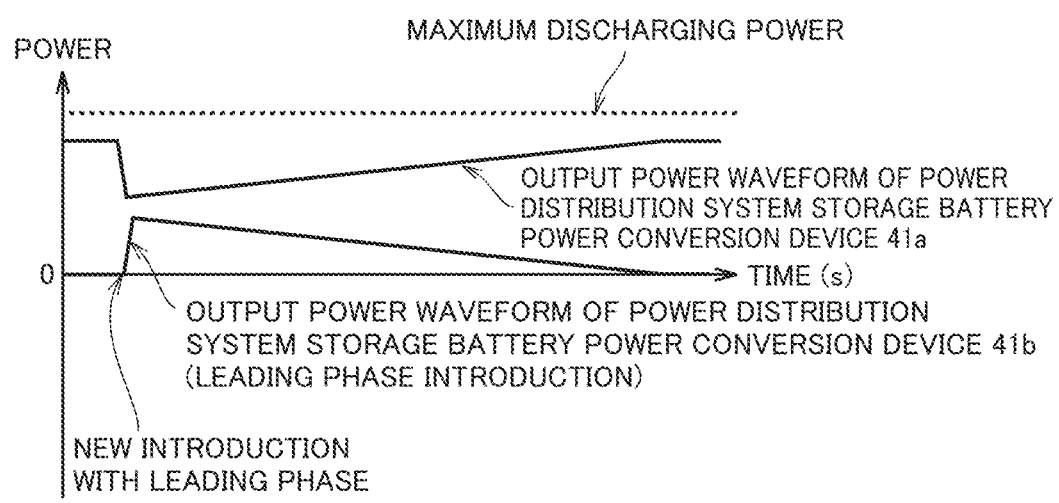
FIG. 21 is a graph illustrating charging and discharging power (an effective value) of two power distribution system storage battery power conversion devices 41a and 41b, when an AC voltage phase of newly introduced power distribution system storage battery power conversion device 41b is a leading phase.

Similarly, with reference to FIGS. 20 and 21, a description will be given to an outline of an operation in which the AC voltage of the AC system of power distribution system storage battery power conversion device 41 is outputted with a leading phase. FIG. 20 is a graph illustrating a relationship between an AC voltage and an AC current to be outputted when the voltage phase of the AC system of newly introduced power distribution system storage battery power conversion device 41b is a leading phase. FIG. 21 is a graph illustrating charging and discharging power (an effective value) of two power distribution system storage battery power conversion devices 41a and 41b, when an AC voltage phase of newly introduced power distribution system storage battery power conversion device 41b is a leading phase. Time axis scales in FIGS. 20 and 21 are different. A horizontal axis of FIG. 20 is on an order of ms, whereas a horizontal axis of FIG. 21 is on an order of seconds (s).

FIG. 20(a) is graph illustrating an AC voltage waveform of power distribution system 24 at a connection point of load 31 when power distribution system storage battery power conversion device 41b is introduced with a leading phase, and an AC voltage waveform of an AC system outputted from power distribution system storage battery power conversion device 41b. FIG. 20(b) is a graph illustrating an output current waveform of power distribution system storage battery power conversion device 41b. As illustrated in FIG. 20(a), since the phase of the AC voltage of the AC system outputted from power distribution system storage battery power conversion device 41b is a leading phase, a current flowing through impedance 29b (a current outputted from power distribution system storage battery power conversion device 41b) is as illustrated in FIG. 20(b). Therefore, when power distribution system storage battery power conversion device 41b is newly introduced with a leading phase, as illustrated in FIG. 20(b), power flows in a direction (a running direction) of discharging power, to power distribution system storage battery power conversion device 41b.

Therefore, in the first embodiment, when second DC/AC conversion circuit 408 (an inverter) is introduced into the AC system, fourth control circuit 409 (an inverter control circuit) sets a frequency of an AC voltage target value to a frequency of an AC voltage detected by AC frequency detection circuit 4091, and controls a phase of the AC voltage target value to be at least a leading phase with respect to the AC voltage of the AC system when a target value of the AC power is in a running direction.

Therefore, since power is discharged to power distribution system storage battery power conversion device 41b at the time of new introduction, power distribution system storage battery power conversion device 41a reduces discharging power by an amount of discharging power of power distribution system storage battery power conversion device 41b. FIG. 21 illustrates temporal transitions of active power outputted from power distribution system storage battery power conversion device 41a and power distribution system storage battery power conversion device 41b. As can be seen from FIG. 21, a state is illustrated in which the discharging power of power distribution system storage battery power conversion device 41a and the discharging power of power distribution system storage battery power conversion device 41b are combined and supplied to load 31.

As illustrated in FIG. 21, since power distribution system storage battery power conversion device 41a and power distribution system storage battery power conversion device 41b supply power to load 31 by sharing, there is no problem such as stop due to overload that has occurred when new introduction is made with a lagging phase.

Note that the power discharged by power distribution system storage battery power conversion device 41b is determined by a phase difference (magnitude of the leading phase) between a phase of the voltage of power distribution system storage battery power conversion device 41b and a phase of the AC voltage of the AC system at the system interconnection point of load 31. Specifically, the discharging power becomes larger as the phase difference is larger.

As described above, when the power conversion device is newly introduced as a voltage source to the system, and the power conversion device is introduced as an energy generation device, the introduction is made such that the AC voltage of the AC system to be outputted from the power conversion device has a leading phase with respect to the AC voltage phase at the system interconnection point immediately before the new introduction. As a result, it is possible to prevent stop, due to overload, of the power conversion device that has been operating as a voltage source before introduction, since the power conversion device to be newly introduced outputs power in the running direction (the discharging direction), even when an inaccuracy occurs in a detection result such as a zero-cross point due to an influence of a sensor inaccuracy of a voltmeter or the like. Further, when the power conversion device in system interconnection is operating in the charging direction (charging excess power), the power conversion device is newly introduced with a lagging phase. As a result, since the newly introduced power conversion device operates in the regeneration direction (the charging direction), it is possible to prevent stop, due to overload, of the power conversion device that has been operating as the voltage source before the introduction of the power conversion device. Note that the new introduction with a lagging phase will be described later.

Although the power distribution system has been described as an example in the first embodiment, the present disclosure is not limited to this, and a similar effect can be obtained even when the present disclosure is applied to a power transmission system. Furthermore, it is needless to say that a similar effect can be obtained even when the connection is made to a private distribution line. In addition, a stand-alone system such as a microgrid has a similar effect.

Next, referring to FIGS. 1 to 26, a specific operation of the power conversion device of the first embodiment will be described. Referring again to FIG. 1, a power distribution system to which the power conversion device according to the first embodiment is connected will be described. In the first embodiment, in power distribution system 24, in order to control a power distribution system voltage within a predetermined voltage, three SVRs 23 are connected in series between substation 20 and mega-solar power conversion device 27 (alternatively, power distribution system storage battery power conversion device 41 and town D 100d). Near mega-solar power conversion device 27, power distribution system storage battery power conversion device 41a is installed. In the first embodiment, power distribution system storage battery power conversion device 41a operates as a voltage source. By operating virtual synchronous generator control circuit 4093, slack of generated power of mega solar 26 is removed.

As loads, there are town A 100a, town B 100b, town C 100c, town D 100d, factory 101, building 102, and apartment building 103. The load is supplied with power supplied from substation 20, generated power of mega solar 26, and power supplied from power distribution system storage battery 40a. Near substation 20, power distribution system storage battery 40c and power distribution system storage battery power conversion device 41c are disposed. Near town B 100b, power distribution system storage battery 40b and power distribution system storage battery power conversion device 41b are disposed. Furthermore, synchronous generator 30a is disposed in factory 101. For building 102, synchronous generator 30b is disposed for emergency.

Here, a description is given to an operation when power distribution system storage battery 40b is newly added to a system in which power distribution system 24 is supported by power supplied from substation 20, generated power of mega solar 26 (mega-solar power conversion device 27 operates with a current source), and discharging power outputted from power distribution system storage battery 40a.

Figure 22:
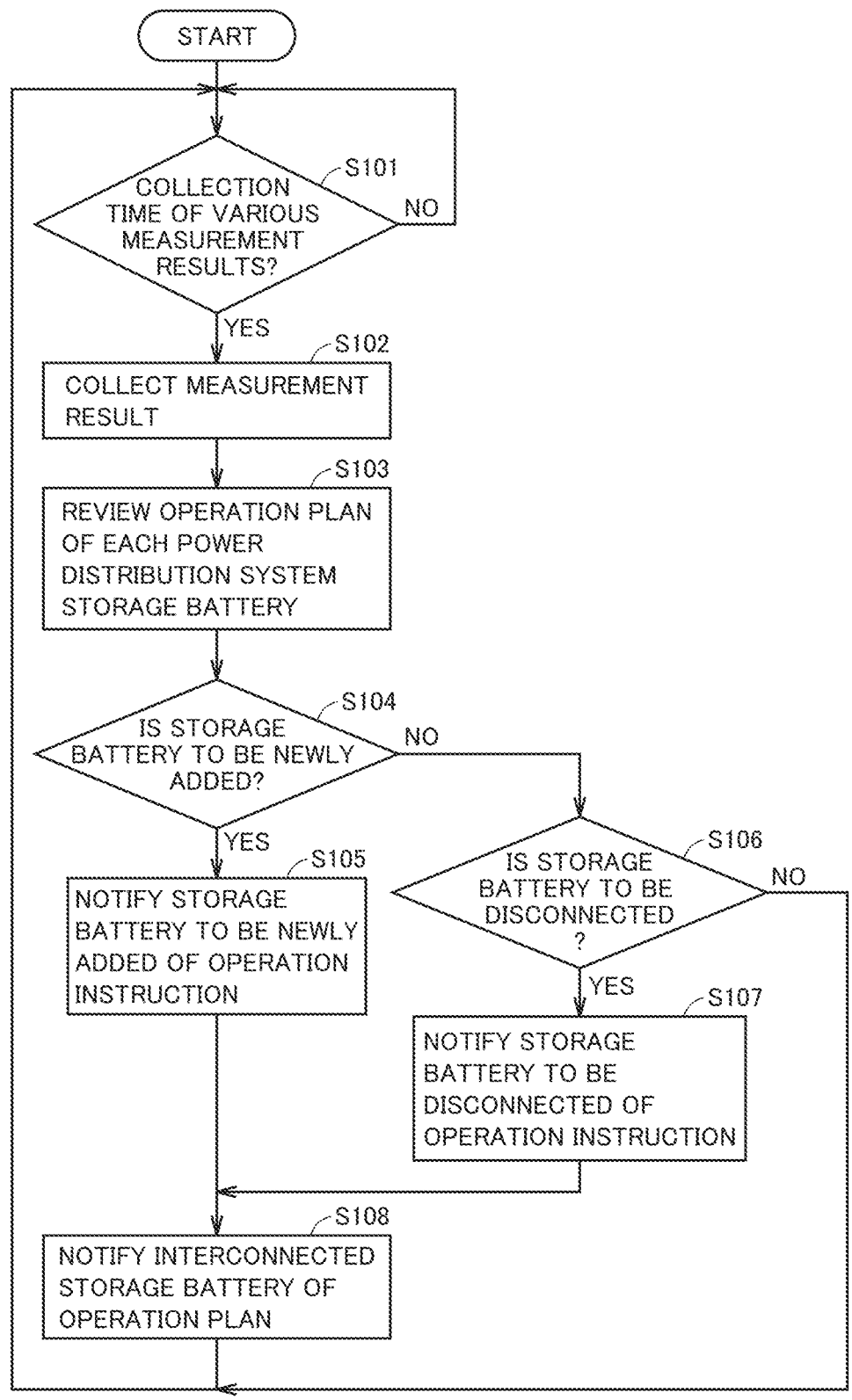
FIG. 22 is a flowchart illustrating an operation of a DSO 21 when power distribution system storage battery power conversion device 41b is newly introduced into a power distribution system.

FIG. 22 is a flowchart illustrating an operation of DSO 21 when power distribution system storage battery power conversion device 41b is newly introduced into a power distribution system.

Referring to FIG. 22, in step S101, DSO 21 confirms whether the current time is collection time of various measurement results. DSO 21 confirms whether the current time is collection time of various types of measurement data, and waits until the current time becomes the collection time in a case where the current time is not the collection time.

When the current time is the collection time of various types of measurement data, the process proceeds to step S102.

In step S102, in the first embodiment, DSO 21 collects, in a cycle of one minute, measurement information of substation 20, measurement information of voltmeter 22, information on SVR 23, measurement information (generated power and the like) of mega-solar power conversion device 27, and measurement information (charging and discharging power, a state of charge (SOC), status information, and the like) of power distribution system storage battery power conversion device 41.

In step S103, DSO 21 reviews an operation plan of each power distribution system storage battery 40.

In step S104, DSO 21 determines whether or not new additional introduction of power distribution system storage battery 40 is necessary. Specifically, DSO 21 determines that, from the collected data, addition is necessary when current power distribution system storage battery 40a cannot supply power. The case where current power distribution system storage battery 40a cannot supply power is a case where current power distribution system storage battery power conversion device 41a is operating at greater than or equal to 90% of the rated capacity, or a case where the SOC is less than 10%.

When it is determined that addition is necessary, the process proceeds to step S105, and when it is not determined that addition is necessary, the process proceeds to step S106.

In step S105, DSO 21 notifies power distribution system storage battery power conversion device 41b to be newly added of a new entry request (instruction) and power target value Pref. Thereafter, the process proceeds to step S108.

In step S106, DSO 21 determines whether or not power distribution system storage battery 40 is to be disconnected. Specifically, in a case where power to be supplied to power distribution system 24 is sufficiently provided, and power distribution system 24 is not affected even if power distribution system storage battery 40a is disconnected, or in a case where the SOC of power distribution system storage battery 40 is less than or equal to a predetermined value (in a case where there is a risk of overdischarge), or the like, DSO 21 determines to disconnect power distribution system storage battery power conversion device 41. When it is determined that power distribution system storage battery 40 is to be disconnected, the process proceeds to step S107. When it is not determined that power distribution system storage battery 40 is to be disconnected, the process returns to step 101.

In S107, DSO 21 notifies power distribution system storage battery power conversion device 41 to be disconnected of a disconnection instruction. Thereafter, the process proceeds to step S108.

In step S108, DSO 21 notifies power distribution system storage battery power conversion device 41 that is not added or disconnected that another power distribution system storage battery power conversion device 41 is to be newly introduced or disconnected, and all power distribution system storage battery power conversion devices 41 interconnected to the system is notified of a power target value Prefa of new addition or a power target value after disconnection. After step S108, the process returns to step S101.

Figure 23:
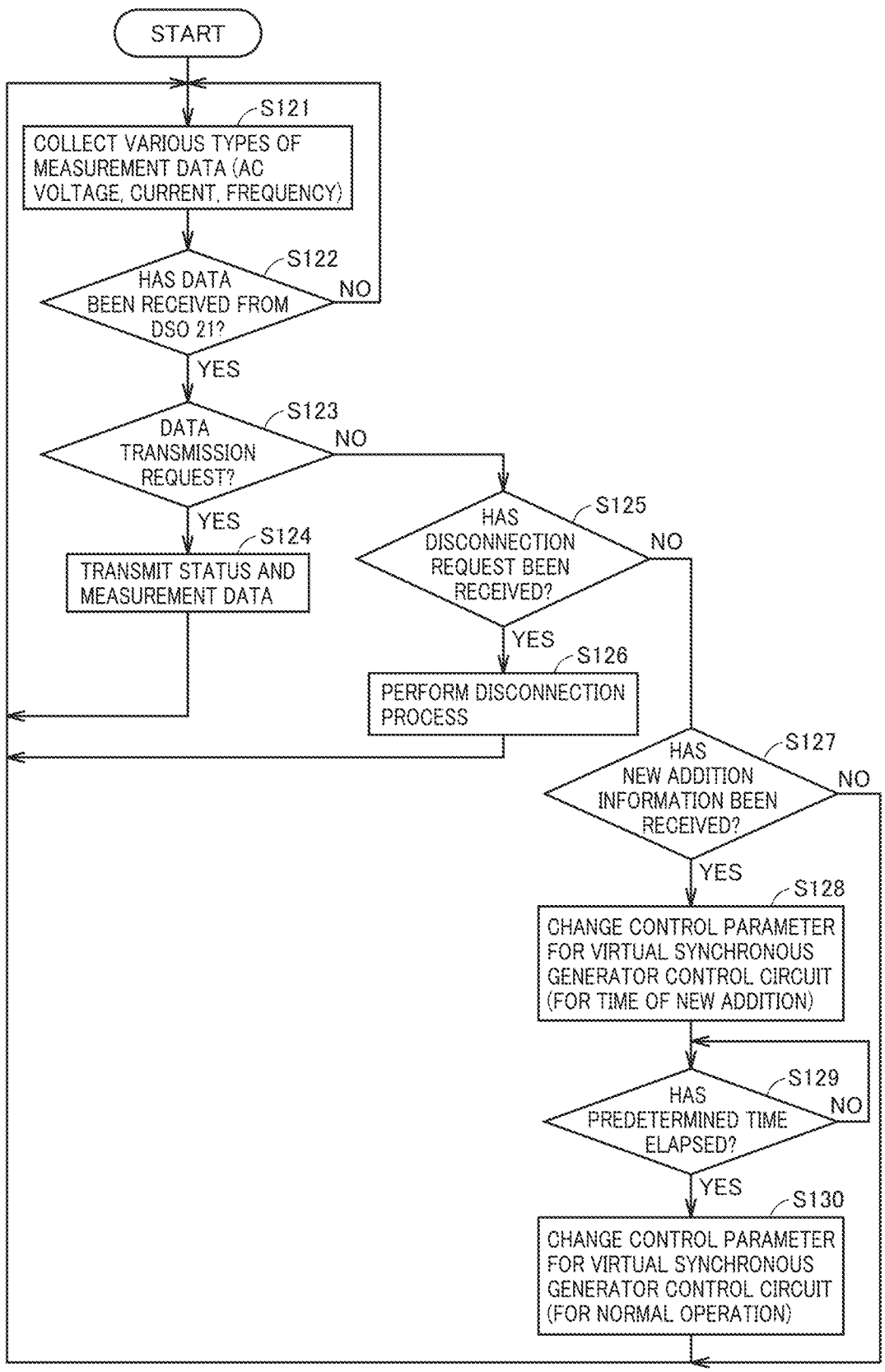
FIG. 23 is a flowchart illustrating an operation procedure of power distribution system storage battery power conversion device 41a in system interconnection.

FIG. 23 is a flowchart illustrating an operation procedure of power distribution system storage battery power conversion device 41*a* interconnected to the system.

In step S121, power distribution system storage battery power conversion device 41*a* collects various types of measurement data. Specifically, power distribution system storage battery power conversion device 41*a* collects measured voltages of voltmeters 401, 406, and 410. Since a measurement result of voltmeter 410 is an AC voltage, fourth control circuit 409 calculates an effective voltage and sets as a measured voltage. Power distribution system storage battery power conversion device 41*a* collects measured currents of ammeters 402, 407, and 411. Since a measurement result of ammeter 411 is an AC current, fourth control circuit 409 calculates an effective current and sets as the measured current. Power distribution system storage battery power conversion device 41*a* collects status information (such as an SOC) of power distribution system storage battery 40*a*.

In step S122, in a case where communication interface circuit 412 has received data from DSO 21, the process proceeds to step S123. In a case where communication interface circuit 412 does not receive data from DSO 21, the processing in step S121 continues.

In step S123, fourth control circuit 409 in power distribution system storage battery power conversion device 41*a* determines whether or not the received data is a data transmission request. In a case where it is determined that the received data is a data transmission request, the process proceeds to step S124. In a case where it is determined that the received data is not a data transmission request, the process proceeds to step S125.

In step S124, fourth control circuit 409 transmits the measurement result described above to DSO 21 via communication interface circuit 412. Thereafter, the process returns to step S121.

In step S125, fourth control circuit 409 determines whether or not a disconnection request from DSO 21 or a notification of the presence of power distribution system storage battery 40 to be disconnected has been received. When the disconnection request or the notification of the presence of power distribution system storage battery 40 to be disconnected is received, the process proceeds to step S126. When the disconnection request or the notification of the presence of power distribution system storage battery 40 to be disconnected is not received, the process proceeds to step S127.

In step S126, power distribution system storage battery power conversion device 41*a* starts a disconnection process. Thereafter, the process returns to step S121.

The processing in steps S127 to S130 will be described later.

Figure 24:
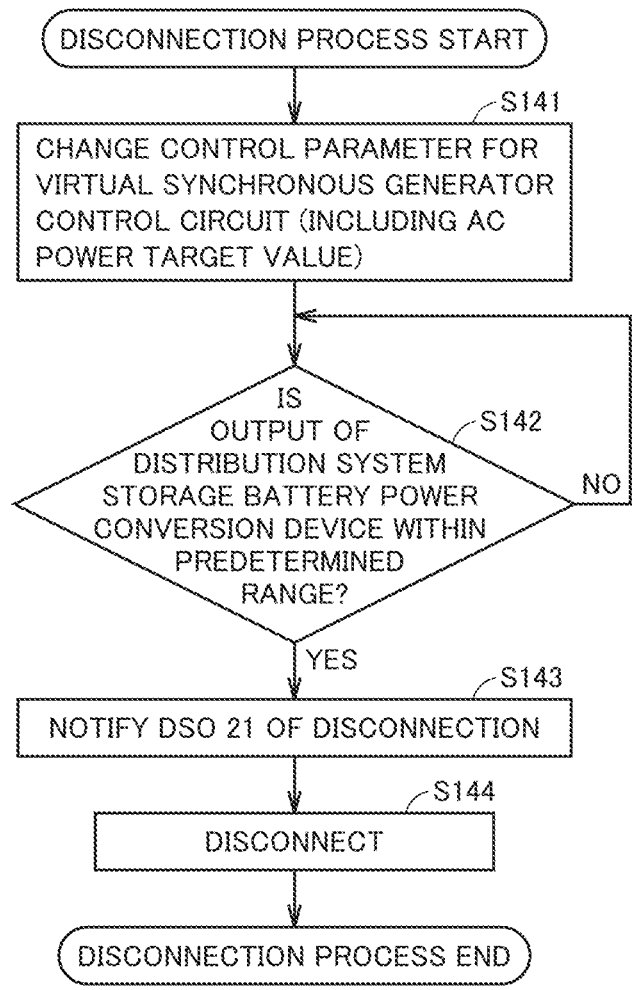
FIG. 24 is a flowchart illustrating a control process at a time of disconnection of power distribution system storage battery power conversion device 41.

FIG. 24 is a flowchart illustrating a control process at a time of disconnection of power distribution system storage battery power conversion device 41.

In step S141, when fourth control circuit 409 receives the disconnection request or the presence of power distribution system storage battery 40 to be disconnected, fourth control circuit 409 changes control parameters in governor control circuit 40933 and mass system arithmetic circuit 40937 in virtual synchronous generator control circuit 4093. Fourth control circuit 409 of power distribution system storage battery power conversion device 41 that is not to be disconnected also performs similar processing. Specifically, in order to suppress system disturbance due to the disconnection, fourth control circuit 409 makes a value of a time constant or a value of an inertia constant of control parameters in governor control circuit 40933 and mass system arithmetic circuit 40937 to be larger than values during the normal operation. In the first embodiment, fourth control circuit 409 sets different values for a control parameter for power distribution system storage battery power conversion device 41 to be disconnected and a control parameter for power distribution system storage battery power conversion device 41 that continues to operate without being disconnected. More specifically, fourth control circuit 409 sets at least a time constant Tg in governor control circuit 40933 to be larger for power distribution system storage battery power conversion device 41 to be disconnected than power distribution system storage battery power conversion device 41 that continues operation without being disconnected.

The reason for such setting is as follows. In a case of disconnecting power distribution system storage battery power conversion device 41, power distribution system 24 is to be supported by a distributed power supply including power distribution system storage battery power conversion device 41 that is not disconnected. Therefore, the distributed power supply or power distribution system storage battery power conversion device 41 that is not to be disconnected is to be in charge of power that has been discharged or charged by power distribution system storage battery power conversion device 41 that has received the disconnection instruction. In the first embodiment, DSO 21 notifies each distributed power supply (including power distribution system storage battery power conversion device 41) connected to power distribution system 24, of a power target value after the disconnection together with disconnection information of power distribution system storage battery power conversion device 41. In the first embodiment, in power distribution system storage battery power conversion device 41 that has received the disconnection instruction, target power generation circuit 40931 narrows a target value (a power target value) of AC power outputted from the inverter to "zero" for a predetermined time or at a predetermined slope from a target value before the reception of the disconnection instruction.

Whereas, in power distribution system storage battery power conversion device 41 that has not received the disconnection instruction, target power generation circuit 40931 sets the power target value to the power target value notified when the disconnection information is received, for a predetermined time or a predetermined slope from the target value before the reception of the disconnection instruction.

With the control as described above, when power distribution system storage battery power conversion device 41 is disconnected, it is possible to minimize disturbance in power distribution system 24 caused by the disconnection.

However, even when the control is performed as described above, a frequency and a phase of the system AC voltage change even in a case where there is no fluctuation in the load and the generated power of mega solar 26 at the time of disconnection of power distribution system storage battery power conversion device 41, due to an influence of a change timing of the power target value or the like. Following this, when each power distribution system storage battery power conversion device 41 changes the frequency and the phase of the system AC voltage, unnecessary disturbance is to be applied to power distribution system 24. Therefore, in the first embodiment, eighth control circuit 4097 sets at least a value of a control parameter (a proportional gain and a time constant) in governor control circuit 40933 and a value of a control parameter (an inertia constant and a braking coefficient) in mass system arithmetic circuit 40937 to be larger than values during normal control. This makes it possible to suppress disturbance (variation in frequency and phase of the AC voltage of the AC system) on power distribution system 24 accompanying the change of the power target value.

Furthermore, even in a case where the load and the generated power of mega solar 26 fluctuate, eighth control circuit 4097 sets time constant Tg in governor control circuit 40933 and a value of inertia constant M in mass system arithmetic circuit 40937 for power distribution system storage battery power conversion device 41 to be disconnected than power distribution system storage battery power conversion device 41 that is not disconnected. As a result, an offset value to be added to a power target value outputted from governor control circuit 40933 can be suppressed to be smaller in power distribution system storage battery power conversion device 41 that is disconnected than that in power distribution system storage battery power conversion device 41 that is not disconnected, so that disconnection operation can be smoothly performed. That is, since most of the output fluctuation of load 31 and mega solar 26 can be covered by power distribution system storage battery power conversion device 41 that is not disconnected, it is possible to minimize the output fluctuation of power distribution system storage battery power conversion device 41 to be disconnected. Furthermore, since inertia constant M in mass system arithmetic circuit 40937 is made larger, a frequency of the AC voltage of the AC system generated by power distribution system storage battery power conversion device 41 to be disconnected does not change much. Therefore, unnecessary disturbance is not applied to the power distribution system at the time of disconnection.

Referring to FIG. 24, when the processing in step S141 ends, the process proceeds to step S142.

In step S142, eighth control circuit 4097 in fourth control circuit 409 checks whether active power outputted from active power calculation circuit 4092 is within a predetermined range. When the active power is not within the predetermined range, the process waits until the active power falls within the predetermined range. When the active power falls within the predetermined range, the process proceeds to step S143.

In step S143, eighth control circuit 4097 outputs an instruction to communication interface circuit 412 to notify DSO 21 that the disconnection is to be performed.

In step S144, eighth control circuit 4097 disconnects second DC/AC conversion circuit 408 from power distribution system 24. Specifically, eighth control circuit 4097 outputs a command value to set the output to "zero" to second DC/AC conversion circuit 408, and outputs an instruction to third control circuit 404 to stop second DC/DC conversion circuit 403.

Third control circuit 404 instructs second DC/DC conversion circuit 403 to stop (specifically, outputs a command value so that the charging and discharging power becomes "zero"), and then notifies fourth control circuit 409 of the stop. Third control circuit 404 and second DC/DC conversion circuit 403 shift to a low power consumption mode. Whereas, when receiving stop information of second DC/DC conversion circuit 403 from third control circuit 404, fourth control circuit 409 shifts a part other than some functions of fourth control circuit 409 and communication interface circuit 412 to the low power consumption mode, and terminates the disconnection process.

Referring again to FIG. 23, in step S127, power distribution system storage battery power conversion device 41a determines whether or not new addition information has been received. In a case where the new addition information has been received, the process proceeds to step S128. In a case where the new addition information has not been received, the process returns to step S121.

In step S128, power distribution system storage battery power conversion device 41a changes control parameters in governor control circuit 40933 and mass system arithmetic circuit 40937 in virtual synchronous generator control circuit 4093.

The reason for such changing of the control parameters is as follows. This is to suppress large disturbance (change in frequency) with respect to power distribution system 24, similarly to the reason for the disconnection of power distribution system storage battery power conversion device 41 described above. In the case of new introduction, as described above, an inaccuracy occurs particularly in a phase of the AC voltage of the AC system due to a measurement inaccuracy (an inaccuracy such as linearity and offset) of voltmeter 410. As a result, when power distribution system storage battery power conversion device 41 is newly introduced, even if the power target value is "zero" on the basis of the phase inaccuracy, power based on magnitude of the phase inaccuracy is charged and discharged from newly introduced power distribution system storage battery power conversion device 41. The charging and discharging power becomes very large depending on a phase difference, and continues to flow until the phase difference converges. As a result, large disturbance is given to the frequency of the AC voltage of the AC system of power distribution system 24. Therefore, in order to suppress magnitude of the disturbance, power distribution system storage battery power conversion device 41a sets values of the control parameters in governor control circuit 40933 and mass system arithmetic circuit 40937 in virtual synchronous generator control circuit 4093 to be larger than values during the normal operation. As a result, an inertial force of the synchronous generator simulated by mass system arithmetic circuit 40937 increases, which can suppress the disturbance of the frequency and the phase of the AC voltage of the AC system to be outputted from second DC/AC conversion circuit 408.

When the change of the control parameters in governor control circuit 40933 and mass system arithmetic circuit 40937 in virtual synchronous generator control circuit 4093 is completed in step S128, the process proceeds to step S129.

In step S129, power distribution system storage battery power conversion device 41 in system interconnection refrains from changing the control parameter until convergence of oscillation of the frequency of the AC voltage of the AC system generated by the new introduction of power distribution system storage battery power conversion device 41. In the first embodiment, power distribution system storage battery power conversion device 41 in system interconnection determines that the oscillation has converged by refraining from changing the control parameter for a predetermined time. The oscillation convergence determination is not limited to this, and power distribution system storage battery power conversion device 41 in system interconnection may determine that the AC voltage has converged when a frequency fluctuation range of the AC voltage of the AC system measured by voltmeter 410 falls within a predetermined range. When the elapse of the predetermined time is confirmed, the process proceeds to step S130.

In step S130, power distribution system storage battery power conversion device 41 returns the control parameters in governor control circuit 40933 and mass system arithmetic circuit 40937 in virtual synchronous generator control circuit 4093 to values during the normal operation. Thereafter, the process returns to step S121.

Figure 25:
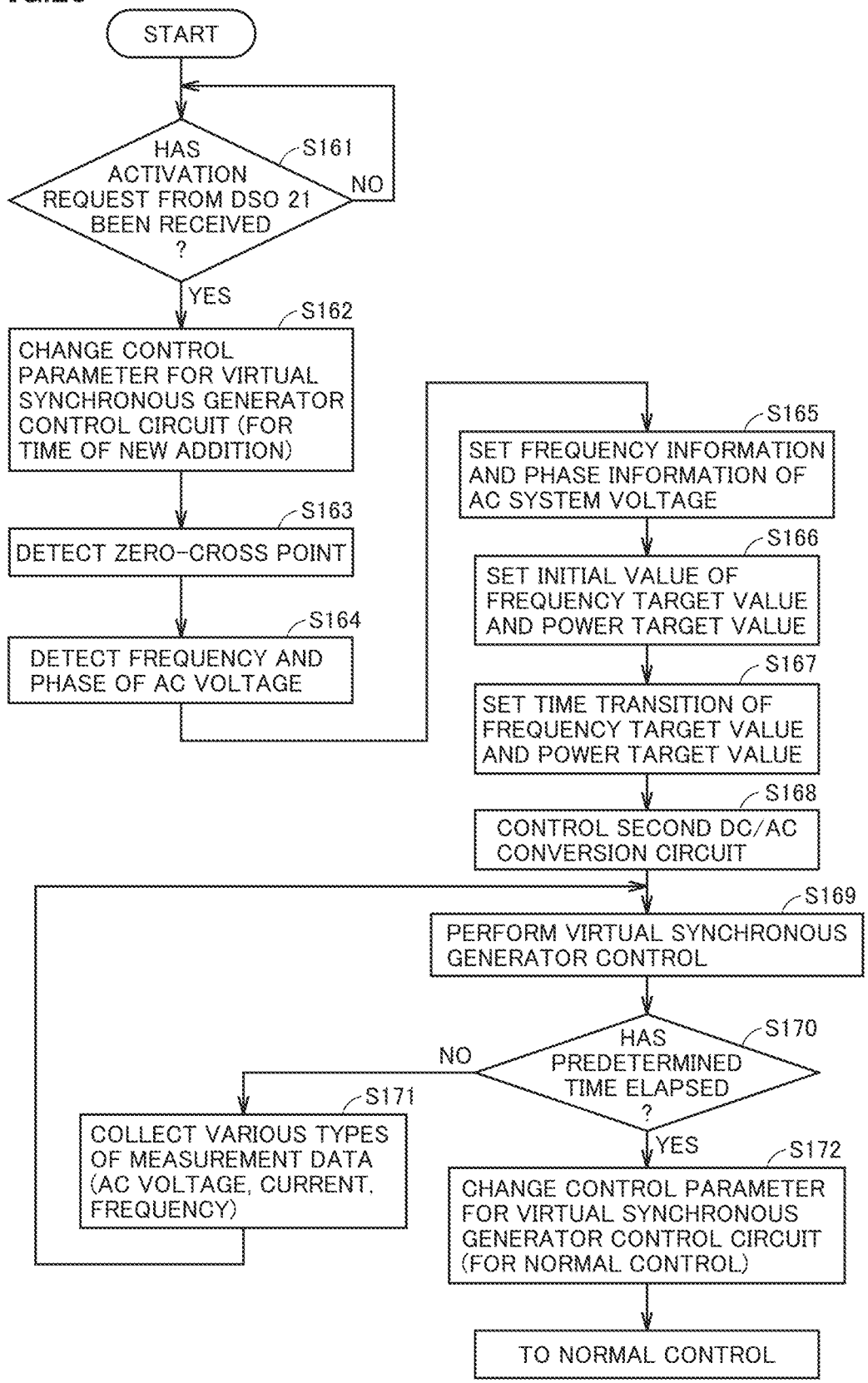
FIG. 25 is a flowchart illustrating a control procedure when power distribution system storage battery power conversion device 41 is newly added.

Next, an operation of power distribution system storage battery power conversion device 41 to be newly introduced will be described. FIG. 25 is a flowchart illustrating a control procedure when power distribution system storage battery power conversion device 41 is newly added.

In step S161, power distribution system storage battery power conversion device 41 on standby in the low power consumption mode waits until an activation request is received from DSO 21. When the activation request is received from DSO 21, the process proceeds to step S162.

In step S162, eighth control circuit 4097 in fourth control circuit 409 outputs an instruction to third control circuit 404 to activate second DC/DC conversion circuit 403. Third control circuit 404 activates second DC/DC conversion circuit 403. Specifically, eighth control circuit 4097 sets, to ON, a relay (not illustrated) that connects power distribution system storage battery 40 and second DC/DC conversion circuit 403, and charges DC bus 405 until reaching a predetermined voltage. At that time, third control circuit 404 collects various types of information of power distribution system storage battery 40, and notifies fourth control circuit 409 of the result. Specifically, eighth control circuit 4097 collects information such as an SOC and deterioration progress by communicating with a battery management unit (not illustrated).

When fourth control circuit 409 receives various types of information (such as activation information on second DC/DC conversion circuit 403) including information on power distribution system storage battery 40 from third control circuit 404, eighth control circuit 4097 in fourth control circuit 409 sets values of various control parameters in governor control circuit 40933 and mass system arithmetic circuit 40937 in virtual synchronous generator control circuit 4093 to values used at a time of new introduction. In the first embodiment, in order to operate power distribution system storage battery power conversion device 41 as an AC voltage source, third switching circuit 4096 is controlled to select an output of inverter voltage control circuit 4095.

Here, various control parameters at a time of new introduction will be described. In the first embodiment, similarly to the case of the disconnection described above, values of the control parameters in governor control circuit 40933 and mass system arithmetic circuit 40937 in virtual synchronous generator control circuit 4093 are set to be larger than values during the normal operation. In the first embodiment, the various control parameters are set to values even larger than values at a time of disconnection. Specifically, at least a time constant (Tg) in governor control circuit 40933 and an inertia constant (M) in mass system arithmetic circuit 40937 are set large. As a result, response time of the governor control is delayed, and a change in frequency of the AC voltage of the AC system of power distribution system 24 is suppressed by apparently increasing the inertial force of the generator rotor according to the oscillation equation.

As a result, when power distribution system storage battery power conversion device 41 is newly introduced, the operation can be continued without greatly disturbing the frequency of the AC voltage of the AC system, even when power that is not controlled by newly introduced power distribution system storage battery power conversion device 41 is outputted. The power that is not controlled by newly introduced power distribution system storage battery power conversion device 41 is charging and discharging power generated due to a phase difference between a phase of the AC voltage of the AC system and a phase of the AC voltage outputted from power distribution system storage battery power conversion device 41, and details thereof have been described above.

The reason why this control method is established is described below. Power distribution system storage battery power conversion device 41 is connected (interconnected) to power distribution system 24 by voltage control as described above. Therefore, if excess or deficiency of the power in power distribution system 24 is less than or equal to a power capacity of power distribution system storage battery power conversion device 41, the supply and demand balance can be secured without any particular problem. Originally, in a case where excess or deficiency occurs in demand supply power, it is possible to receive support from a power conversion device (for example, mega-solar power conversion device 27) that performs control as a current source interconnected to power distribution system 24, by controlling the frequency of the AC voltage of the AC system. However, in a case where power distribution system storage battery power conversion device 41 is newly introduced or power distribution system storage battery power conversion device 41 is disconnected, time from the occurrence of the event to the convergence is limited. Therefore, for that time, even if the excess or deficiency is covered by the supply power (discharging power or charging power) from power distribution system storage battery power conversion device 41, an influence on the entire system control is very small. Here, the influence is specifically an influence of a charging power amount (SOC) of power distribution system storage battery 40 or the like. Therefore, in the first embodiment, control is performed with priority given to reducing fluctuations of the frequency (disturbance of the frequency) of the AC voltage of the AC system rather than securing the SOC of power distribution system storage battery 40. Therefore, by increasing inertia constant M, the inertial force of the synchronous generator simulated by mass system arithmetic circuit 40937 increases, which can suppress the disturbance of the frequency and the phase of the AC voltage of the AC system to be outputted from second DC/AC conversion circuit 408. Similarly, by increasing the time constant (Tg) in governor control circuit 40933, after power distribution system storage battery power conversion device 41 is newly introduced, it is possible to return to the normal control without increasing a cumulative value of a frequency deviation stored in an integrator (not illustrated) when performing the governor control at the time of starting the normal control. As a result, the time until the frequency of the AC voltage of the AC system is stabilized from the new introduction in the normal interconnection control can be suppressed to be short. Although the description has been given to the case where the time constant (Tg) in governor control circuit 40933 and inertia constant M in mass system arithmetic circuit 40937 are made larger, the present disclosure is not limited to this. As described above, a similar effect can be obtained even if the control parameters such as a proportional gain Kgd in governor control circuit 40933 and braking coefficient Dg in mass system arithmetic circuit 40937 are changed, in order to prevent a great change in frequency of the AC voltage of the AC system and the offset value of the power target value applied by the governor control.

Upon completion of the processing in step S162, fourth control circuit 409 detects a frequency and a phase of the AC voltage of the AC system.

In step S163, phase detection circuit 40910 detects a zero-cross point from a measurement result of the AC voltage of the AC system outputted from voltmeter 410. Specifically, phase detection circuit 40910 linearly interpolates a time of the zero-cross point, by using time information where an output of voltmeter 410 changes from negative to positive and using each amplitude.

Phase detection circuit 40910 may be configured to calculate time information of the zero-cross point of a change from positive to negative in the above manner, calculate an offset inaccuracy of voltmeter 410 on the basis of a calculation result of the time information of the zero-cross point, and calculate again the zero-cross point time on the basis of the calculation result of the offset inaccuracy.

An offset inaccuracy calculation method will be described below. Phase detection circuit 40910 obtains a length of a positive time and a length of a negative time of the AC voltage of the AC system from zero-cross point time information of a change from negative to positive and zero-cross point time information of a change from positive to negative. When the length of the positive time is longer than the length of the negative time, phase detection circuit 40910 adds a negative offset value to the output of voltmeter 410. Similarly, when the length of the positive time is shorter than the length of the negative time, phase detection circuit 40910 adds a positive offset value to the output of voltmeter 410. Phase detection circuit 40910 repeats this and corrects the offset value until a difference between the length of positive time and the length of negative time falls within a predetermined range. By controlling in this manner, the offset inaccuracy of voltmeter 410 can be reduced. Note that a method of calculating the offset inaccuracy is not limited to this, and for example, a similar effect can be obtained even by obtaining the offset value such that absolute values of positive and negative peak voltages of the AC voltage of the AC system are substantially the same.

In step S164, frequency detection circuit 40911 detects a frequency by using the zero-cross point information. Specifically, frequency detection circuit 40911 calculates a frequency on the basis of zero-cross point time information of two consecutive points. In the first embodiment, the frequency of the AC voltage of the AC system is obtained using only the zero-cross point time information of two consecutive points, but the present disclosure is not limited to this. Frequency detection circuit 40911 may obtain the frequency of the AC voltage of the AC system on the basis of a plurality of pieces of zero-cross point information, and obtain an average value of a plurality of frequencies of the AC voltage of the AC systems.

When the detection of the frequency is ended, AC frequency detection circuit 4091 performs phase detection. In the first embodiment, phase detection circuit 40910 obtains a zero-cross point time at which the latest output of voltmeter 410 when the frequency detection is completed changes from negative to positive, and uses the zero-cross point time as phase information.

In step S165, the frequency and phase information of the AC voltage of the AC system is inputted to second sine wave generation circuit 40912.

Second sine wave generation circuit 40912 generates sine wave information serving as a reference at a time of voltage control, on the basis of the detected frequency and phase information and the frequency information and phase information outputted from mass system arithmetic circuit 40937 in virtual synchronous generator control circuit 4093. Second sine wave generation circuit 40912 outputs the generated sine wave information to third sine wave generation circuit 40951 in inverter voltage control circuit 4095.

Detection information (frequency information and phase information of the AC voltage of the AC system) of AC frequency detection circuit 4091 is also inputted to virtual synchronous generator control circuit 4093 and eighth control circuit 4097. The detection information inputted to virtual synchronous generator control circuit 4093 is inputted to target frequency generation circuit 40934. Further, the detection information of AC frequency detection circuit 4091 is inputted to mass system arithmetic circuit 40937 via eighth control circuit 4097. Specifically, initial values of integrator 409372 in mass system arithmetic circuit 40937 and a register (not illustrated) in phase calculation circuit 409376 are set.

When the setting of the frequency and phase information of the AC voltage of the AC system in step S165 is completed, the process proceeds to step S166.

In step S166, eighth control circuit 4097 sets an initial value of a frequency target value and an initial value of a power target value in target power generation circuit 40931 and target frequency generation circuit 40934 in virtual synchronous generator control circuit 4093.

In step S167, target power generation circuit 40931 sets a time transition of the power target value. Target frequency generation circuit 40934 sets a time transition of the frequency target value.

Specifically, as described above, target power generation circuit 40931 performs control such that the power target value at a time of new introduction is set to "zero" as indicated by the solid line in FIG. 13, and the power target value becomes Pref over a predetermined time after convergence of disturbance on power distribution system 24 caused by the new introduction. Therefore, when Pref is inputted, target power generation circuit 40931 calculates a slope of a straight line illustrated in FIG. 13. Then, when convergence of disturbance on power distribution system 24 is confirmed after the new introduction by eighth control circuit 4097, target power generation circuit 40931 generates and outputs the power target value on the basis of a calculation result of the slope of the straight line described above. This is because, as described above, when newly introduced power distribution system storage battery power conversion device 41 that is not charged or discharged is controlled to output power target value Pref immediately after introduction, power is supplied from each power distribution system storage battery power conversion device 41 in a state in which the demand and the supply are balanced by a synchronous generator 30 and power distribution system storage battery power conversion device 41 that has already been originally interconnected to the system to supply power to the system. Synchronous generator 30 and power distribution system storage battery power conversion device 41 that has already been in system interconnection (in a case of operating with the power target value being the target value before new introduction) determine that the load has become light, and perform control to increase the frequency of the AC voltage of the AC system to be outputted. Similarly, power distribution system storage battery power conversion device 41 newly introduced into power distribution system 24 controls to increase the AC frequency, when AC power (active power) outputted from the self is smaller than Pref. Since a rate of the frequency increase is determined by an impedance of power distribution system 24, rates of increase in frequency of each power distribution system storage battery power conversion device 41 and of synchronous generator 30 are different. As a result, unnecessary disturbance is to be applied to power distribution system 24. Therefore, target power generation circuit 40931 in power distribution system storage battery power conversion device 41 to be newly introduced is controlled as described above.

Whereas, for power distribution system storage battery power conversion device 41 that has already been in system interconnection, as described above, target power generation circuit 40931 generates a power target value to change from power target value Pref_b before the new introduction to power target value Pref_a after the new introduction over a predetermined time after disturbance convergence of power distribution system 24, as indicated by the one dotted chain line in FIG. 13. In the first embodiment, the predetermined time in target power generation circuit 40931 on the newly introduced side is assumed to be the same as the predetermined time in target power generation circuit 40931 in system interconnection. As a result, unnecessary disturbance (frequency disturbance) generated in power distribution system 24 when power distribution system storage battery power conversion device 41 is newly introduced is suppressed.

In the first embodiment, as indicated by the solid line in FIG. 13, for power distribution system storage battery power conversion device 41 to be newly introduced, target power generation circuit 40931 controls the power target value to be zero immediately after the introduction, and gradually increases the power target value from zero to Pref over a predetermined time after convergence of the system disturbance is confirmed. Whereas, for power distribution system storage battery power conversion device 41 already interconnected to the system, target power generation circuit 40931 maintains the power target value (Pref_b) before the new introduction until convergence of the system disturbance immediately after the new introduction, and gradually reduces the power target value from Pref_b to Pref_a over a predetermined time as indicated by the one dotted chain line in FIG. 13 after convergence of the system disturbance is confirmed.

Similarly, an operation of target frequency generation circuit 40934 will be described. When the frequency (Fmesure) detected by frequency detection circuit 40911 and Fref are inputted, target frequency generation circuit 40934 outputs Fmesure as a frequency target value until convergence of disturbance on power distribution system 24. Then, when convergence of the system disturbance is detected by eighth control circuit 4097, target frequency generation circuit 40934 outputs a frequency target value that changes from Fmesure to Fref over a predetermined time (see FIG. 14). Note that, in the virtual synchronous generator control, a frequency of a target AC voltage is controlled substantially at a system frequency (for example, 60 Hz or 50 Hz) and does not change significantly. Therefore, target frequency generation circuit 40934 outputs the frequency target value outputted from eighth control circuit 4097, to power distribution system storage battery power conversion device 41 originally interconnected to the system. In this manner, as described for target power generation circuit 40931, when the control of the frequency of the AC voltage of the AC system outputted from power distribution system storage battery power conversion device 41 is started immediately after the new introduction, unnecessary disturbance is to be given to a state in which power supply is performed in balance with a load by the power generation device that has already been originally interconnected to the system to supply power. Therefore, immediately after the power distribution system storage battery power conversion device is newly introduced, control is performed at the detected frequency (Fmesure) of the AC voltage of the AC system, so that control can be performed without causing unnecessary disturbance to the AC system.

Figure 26:
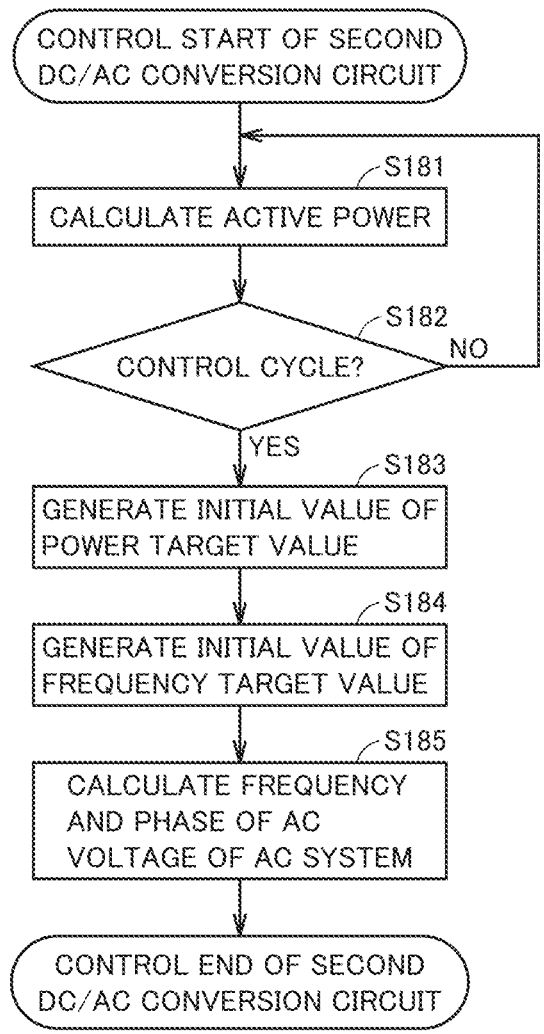
FIG. 26 is a flowchart illustrating a control procedure of fourth control circuit 409 when power distribution system storage battery power conversion device 41 is newly introduced.

Referring again to FIG. 25, when step S167 ends, the process proceeds to step S168. In step S168, an initialization process for control of second DC/AC conversion circuit 408 is performed. Hereinafter, with reference to FIG. 26, an operation of second DC/AC conversion circuit 408 will be described. FIG. 26 is a flowchart illustrating a control procedure of fourth control circuit 409 when power distribution system storage battery power conversion device 41 is newly introduced.

In step S181, when control of second DC/AC conversion circuit 408 is started, active power calculation circuit 4092 in fourth control circuit 409 calculates active power. That is, active power calculation circuit 4092 obtains the active power by integrating an amount of power for one cycle of the AC voltage of the AC system on the basis of zero-cross point information and frequency detection information detected by AC frequency detection circuit 4091. Specifically, active power calculation circuit 4092 calculates an amount of power for one cycle of the AC voltage of the AC system on the basis of zero-cross point detection information where the AC voltage of the AC system switches from negative to positive. More specifically, active power calculation circuit 4092 calculates a unit active power amount by multiplying an output of voltmeter 410 by an output of ammeter 411 and dividing a multiplication result by a sampling period. Furthermore, active power calculation circuit 4092 integrates the unit active power amount for one cycle of the AC voltage of the AC system. Active power calculation circuit 4092 calculates active power by multiplying an integration result by the frequency information outputted from AC frequency detection circuit 4091.

In step S182, eighth control circuit 4097 checks whether or not the current time is within a control cycle. In the first embodiment, one cycle of the AC voltage of the AC system is set as the control cycle. Note that the control cycle may be a predetermined cycle such as an integral multiple of the cycle of the AC voltage of the AC system or a cycle of one second. When the current time is within the control cycle, the process proceeds to step S183.

In step S183, eighth control circuit 4097 outputs an instruction to generate an initial value of the power target value, to target power generation circuit 40931 in virtual synchronous generator control circuit 4093. Upon receiving the instruction, target power generation circuit 40931 generates the initial value of the power target value as illustrated in FIG. 13 in the manner described above.

In step S184, eighth control circuit 4097 outputs an instruction to generate an initial value of the frequency target value to target frequency generation circuit 40934 in virtual synchronous generator control circuit 4093. Upon receiving the instruction, target frequency generation circuit 40934 generates the initial value of the frequency target value as illustrated in FIG. 14 in the manner described above.

In step S185, eighth control circuit 4097 outputs an instruction to virtual synchronous generator control circuit 4093 to generate frequency information and phase information at a time of generating an AC voltage target value at a time of controlling second DC/AC conversion circuit 408. Upon receiving the instruction, virtual synchronous generator control circuit 4093 outputs an instruction to detect a frequency and a phase of the AC voltage of the AC system of power distribution system 24, to phase detection circuit 40910 and frequency detection circuit 40911 in AC frequency detection circuit 4091.

In the first embodiment, at the time of new introduction, the zero-cross point information detected by AC frequency detection circuit 4091 includes an inaccuracy due to an influence of a sensor inaccuracy of voltmeter 410. Therefore, for example, power distribution system storage battery power conversion device 41 is newly introduced for the purpose of use in the discharging direction (the running direction), and newly introduced power distribution system storage battery power conversion device 41 operates in the charging direction (the regeneration direction) immediately after the introduction as described with reference to FIG. 19, in a case where the phase of the AC voltage of the AC system to be outputted from second DC/AC conversion circuit 408 is a lagging phase with respect to the AC voltage phase of power distribution system 24. As a result, another power distribution system storage battery power conversion device 41 in system interconnection and synchronous generator 30 need to supplement, with discharge, power to be charged by newly introduced power distribution system storage battery power conversion device 41. With the addition of the discharging power, an output of power distribution system storage battery power conversion device 41 exceeds a power capacity of power distribution system storage battery power conversion device 41. As a result, power distribution system storage battery power conversion device 41 may stop due to overpower.

Therefore, in the first embodiment, in a case where DSO 21 newly introduces power distribution system storage battery power conversion device 41 for the purpose of discharging, fourth control circuit 409 controls to add a predetermined amount of offset to phase information detected by AC frequency detection circuit 4091 (in the first embodiment, zero-cross point time information where the AC voltage of the AC system switches from negative to positive) such that a phase of the AC voltage of the AC system to be outputted from power distribution system storage battery power conversion device 41 at the time of new introduction becomes a leading phase with respect to the AC voltage phase of power distribution system 24. Specifically, output is performed by subtracting a predetermined time from the zero-cross point time detected by AC frequency detection circuit 4091. Note that a method of controlling to obtain the leading phase is not limited to this method, and a similar effect can be obtained even by a configuration in which an offset amount to be given at the time of new introduction described above is calculated, for example, at a time of system interconnection, from zero-cross point time information detected by phase detection circuit 40910 and zero-cross point time information of a sine wave waveform as a target value of the voltage control outputted from second sine wave generation circuit 40912 when second DC/AC conversion circuit 408 is controlled.

In a case where DSO 21 newly introduces power distribution system storage battery power conversion device 41 for the purpose of discharging, when fourth control circuit 409 controls second DC/AC conversion circuit 408 so that a phase of the AC voltage of the AC system to be outputted is a leading phase, as illustrated in FIG. 21, newly introduced power distribution system storage battery power conversion device 41 outputs power in the discharging direction (the running direction) immediately after the introduction. Since another power distribution system storage battery power conversion device 41 in system interconnection and synchronous generator 30 operate in a direction of suppressing the discharging power, control can be performed without exceeding a power capacity of power distribution system storage battery power conversion device 41. This allows power distribution system storage battery power conversion device 41 in system interconnection to continue the operation.

When the calculation of the frequency and the phase of the AC voltage of the target AC system is completed in step S185 of FIG. 26, the process proceeds to step S169 of FIG. 25. In step S169, eighth control circuit 4097 starts the virtual synchronous generator control. When the virtual synchronous generator control is started, inverter voltage control circuit 4095 generates a target value of the AC voltage of the AC system to be outputted from power distribution system storage battery power conversion device 41 by using third sine wave generation circuit 40951, on the basis of the frequency and the phase (zero-cross point detection time information) information detected in step S185 of FIG. 26. Inverter voltage control circuit 4095 generates and outputs a control signal of second DC/AC conversion circuit 408 on the basis of the generated target value of the AC voltage of the AC system. When the control of second DC/AC conversion circuit 408 is started, virtual synchronous generator control circuit 4093 starts the virtual synchronous generator control.

Specifically, in virtual synchronous generator control circuit 4093, subtractor 40932 subtracts an output of target frequency generation circuit 40934 from an actually measured frequency of the AC voltage of the AC system outputted from frequency detection circuit 40911, and sends a subtraction result to governor control circuit 40933. In governor control circuit 40933, multiplier 409331 multiplies the output of subtractor 40932 by a control parameter (−1/Kgd) outputted from eighth control circuit 4097, and sends a multiplication result to first-order lag system model 409332. First-order lag system model 409332 performs an operation of simulating a first-order lag system (1/(1+s×Tg)) by using time constant Tg outputted from eighth control circuit 4097, and sends an operation result to limiter circuit 409333. Limiter circuit 409333 limits the inputted data. Specifically, limiter circuit 409333 limits the output so as not to exceed a power capacity of second DC/AC conversion circuit 408.

The output of governor control circuit 40933 is added by adder 40935 to the power target value outputted from target power generation circuit 40931. Subtractor 40936 subtracts the output of adder 40935 from an actually measured active power outputted from active power calculation circuit 4092. The output of subtractor 40936 is inputted to mass system arithmetic circuit 40937.

In mass system arithmetic circuit 40937, subtractor 409371 subtracts the output of multiplier 409373 from the output of subtractor 40936, and sends a subtraction result to integrator 409372. Integrator 409372 divides the subtraction result by inertia constant M outputted from eighth control circuit 4097, and integrates a division result. The output of integrator 409372 (Δω: a difference value from an angular velocity (2×π×60 Hz) of the AC system frequency) is inputted to multiplier 409373 and divider 409374. Multiplier 409373 multiplies the output Δω of integrator 409372 by braking coefficient Dg outputted from eighth control circuit 4097, and outputs a multiplication result to subtractor 409371. Divider 409374 divides the output Δω of integrator 409372 by 2×π, and converts Δω into a Δf value (a difference value from the AC system frequency (60 Hz)). The output of divider 409374 is added to 60 Hz, which is a reference frequency of the AC voltage of the AC system, by adder 409375, so that a frequency when inverter voltage control circuit 4095 performs voltage control is generated.

Frequency information outputted from adder 409375 is inputted to phase calculation circuit 409376. Hereinafter, an operation of phase calculation circuit 409376 will be described. The operation of phase calculation circuit 409376 is different between a time of new introduction and a time of system interconnection. At the time of system interconnection, phase calculation circuit 409376 integrates the frequency information outputted from adder 409375, and calculates a phase when inverter voltage control circuit 4095 performs voltage control, from an integration result. The calculated phase information and frequency information are inputted to third sine wave generation circuit 40951 in inverter voltage control circuit 4095 via second sine wave generation circuit 40912 in AC frequency detection circuit 4091. Third sine wave generation circuit 40951 uses the received phase information and frequency information to generate a target value of the AC voltage of the AC system to be outputted from power distribution system storage battery power conversion device 41.

Returning to FIG. 24, in step S170, eighth control circuit 4097 checks whether or not a predetermined time has elapsed. The predetermined time is a time taken for disturbance convergence of the power distribution system after power distribution system storage battery power conversion device 41 is newly introduced. Specifically, the predetermined time is greater than or equal to a time required for an output of target power generation circuit 40931 to become Pref and an output of target frequency generation circuit 40934 to become Fref in FIG. 13 or 14. In a case where the predetermined time has not elapsed, the process proceeds to step S171. In a case where the predetermined time has elapsed, the process proceeds to step S172.

In step S171, eighth control circuit 4097 collects various types of measurement data. Thereafter, the process proceeds to step S169.

In step S172, eighth control circuit 4097 changes various parameters for the virtual synchronous generator control set for new introduction in S162, to control parameters for normal system interconnection. Thereafter, the process shifts to the normal control (see FIG. 23).

Since the first embodiment is configured as described above, when power distribution system storage battery power conversion device 41 is newly introduced into power distribution system 24 in the discharging direction (the running direction) as a voltage source (voltage control), a phase of the AC voltage of the AC system to be outputted from power distribution system storage battery power conversion device 41 is made as a leading phase as compared with phase information detected by phase detection circuit 40910. As a result, even if a measurement inaccuracy is superimposed on the phase of the AC voltage waveform of the AC system of power distribution system 24 due to a sensing inaccuracy of voltmeter 410 or the like, since introduction is performed at least with the leading phase, the introduction can be performed without unnecessary charging of power from power distribution system 24 by power distribution system storage battery power conversion device 41 immediately after the introduction. As a result, there is an effect that the operation can be reliably continued without unnecessarily increasing the discharging power of power distribution system storage battery power conversion device 41 in system interconnection.

In the first embodiment, when power distribution system storage battery power conversion device 41 is to be newly introduced or disconnected, at least values of a control parameter (time constant Tg) of governor control circuit 40933 and a control parameter (inertia constant M) in mass system arithmetic circuit 40937 in virtual synchronous generator control circuit 4093 are made larger than values during the normal control. This is performed not only in power distribution system storage battery power conversion device 41 that is newly introduced or disconnected, but also in power distribution system storage battery power conversion device 41 that continues interconnection. As a result, it is possible to perform new introduction and disconnection without generating unnecessarily large disturbance on the frequency of the AC voltage of the AC system of power distribution system 24. This is because an influence exerted on power distribution system 24 by new introduction or disconnection of power distribution system storage battery power conversion device 41 does not continue for a long time. By performing the control as described above, unnecessary disturbance can be prevented from being generated in the frequency of the AC voltage of the AC system of power distribution system 24.

At least inertia constant M in mass system arithmetic circuit 40937 is set to be larger in power distribution system storage battery power conversion device 41 continuing the operation than that in power distribution system storage battery power conversion device 41 to be newly introduced. This is that the phase of the AC voltage of the AC system of power distribution system storage battery power conversion device 41 to be newly introduced is a leading phase in order to suppress an influence of a sensing inaccuracy of voltmeter 410. In order to supply power to power distribution system 24 by using newly introduced power distribution system storage battery power conversion device 41, it is necessary to control the phase of the AC voltage of the AC system of newly introduced power distribution system storage battery power conversion device 41 to a phase for system interconnection by the virtual synchronous generator control. Therefore, for newly introduced power distribution system storage battery power conversion device 41, time during which frequency disturbance occurs can be shortened by setting higher response performance for the frequency and phase control by mass system arithmetic circuit 40937 as compared with power distribution system storage battery power conversion device 41 in system interconnection.

Furthermore, in the first embodiment, target power generation circuit 40931 and target frequency generation circuit 40934 in virtual synchronous generator control circuit 4093 are controlled as illustrated in FIGS. 13 and 14. As a result, when power distribution system storage battery power conversion device 41 is newly introduced, various types of control of governor control circuit 40933 and mass system arithmetic circuit 40937 can be smoothly performed. As a result, unnecessary frequency disturbance can be prevented from being generated in power distribution system 24.

Second Embodiment

In the first embodiment, a case has been described in which power distribution system storage battery power conversion device 41 is newly introduced in the discharging direction (the running direction). In a second embodiment, a case will be described in which a power distribution system storage battery power conversion device 41 is newly introduced in a charging direction (a regeneration direction). Therefore, a configuration of power distribution system storage battery power conversion device 41 in the second embodiment is the same (see FIGS. 4 and 7, 8, 10 to 12, 15, 16) as the configuration of the first embodiment. Only control of a mass system arithmetic circuit 40937 in power distribution system storage battery power conversion device 41 to be newly added to the system is different. Hereinafter, an operation of a different portion will be mainly described.

Figure 27:
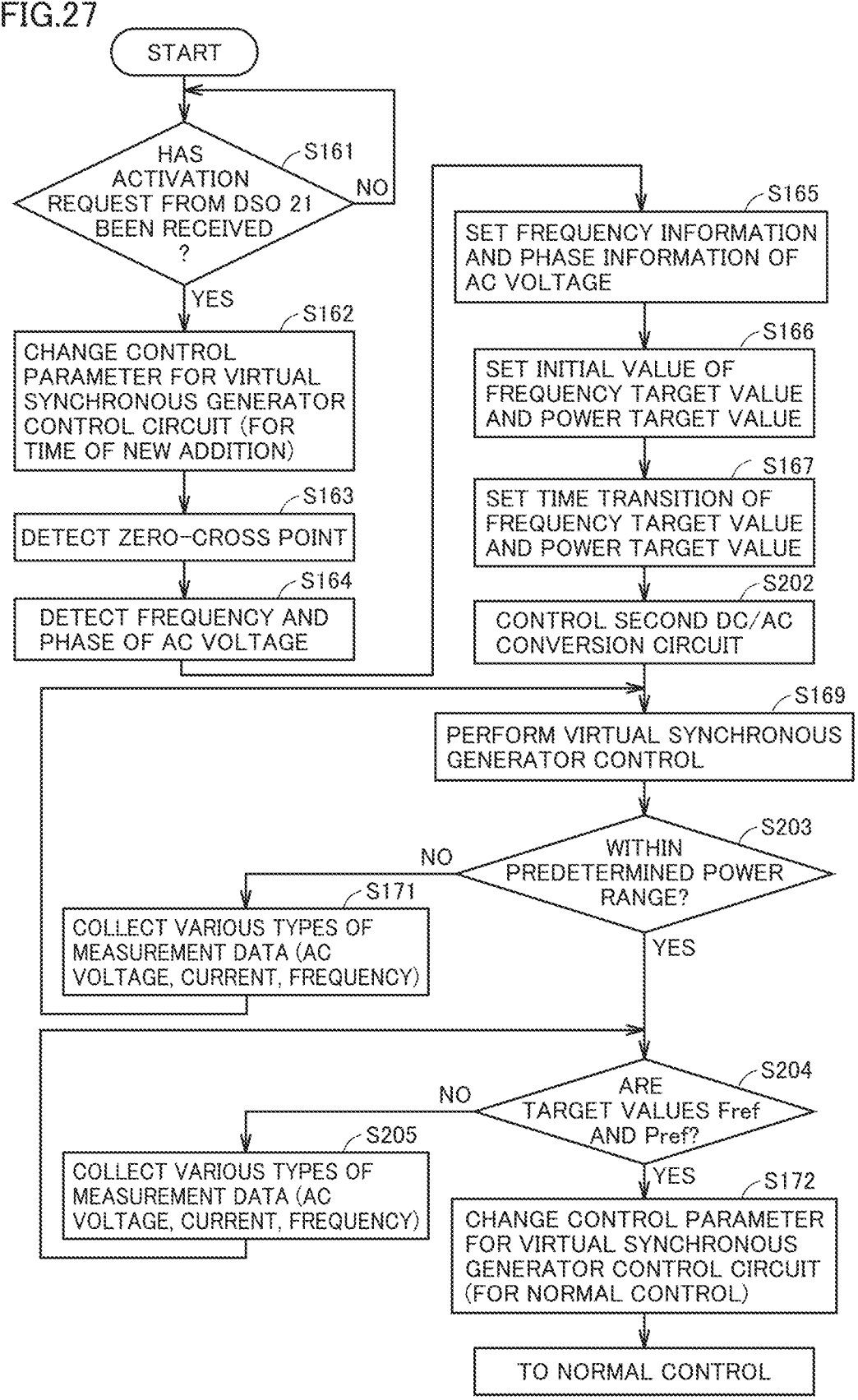
FIG. 27 is a flowchart illustrating a control procedure at a time of newly adding power distribution system storage battery power conversion device 41 in a second embodiment (newly introducing for the purpose of a charging direction (a regeneration direction)).

Hereinafter, with reference to FIGS. 27 to 30, an operation of power distribution system storage battery power conversion device 41 of the second embodiment will be described. FIG. 27 is a flowchart illustrating a control procedure at a time of newly adding power distribution system storage battery power conversion device 41 in the second embodiment (newly introducing for the purpose of the charging direction (the regeneration direction)).

With reference to FIG. 27, an operation of power distribution system storage battery power conversion device 41 to be newly introduced in the charging direction (the regeneration direction) will be described.

Similarly to the first embodiment, power distribution system storage battery power conversion device 41 on standby in a low power consumption mode waits until an activation request is received from a DSO 21 (S161). In step S161, upon receiving the activation request from DSO 21, an eighth control circuit 4097 in a fourth control circuit 409 outputs an instruction to a third control circuit 404 to activate a second DC/DC conversion circuit 403. Note that control at the time of activation of third control circuit 404 is the same as that in the first embodiment, and thus the detailed description of the operation will not be repeated.

Upon ending of an activation process including a power distribution system storage battery 40, third control circuit 404 notifies fourth control circuit 409 of the fact together with collected information. Upon receiving the completion of the activation process from third control circuit 404, eighth control circuit 4097 in fourth control circuit 409 changes various control parameters in a governor control circuit 40933 and mass system arithmetic circuit 40937 in a virtual synchronous generator control circuit 4093, to parameters to be used at a time of new introduction. At that time, in order to operate power distribution system storage battery power conversion device 41 as an AC voltage source, a third switching circuit 4096 is controlled to select an output of an inverter voltage control circuit 4095. If Yes in step S161, in step S162, a control parameter for each control circuit in virtual synchronous generator control circuit 4093 is changed for new introduction.

Here, various control parameters at a time of new introduction will be described. Similarly to the first embodiment, eighth control circuit 4097 sets values of the control parameters in governor control circuit 40933 and mass system arithmetic circuit 40937 in virtual synchronous generator control circuit 4093 to be larger than values during a normal operation. At that time, similarly to the first embodiment, eighth control circuit 4097 further sets values of these control parameters to be even larger than values of control parameters set at a time of disconnection. Specifically, eighth control circuit 4097 sets at least a time constant (Tg) in governor control circuit 40933 and an inertia constant (M) in mass system arithmetic circuit 40937 to be larger. As a result, response time of the governor control is delayed, and the inertial force of the generator rotor illustrated in FIG. 9 based on the oscillation equation is apparently made larger. This makes it possible to suppress a change in frequency of an AC voltage of an AC system of a power distribution system 24, similarly to the first embodiment. Specifically, when power distribution system storage battery power conversion device 41 is newly introduced, the operation can be continued without greatly disturbing the frequency of the AC voltage of the AC system, even when power that is not controlled by newly introduced power distribution system storage battery power conversion device 41 is outputted. The power that is not controlled is charging and discharging power generated due to a phase difference between a phase of the AC voltage of the AC system and a phase of the AC voltage outputted from power distribution system storage battery power conversion device 41. The principle and effect of this method are similar to those of the first embodiment, and thus, the description thereof will not be repeated.

Returning to FIG. 27, when the processing in step S162 is completed, the process proceeds to step S163. In step S163, similarly to the first embodiment, fourth control circuit 409 detects a phase (a zero-cross point time) of the AC voltage of the AC system, and outputs zero-cross point time information to a frequency detection circuit 40911.

In step S164, frequency detection circuit 40911 detects a frequency of the AC voltage of the AC system on the basis of the zero-cross point time information.

Specifically, similarly to the first embodiment, a phase detection circuit 40910 in an AC frequency detection circuit 4091 linearly interpolates the zero-cross point time by using time information when an output of a voltmeter 410 changes from negative to positive and using each amplitude. Then, frequency detection circuit 40911 calculates the frequency of the AC voltage of the AC system on the basis of the zero-cross point time information of two consecutive points. In the first and second embodiments, frequency detection circuit 40911 is configured to obtain a frequency of the AC voltage of the AC system by using only the zero-cross point time information of two consecutive points, but the present disclosure is not limited to this. Frequency detection circuit 40911 may obtain the frequency of the AC voltage of the AC system on the basis of a plurality of pieces of zero-cross point information, and take an average value. In addition, similarly to the first embodiment, phase detection circuit 40910 may be configured to calculate time information of the zero-cross point of a change from positive to negative in the above manner, calculate an offset inaccuracy of voltmeter 410 (refer to the first embodiment for details) on the basis of a calculation result, and calculate again the zero-cross point time on the basis of an offset inaccuracy.

When the detection of the frequency of the AC voltage of the AC system is ended, AC frequency detection circuit 4091 detects a phase of the AC voltage of the AC system. Similarly to the first embodiment, AC frequency detection circuit 4091 sets, as phase information, a zero-cross point time at which the latest output of voltmeter 410 when the frequency detection is completed changes from negative to positive. When the detection of the frequency and phase information of the AC voltage of the AC system in step S164 is completed, the process proceeds to step S165.

In step S165, the frequency information and the phase information detected by AC frequency detection circuit 4091 are inputted to a second sine wave generation circuit 40912.

On the basis of the detected frequency information and phase information and the frequency information and phase information outputted from mass system arithmetic circuit 40937 in virtual synchronous generator control circuit 4093, second sine wave generation circuit 40912 generates sine wave information serving as a reference for voltage control, and outputs to a third sine wave generation circuit 40951 in inverter voltage control circuit 4095. Detection information of AC frequency detection circuit 4091 is also inputted to virtual synchronous generator control circuit 4093 and eighth control circuit 4097. The frequency and the phase of the AC voltage of the AC system inputted to virtual synchronous generator control circuit 4093 are inputted to a target frequency generation circuit 40934. Detection information of AC frequency detection circuit 4091 is inputted to mass system arithmetic circuit 40937 via eighth control circuit 4097. Specifically, the detection information is set to initial values of an integrator 409372 in mass system arithmetic circuit 40937 and a register (not illustrated) in a phase calculation circuit 409376.

When the setting of the frequency information and the phase information of the AC voltage of the AC system is completed in step S165, the process proceeds to step S166. In step S166, similarly to the first embodiment, eighth control circuit 4097 sets an initial value of a frequency target value and an initial value of a power target value in target power generation circuit 40931 and target frequency generation circuit 40934 in virtual synchronous generator control circuit 4093.

In step S167, target power generation circuit 40931 sets a time transition of the power target value. Specific operations (a target value generation operation) and effects of target power generation circuit 40931 and target frequency generation circuit 40934 are the same as those in the first embodiment, and therefore, the description thereof will not be repeated.

Figure 28:
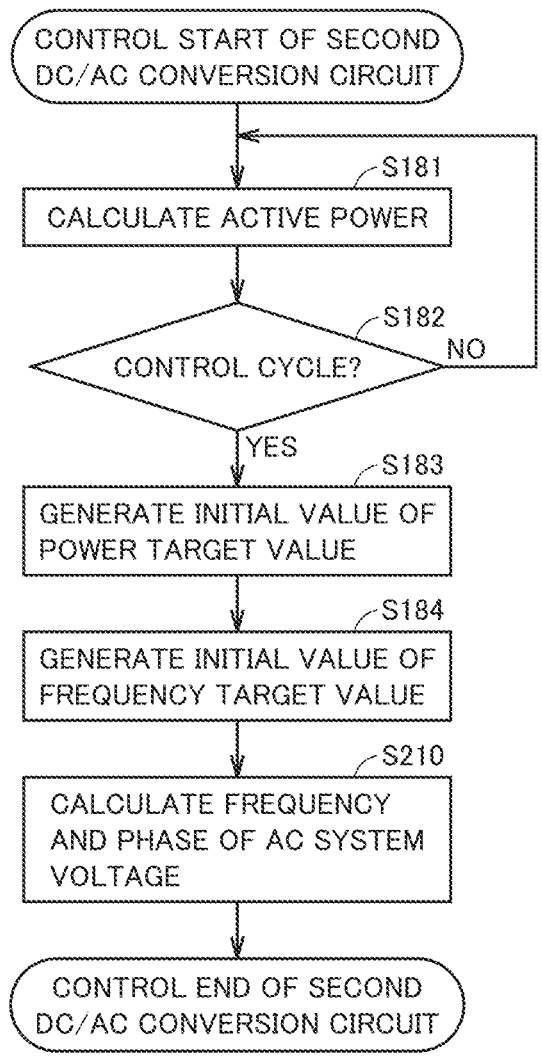
FIG. 28 is a flowchart illustrating a control procedure when power distribution system storage battery power conversion device 41 is newly introduced into a fourth control circuit 409 in the second embodiment.

Next, in step S202, fourth control circuit 409 starts control of a second DC/AC conversion circuit 408. FIG. 28 is a flowchart illustrating a control procedure when power distribution system storage battery power conversion device 41 is newly introduced into fourth control circuit 409 in the second embodiment. Hereinafter, with reference to FIG. 28, an operation of second DC/AC conversion circuit 408 will be described.

In step S181, when control of second DC/AC conversion circuit 408 is started, active power calculation circuit 4092 in fourth control circuit 409 calculates active power. A method for calculating the AC active power is the same as that in the first embodiment.

In step S182, eighth control circuit 4097 checks whether or not the current time is within a control cycle. In the second embodiment, similarly to the first embodiment, one cycle of the AC voltage of the AC system is set as the control cycle. The control cycle may be a predetermined cycle such as an integral multiple of the cycle of the AC voltage of the AC system or a cycle of one second.

In a case where the current time is determined to be within the control cycle, the process proceeds to step S183. In step S183, eighth control circuit 4097 outputs an instruction to generate an initial value of the power target value, to target power generation circuit 40931 in virtual synchronous generator control circuit 4093.

In step S184, eighth control circuit 4097 outputs an instruction to generate an initial value of the frequency target value to target frequency generation circuit 40934 in virtual synchronous generator control circuit 4093. Upon receiving the instruction, target frequency generation circuit 40934 generates the initial value of the frequency target value in the manner described above. When virtual synchronous generator control circuit 4093 starts the virtual synchronous generator control after the generation of the initial value, similarly to the first embodiment, target power generation circuit 40931 and target frequency generation circuit 40934 generate a voltage target value and a frequency target value as illustrated in FIGS. 13 and 14.

In step S210, eighth control circuit 4097 outputs, to AC frequency detection circuit 4091, an instruction to generate a target value of the AC voltage of the AC system to be outputted from power distribution system storage battery power conversion device 41 when second DC/AC conversion circuit 408 is newly introduced into power distribution system 24. Upon receiving the instruction, AC frequency detection circuit 4091 outputs an instruction to phase detection circuit 40910 and frequency detection circuit 40911 to generate a frequency and zero-cross point time information of the AC voltage of the AC system inputted from power distribution system 24. Details of the method for detecting the frequency and the zero-cross point time information of the AC voltage of the AC system inputted from power distribution system 24 in the second embodiment will be described later.

In the second embodiment, unlike the first embodiment, in order to charge excess power of a mega solar 26, in order to operate power distribution system storage battery power conversion device 41 in the charging direction (the regeneration direction), power distribution system storage battery power conversion device 41 is newly introduced. As described also in the first embodiment, immediately after introduction of power distribution system storage battery power conversion device 41 into power distribution system 24, power to be outputted is determined by a phase difference between a phase of the AC voltage of the AC system of power distribution system 24 and a phase of the AC voltage of the AC system outputted from power distribution system storage battery power conversion device 41.

In the first embodiment, since the phase of the AC voltage target value is a leading phase with respect to the AC voltage of the AC system, power determined by the phase difference is outputted in the discharging direction (the running direction) as illustrated in FIGS. 20 and 21. Whereas, when the phase of the AC voltage target value is a lagging phase with respect to the AC voltage of the AC system, power determined by the phase difference is outputted in the charging direction (the regeneration direction) as illustrated in FIGS. 18 and 19. This power is actually determined by magnitude of the phase difference as well as magnitude of a difference between an amplitude of the AC voltage of the AC system of power distribution system 24 and an amplitude of the AC voltage of the AC system outputted from power distribution system storage battery power conversion device 41.

Therefore, in the second embodiment, when second DC/AC conversion circuit 408 (an inverter) is introduced into the AC system, fourth control circuit 409 (an inverter control circuit) sets a frequency of the AC voltage target value to a frequency of the AC voltage detected by AC frequency detection circuit 4091, and controls a phase of the AC voltage target value to be at least a lagging phase with respect to the AC voltage of the AC system when a target value of the AC power is in the regeneration direction.

Specifically, fourth control circuit 409 adds a predetermined amount of offset or controls the zero-cross point detection time so as add an offset, to the phase information detected by AC frequency detection circuit 4091. Here, in the second embodiment, similarly to the first embodiment, the phase information is zero-cross point time information when the AC voltage of the AC system switches from negative to positive.

In the second embodiment, fourth control circuit 409 adds a predetermined time to the zero-cross point time detected by AC frequency detection circuit 4091, and outputs a result. Note that a method for controlling the phase of the AC voltage target value to be a lagging phase with respect to the AC voltage of the AC system is not limited to this method, and phase information (zero-cross point time information) is generated as described below in the second embodiment. Specifically, as described in the description of the operation of AC frequency detection circuit 4091, AC frequency detection circuit 4091 calculates three consecutive zero-cross point times on the basis of measurement data of voltmeter 410. The three consecutive zero-cross point times are a zero-cross point time t1 at which the AC voltage of the AC system switches from negative to positive, a zero-cross point time t2 at which the AC voltage switches from positive to negative, and a zero-cross point time t3 at which the AC voltage switches from negative to positive. Then, AC frequency detection circuit 4091 calculates Tu_d=t2−t1 (time during which the AC voltage of the AC system is positive) and Td_u=t3−t2 (time during which the AC voltage of the AC system is negative), on the basis of a calculation result.

Figure 29:
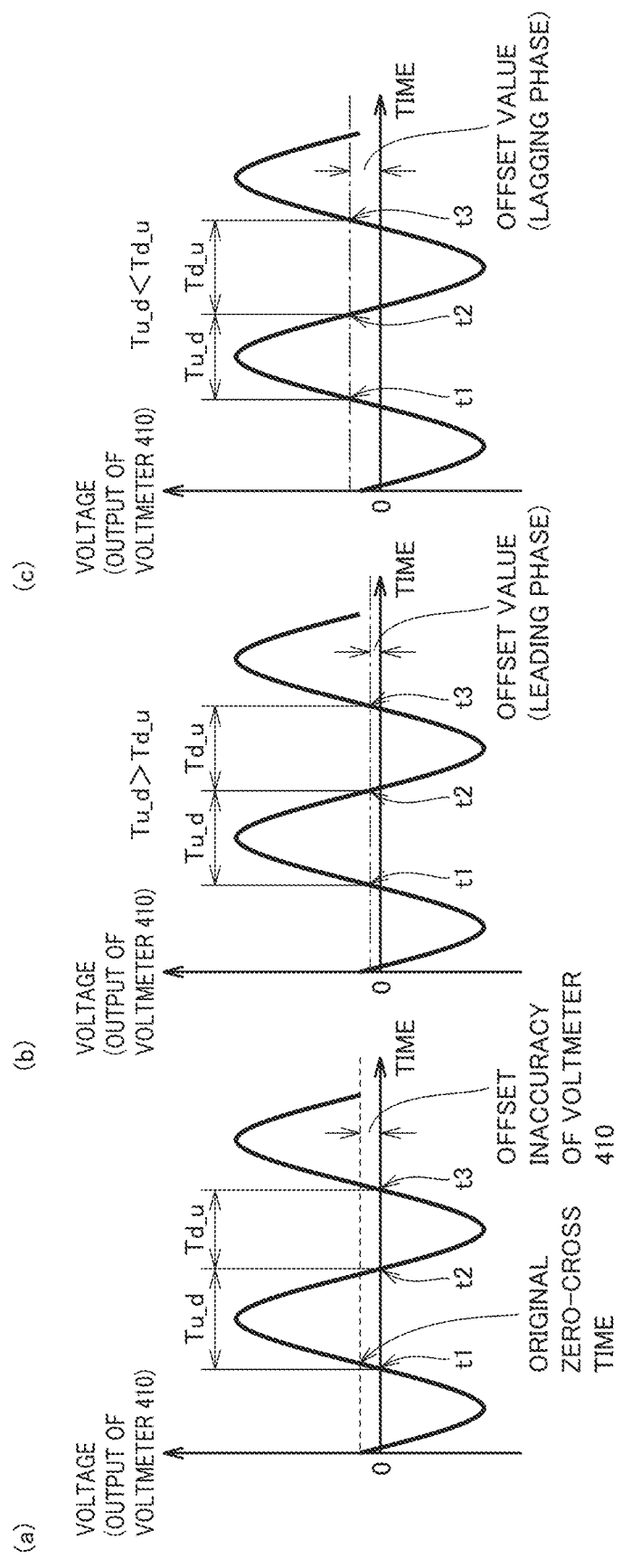
FIGS. 29(a) to 29(c) are graphs for describing a method of detecting a zero-cross point time (a phase) of a lagging phase.

FIGS. 29(*a*) to 29(*c*) are graphs for describing a method of detecting a zero-cross point time (a phase) of a lagging phase. FIGS. 29(*a*) to 29(*c*) illustrate voltage information outputted from voltmeter 410. In FIGS. 29(*a*) to 29(*c*), a vertical axis represents a voltage, and a horizontal axis represents time.

A case will be described in which voltmeter 410 has an offset inaccuracy, which is a main component of an inaccuracy factor at a time of phase detection. A sine wave waveform indicated by a solid line in FIG. 29(*a*) indicates data measured by voltmeter 410. In the example of FIG. 29(*a*), voltmeter 410 has a negative offset inaccuracy. Therefore, zero-cross point time t1 is detected before the original zero-cross point time (a leading phase). In this case, Tu_d and Td_u, which are the above calculation results, have the following relationship as illustrated in FIG. 29(*a*).

$$\mathit{Tu\_d} > \mathit{Td\_u} \qquad (3)$$

Next, with reference to FIGS. 29(*a*) to 29(*c*), a method for detecting a zero-cross point time in the second embodiment will be described. Phase detection circuit 40910 in AC frequency detection circuit 4091 calculates zero-cross point times t1, t2, and t3 in the manner described in the first embodiment. For example, phase detection circuit 40910 calculates zero-cross point times t1, t2, and t3 by linear interpolation using time information between two consecutive samples in which an output from voltmeter 410 is switched from negative to positive and using two sample values of positive and negative.

Phase detection circuit 40910 calculates Tu_d and Td_u on the basis of the calculated zero-cross point time information. Then, in the second embodiment, in a case where a phase of the AC voltage of the AC system to be outputted from power distribution system storage battery power conversion device 41 is a leading phase, assuming that Tstatic_max and Tstatic_min are predetermined values at a time of detecting the leading phase, phase detection circuit 40910 determines an offset value (a leading phase) so that the following formula is established (see FIG. 29(*b*)).

$$\mathit{Tstatic\_max} > \mathit{Tu\_d} - \mathit{Td\_u} > \mathit{Tstatic\_min} \qquad (4)$$

In the second embodiment, time t3 in FIG. 29(*b*) is set as the zero-cross point detection time of the leading phase.

Similarly, in a case where a phase of the AC voltage of the AC system to be outputted from power distribution system storage battery power conversion device 41 is a lagging phase, assuming that Tlaggin_max and Tlaggin_min are predetermined values when the lagging phase is detected, an offset value (a lagging phase) is determined so that the following formula is established (see FIG. 29(*c*)).

$$\mathit{Tlaggin\_max} > \mathit{Tu\_d} - \mathit{Td\_u} > \mathit{Tlaggin\_min} \qquad (5)$$

In the second embodiment, time t3 in FIG. 29(*c*) is set as the zero-cross point detection time of the lagging phase. As described above, it goes without saying that a similar effect can be obtained by controlling the phase of the AC voltage of the AC system to be outputted from power distribution system storage battery power conversion device 41. Further, a similar effect can be obtained even by a configuration in which an offset amount to be given at the time of the new introduction described above is calculated, at a time of system interconnection, from zero-cross point time information detected by phase detection circuit 40910 and zero-cross point time information of a sine wave waveform as a target value of the voltage control outputted from second sine wave generation circuit 40912 when second DC/AC conversion circuit 408 is controlled.

Pieces of zero-cross point time information t1 and t3 detected by phase detection circuit 40910 are inputted to frequency detection circuit 40911. Frequency detection circuit 40911 calculates a frequency fx of the AC voltage of the AC system of power distribution system 24 by the following formula.

$$\mathit{fx} = 1/(t3 - t1) \qquad (6)$$

Similarly to the first embodiment, detected zero-cross point time information t3 and frequency information are notified as sine wave information from second sine wave generation circuit 40912 to third sine wave generation circuit 40951.

Third sine wave generation circuit 40951 generates a target value of the AC system voltage to be outputted from power distribution system storage battery power conversion device 41 on the basis of the notified sine wave information. In the second embodiment, a timing at which power distribution system storage battery power conversion device 41 is introduced into power distribution system 24 is a timing of the zero-cross point of the target value of the AC system voltage generated by third sine wave generation circuit 40951. As a result, it is possible to newly introduce power distribution system storage battery power conversion device 41 into power distribution system 24 without outputting very large discharging or charging power immediately after the introduction.

When the calculation of the frequency and phase information (the zero-cross point time information) of the AC voltage of the AC system is completed in step S210 in the above manner, the process proceeds to step S169 in FIG. 27. In step S169, eighth control circuit 4097 outputs an instruction to virtual synchronous generator control circuit 4093 to start the virtual synchronous generator control. When the virtual synchronous generator control is started, third sine wave generation circuit 40951 of inverter voltage control circuit 4095 generates a target value of the AC voltage of the AC system to be outputted from power distribution system storage battery power conversion device 41, on the basis of the frequency and the phase (zero-cross point detection time information) information detected in step S210. On the basis of the generated target value of the AC voltage of the AC system, inverter voltage control circuit 4095 generates and outputs a control signal of second DC/AC conversion circuit 408. When the control of second DC/AC conversion circuit 408 is started, virtual synchronous generator control circuit 4093 starts the virtual synchronous generator control.

Specifically, in virtual synchronous generator control circuit 4093, governor control circuit 40933 subtracts an output of target frequency generation circuit 40934 from an actually measured frequency of the AC voltage of the AC system outputted from frequency detection circuit 40911, and outputs a subtraction result to governor control circuit 40933.

Multiplier 409331 of governor control circuit 40933 multiplies the output of subtractor 40932 by a control parameter (−1/Kgd) outputted from eighth control circuit 4097, and outputs a multiplication result to first-order lag system model 409332.

First-order lag system model 409332 performs an operation of simulating a first-order lag system (1/(1+s×Tg)) by using time constant Tg outputted from eighth control circuit 4097, and outputs an operation result to limiter circuit 409333.

Limiter circuit 409333 limits the inputted data. Specifically, limiter circuit 409333 limits the output so as not to exceed a power capacity of second DC/AC conversion circuit 408.

Adder 40935 adds the output of governor control circuit 40933 and the power target value outputted from target power generation circuit 40931. Subtractor 40936 subtracts the output of adder 40935 from an actually measured active power outputted from active power calculation circuit 4092. The output of subtractor 40936 is inputted to mass system arithmetic circuit 40937.

In mass system arithmetic circuit 40937, subtractor 409371 subtracts the output of multiplier 409373 from the output of subtractor 40936, and outputs a subtraction result to integrator 409372.

Integrator 409372 divides the subtraction result by inertia constant M outputted from eighth control circuit 4097, and integrates a division result. The output of integrator 409372 (Δω: a difference value from an angular velocity (2×π×60 Hz) of the AC system frequency) is inputted to multiplier 409373 and divider 409374.

Multiplier 409373 multiplies the output Aw of integrator 409372 by a braking coefficient Dg outputted from eighth control circuit 4097, and outputs a multiplication result to subtractor 409371.

Divider 409374 divides the output Δω of integrator 409372 by 2×π, and converts Δω into a Δf value (a difference value from the AC system frequency (60 Hz)). The output of divider 409374 is added to 60 Hz, which is the reference frequency of the AC voltage of the AC system, by adder 409375. As a result, a frequency at which voltage control is performed in inverter voltage control circuit 4095 is generated.

Frequency information outputted from adder 409375 is inputted to phase calculation circuit 409376. Hereinafter, an operation of phase calculation circuit 409376 will be described. For the operation of phase calculation circuit 409376, an operation is different between a time of new introduction and a time of system interconnection. At the time of system interconnection, phase calculation circuit 409376 integrates frequency information outputted from adder 409375, and calculates a phase when inverter voltage control circuit 4095 performs voltage control from an integration result. The calculated phase information and frequency information are inputted to third sine wave generation circuit 40951 in inverter voltage control circuit 4095 via second sine wave generation circuit 40912 in AC frequency detection circuit 4091. On the basis of the phase information and frequency information, third sine wave generation circuit 40951 generates a target value of the AC voltage of the AC system to be outputted from power distribution system storage battery power conversion device 41.

Returning to FIG. 27, in step S203, eighth control circuit 4097 checks whether or not the active power calculated by active power calculation circuit 4092 is within a predetermined power range. That is, eighth control circuit 4097 checks whether or not disturbance of charging and discharging power of power distribution system storage battery power conversion device 41 newly introduced into power distribution system 24 falls within a predetermined range. When the active power is not within the predetermined range, the process proceeds to step S171. When the active power is within the predetermined range, the process proceeds to step S204.

In step S171, eighth control circuit 4097 collects various types of measurement data. Thereafter, the process returns to step S169. In step S169, eighth control circuit 4097 controls virtual synchronous generator control circuit 4093 again. At this time, in the second embodiment, unlike the first embodiment, target power generation circuit 40931 and target frequency generation circuit 40934 in virtual synchronous generator control circuit 4093 maintain initial values until disturbance converges (see FIGS. 13 and 14).

In step S204, eighth control circuit 4097 checks whether or not an output of target power generation circuit 40931 is Pref and an output of target frequency generation circuit 40934 is Fref, in virtual synchronous generator control circuit 4093. When the output of target power generation circuit 40931 is Pref and the output of target frequency generation circuit 40934 is Fref, the process proceeds to step S172. When the output of target power generation circuit 40931 is not Pref or the output of target frequency generation circuit 40934 is not Fref, the process proceeds to step S205.

In step S205, eighth control circuit 4097 collects various types of measurement data. Thereafter, the process returns to step S204.

In step S172, eighth control circuit 4097 changes various parameters for the virtual synchronous generator control set for new introduction in step S162, to control parameters for normal system interconnection. Thereafter, the process shifts to the normal control (see FIG. 23).

Since the second embodiment is configured as described above, when power distribution system storage battery power conversion device 41 is newly introduced into power distribution system 24 in the charging direction (the regeneration direction) as a voltage source (voltage control), a phase of the AC voltage of the AC system to be outputted from power distribution system storage battery power conversion device 41 is made as a lagging phase as compared with phase information detected by phase detection circuit 40910. As a result, even if a measurement inaccuracy is superimposed on the phase of the AC voltage waveform of the AC system of power distribution system 24 due to a sensing inaccuracy of voltmeter 410 or the like, since introduction is performed at least with the lagging phase, it is possible to prevent newly introduced power distribution system storage battery power conversion device 41 from unnecessarily discharging power to power distribution system 24 immediately after the introduction.

Figure 30:
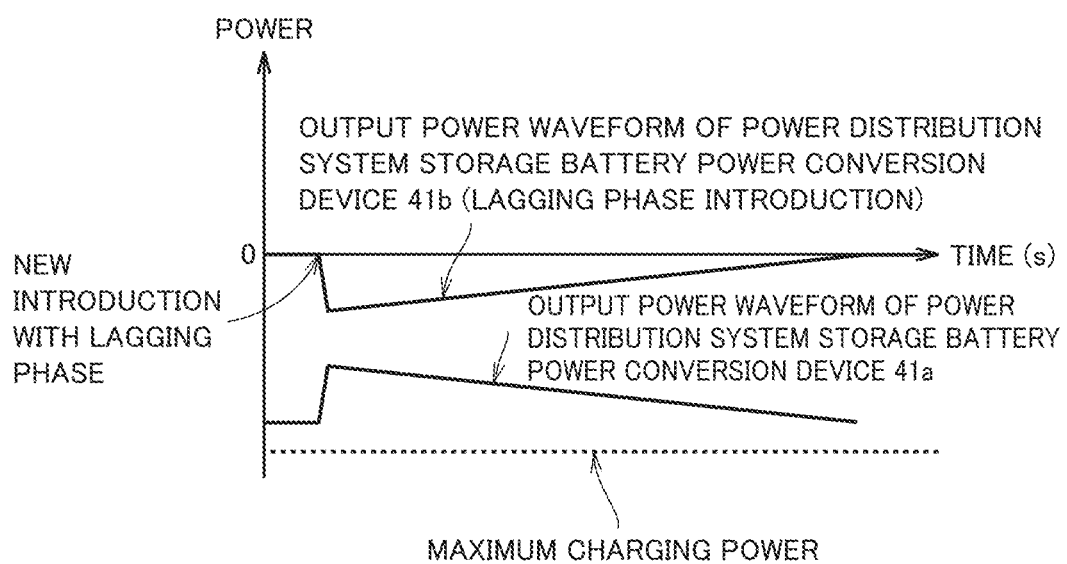
FIG. 30 is a graph illustrating charging and discharging power (an effective value) of two power distribution system storage battery power conversion devices 41 in a case where an AC voltage phase of newly introduced power distribution system storage battery power conversion device 41 is a lagging phase in the second embodiment.

FIG. 30 is a graph illustrating charging and discharging power (an effective value) of two power distribution system storage battery power conversion devices 41 in a case where an AC voltage phase of newly introduced power distribution system storage battery power conversion device 41 is a lagging phase in the second embodiment.

As illustrated in FIG. 30, immediately after the new introduction, power distribution system storage battery power conversion device 41*b* operates in the charging direction, so that power distribution system storage battery power conversion device 41*a* that has been in system interconnection increases charging power. As a result, it is possible to prevent output power of power distribution system storage battery power conversion device 41*a* from exceeding maximum charging power, and power distribution system storage battery power conversion device 41*a* from stopping due to capacity excess. As a result, there is an effect that the operation can be reliably continued without unnecessarily increasing discharging power of power distribution system storage battery power conversion device 41a in system interconnection.

In the second embodiment, similarly to the first embodiment, when power distribution system storage battery power conversion device 41 is newly introduced, at least a control parameter (time constant Tg) of governor control circuit 40933 and a value of a control parameter (inertia constant M) in mass system arithmetic circuit 40937 in virtual synchronous generator control circuit 4093 are made larger than values during the normal control. This is performed not only by power distribution system storage battery power conversion device 41 that is newly introduced, but also by power distribution system storage battery power conversion device 41 that continues interconnection.

As a result, it is possible to perform new introduction without generating unnecessarily large disturbance on the frequency of the AC voltage of the AC system of power distribution system 24. This is because an influence exerted on power distribution system 24 by the new introduction of power distribution system storage battery power conversion device 41 does not continue for a long time. By performing the control as described above, unnecessary disturbance can be prevented from being generated in the frequency of the AC voltage of the AC system of power distribution system 24.

Among control parameters at the time of new introduction, at least inertia constant M in mass system arithmetic circuit 40937 is set to be larger in power distribution system storage battery power conversion device 41 continuing the operation than that in power distribution system storage battery power conversion device 41 to be newly introduced. The reason for this is as follows. The phase of the AC voltage of the AC system of power distribution system storage battery power conversion device 41 to be newly introduced is a lagging phase in order to suppress an influence of a sensing inaccuracy of voltmeter 410. In order to supply power to power distribution system 24 by using newly introduced power distribution system storage battery power conversion device 41, it is necessary to control the phase of the AC voltage of the AC system of newly introduced power distribution system storage battery power conversion device 41 to a phase for system interconnection by the virtual synchronous generator control. Therefore, in newly introduced power distribution system storage battery power conversion device 41, response performance of the frequency and phase control by mass system arithmetic circuit 40937 is set higher than that of power distribution system storage battery power conversion device 41 in system interconnection. As a result, time during which frequency disturbance occurs can be shortened.

Furthermore, in the second embodiment, target power generation circuit 40931 and target frequency generation circuit 40934 in virtual synchronous generator control circuit 4093 are controlled as illustrated in FIGS. 13 and 14. As a result, when power distribution system storage battery power conversion device 41 is newly introduced, various types of control of governor control circuit 40933 and mass system arithmetic circuit 40937 can be smoothly performed. As a result, unnecessary frequency disturbance can be prevented from being generated in power distribution system 24.

Note that the first and second embodiments have a configuration in which, even in a case where an offset inaccuracy or linearity at a time of sensing is not ensured in voltmeter 410, an offset is added to a zero-cross point time detected by phase detection circuit 40910 (an offset is added so as to obtain a leading phase when an instruction from DSO 21 is for discharge, and to obtain a lagging phase when the instruction from DSO 21 is for charge), and a zero-cross point time is calculated by adding an offset to voltmeter 410 so as to obtain a leading phase when an instruction from DSO 21 is for discharge and to obtain a lagging phase when the instruction from DSO 21 is for charge at a time of detection of the phase. Therefore, there is an effect that, at the time of new introduction, power distribution system storage battery power conversion device 41 in system interconnection can reliably continue the operation without unnecessarily increasing the charging and discharging power.

In the first embodiment, a case has been described in which power distribution system storage battery power conversion device 41 is newly introduced into or disconnected from power distribution system 24, but the present disclosure is not limited to this. For example, a similar effect can be obtained by similarly controlling power distribution system storage battery power conversion device 41 including a power transmission system or a private distribution line and installed in a factory or a building.

In the first and second embodiments, power distribution system storage battery power conversion device 41 has been described, but the present disclosure is not limited to this. For a system that controls a static inverter as a voltage source, for example, a system that supplies generated power from solar cell, a wind power generator, or a fuel cell to a system, a similar effect can be obtained by performing similar control at the time of new introduction to the system or at the time of disconnection from the system. Further, it is also possible to use an in-vehicle storage battery of an electric vehicle (EV), a plug-in hybrid electric vehicle (PHEV), a fuel cell vehicle (FCV), or the like.

In the first and second embodiments, a case of a single-phase AC current has been described as an example in order to simplify the description, but the present disclosure is not limited to this, and for example, three-phase AC current may be used. In addition, a method of calculating active power is not limited to this, and for example, in the case of three-phase AC, active power may be calculated using an arithmetic method such as DQ conversion. In addition, a method of detecting a frequency and a phase of the AC voltage of the AC system inputted from power distribution system 24 is not limited to this, and in particular, the phase may be controlled to be a leading phase in the discharging direction and a lagging phase in the charging direction at the time of new introduction.

In the first and second embodiments, a governor model in governor control circuit 40933 is modeled as the first-order lag system, but the present disclosure is not limited to this. Even if the governor model is configured by a second-order lag system or a low pass filter (LPF), a similar effect can be obtained. In the first and second embodiments, the mass system arithmetic circuit is modeled by an integrator and a feedback loop, but the present disclosure is not limited to this. The mass system arithmetic circuit may be modeled by, for example, a first-order lag system, a second-order lag system, an LPF, or the like. In the first and second embodiments, VQ control widely implemented in the virtual synchronous generator control is omitted in order to simplify the description, but a similar effect can be obtained even if this method is adopted to a power conversion device in which the VQ control is also implemented as the virtual synchronous generator control.

Description of Modifications.

In the first to third embodiments, in order to make the description easier to understand, a case has been described in which control circuits of mega-solar power conversion device 27 and power distribution system storage battery power conversion device 41 are configured by hardware (H/W) as illustrated in FIGS. 3 to 13. However, even if a function of each block or some blocks described in each block is achieved by software (S/W) implemented on a central processing unit (CPU), a similar control function can be achieved. Alternatively, it is also possible to achieve a similar control function by function division of software and hardware for at least some blocks.

It is to be understood that the embodiments that have been disclosed herein are not restrictive, but are illustrative in all respects. The scope of the present disclosure is defined not by the description above but by the claims, and it is intended to include all modifications within the meaning and scope equivalent to the claims.

REFERENCE SIGNS LIST

20: substation, 21: power distribution automation system (DSO), 22: voltmeter, 23: automatic voltage regulator (SVR), 24: power distribution system, 25: communication line, 26: mega solar, 27: mega-solar power conversion device, 28: switch, 29: impedance, 30: synchronous generator, 31: load, 40: power distribution system storage battery, 41: power distribution system storage battery power conversion device, 100: town, 101: factory, 102: building, 103: apartment building, 201, 206, 210, 401, 406, 410: voltmeter, 202, 207, 211, 402, 407, 411: ammeter, 203: first DC/DC conversion circuit, 204: first control circuit, 205: DC bus, 208: first DC/AC conversion circuit, 209: second control circuit, 212: communication interface circuit, 403: second DC/DC conversion circuit, 404: second control circuit, 405: DC bus, 408: second DC/AC conversion circuit, 409: fourth control circuit, 412: communication interface circuit, 998: generator rotor, 999: valve, 2041: MPPT control circuit, 2042: voltage control circuit, 2043: switching circuit, 2044: fifth control circuit, 2090: current control circuit, 2091: phase detection circuit, 2092: first sine wave generation circuit, 2093: subtractor, 2094: first PI control circuit, 2095: multiplier, 2096: subtractor, 2097: sixth control circuit, 2098: second PI control circuit, 2099: first PWM conversion circuit, 4041: charge control circuit, 4042: discharge control circuit, 4043: second switching circuit, 4044: seventh control circuit, 4091: AC frequency detection circuit, 4092: active power calculation circuit, 4093: virtual synchronous generator control circuit, 4094: inverter current control circuit, 4095: inverter voltage control circuit, 4096: third switching circuit, 4097: eighth control circuit, 40910: phase detection circuit, 40911: frequency detection circuit, 40912: second sine wave generation circuit, 40931: target power generation circuit, 40932: subtractor, 40933: governor control circuit, 40934: target frequency generation circuit, 40935: adder, 40936: subtractor, 40937: mass system arithmetic circuit, 40951: third sine wave generation circuit, 40952: subtractor, 40953: third PI control circuit, 40954: second PWN conversion circuit, 409331: multiplier, 409332: first-order lag system model, 409333: limiter circuit, 409371: subtractor, 409372: integrator, 409373: multiplier, 409374: divider, 409375: adder, 409376: phase calculation circuit

The invention claimed is:

1. A power conversion device comprising:
an inverter to convert power outputted from a distributed power supply into alternating current (AC) power, and output the AC power to an AC system;
an AC voltage measuring device to measure an AC voltage of the AC system;
an AC frequency detection circuit to detect a frequency and a phase of the AC voltage of the AC system, based on an output of the AC voltage measuring device; and
an inverter control circuit to generate an AC voltage target value at a time of controlling the inverter, and generate a command value for control of the inverter as a voltage source, wherein
the inverter control circuit sets a frequency of the AC voltage target value to a frequency of the AC voltage detected by the AC frequency detection circuit at a time of introduction of the inverter into the AC system, and controls a phase of the AC voltage target value to be at least a leading phase with respect to the AC voltage of the AC system when a target value of the AC power is in a running direction.

2. The power conversion device according to claim 1, wherein the inverter control circuit controls the phase of the AC voltage target value at the time of introduction of the inverter into the AC system so that the phase of the AC voltage target value when the target value of the AC power is in the running direction is different from the phase of the AC voltage target value when a target value of the AC power is in a regeneration direction.

3. The power conversion device according to claim 2, wherein the inverter control circuit sets the frequency of the AC voltage target value to the frequency of the AC voltage detected by the AC frequency detection circuit at the time of introduction of the inverter into the AC system, and controls the phase of the AC voltage target value to be at least a lagging phase with respect to the AC voltage of the AC system when the target value of the AC power is in the regeneration direction.

4. The power conversion device according to claim 1, wherein the inverter control circuit calculates a phase of an AC voltage to be outputted from the inverter based on the target value of AC power to be outputted from the inverter.

5. The power conversion device according to claim 4, wherein
the power conversion device further includes an active power calculation circuit to calculate and output an active power to be outputted from the inverter, and
the inverter control circuit includes:
a governor control circuit to output an offset to be added to the target value of AC power to be outputted from the inverter, based on at least a difference between the frequency of an AC voltage serving as a reference and a frequency of the AC voltage outputted from the AC frequency detection circuit; and
a mass system arithmetic circuit to use, as an input, a difference between an output of the active power calculation circuit and a sum of the offset and the target value of the AC power, and calculate a frequency and the phase of an AC voltage to be outputted from the inverter.

6. The power conversion device according to claim 5, wherein
the mass system arithmetic circuit includes an inertial force simulation unit to simulate an inertial force of the synchronous generator and a braking force simulation unit to simulate a braking force of a synchronous generator, and at the time of introduction of the inverter as new into the AC system, the mass system arithmetic circuit sets at least a value of an inertia constant to be given to the inertial force simulation unit to a value larger than a value of an inertia constant during a normal operation, for a predetermined time immediately after the introduction or until the active power outputted from the inverter falls within a predetermined range.

7. The power conversion device according to claim 5, comprising
a communication interface circuit, wherein
the mass system arithmetic circuit includes an inertial force simulation unit to simulate an inertial force of the synchronous generator and a braking force simulation unit to simulate a braking force of the synchronous generator, and
when another power conversion device is newly introduced into the AC system, the mass system arithmetic circuit sets at least a value of an inertia constant to be given to the inertial force simulation unit to a value larger than a value of an inertia constant during a normal operation, for a predetermined time after the communication interface circuit receives information on the new introduction of the other power conversion device or until the active power outputted from the inverter falls within a predetermined range.

8. The power conversion device according to claim 5, wherein the inverter control circuit further includes a target frequency generation circuit to set, at the time of introduction of the inverter as new into the AC system, a frequency of an AC voltage serving as a reference to be inputted to the governor control circuit to a frequency detected by the AC frequency detection circuit immediately after the introduction, and then change the frequency to a predetermined frequency over a predetermined time.

9. The power conversion device according to claim 8, wherein the target frequency generation circuit sets the frequency of an AC voltage serving as a reference to be inputted to the governor control circuit, to a frequency detected by the AC frequency detection circuit immediately before the introduction for a predetermined time immediately after the introduction.

10. The power conversion device according to claim 5, wherein the inverter control circuit further includes a target power generation circuit to set, at the time of introduction of the inverter as new into the AC system, the target value of the AC power to be outputted from the inverter to zero immediately after the introduction, the target value being inputted to the mass system arithmetic circuit, and then increase the target value to a target value of the AC power specified by a power distribution automation system, over a predetermined time.

11. The power conversion device according to claim 10, wherein the target power generation circuit sets, to zero, the target value of the AC power to be outputted from the inverter, the target value being inputted to the mass system arithmetic circuit, for a predetermined time immediately after the introduction.

12. The power conversion device according to claim 10, wherein
when the inverter is disconnected from the AC system, the target power generation circuit sets, to zero, the target value of the AC power to be outputted from the inverter, the target value being inputted to the mass system arithmetic circuit, and
the inverter control circuit disconnects the inverter from the AC system after the active power outputted from the active power calculation circuit falls within a predetermined range.

* * * * *